US012153289B2

(12) United States Patent
Bakaraju

(10) Patent No.: US 12,153,289 B2
(45) Date of Patent: Nov. 26, 2024

(54) APPARATUS AND METHODS OF SPECTACLE SOLUTIONS FOR MYOPIA

(71) Applicants: NTHALMIC HOLDING PTY LTD, Sydney (AU); Zhong Jing Wei Shi (Suzhou) Optical Technology Ltd, Suzhou (CN)

(72) Inventor: Ravi Chandra Bakaraju, Sydney (AU)

(73) Assignees: NTHALMIC HOLDING PTY LTD, Sydney (AU); Zhong Jing Wei Shi (Suzhou) Optical Technology Ltd, Suzhou (CN)

( * ) Notice: Subject to any disclaimer, the term of this patent is extended or adjusted under 35 U.S.C. 154(b) by 255 days.

(21) Appl. No.: 17/641,087

(22) PCT Filed: Sep. 23, 2020

(86) PCT No.: PCT/AU2020/051005
§ 371 (c)(1),
(2) Date: Mar. 7, 2022

(87) PCT Pub. No.: WO2021/056058
PCT Pub. Date: Apr. 1, 2021

(65) Prior Publication Data
US 2022/0326547 A1    Oct. 13, 2022

(30) Foreign Application Priority Data

Sep. 25, 2019  (AU) .................... 2019903581
Feb. 14, 2020  (AU) .................... 2020900413

(51) Int. Cl.
*G02C 7/08*    (2006.01)
*G02C 7/02*    (2006.01)
*G02C 7/06*    (2006.01)

(52) U.S. Cl.
CPC .............. *G02C 7/08* (2013.01); *G02C 7/022* (2013.01); *G02C 7/06* (2013.01); *G02C 2202/24* (2013.01)

(58) Field of Classification Search
USPC .............. 351/159.52, 159.53, 159.54, 159.7, 351/159.71, 159.72, 159.73, 159.78
See application file for complete search history.

(56) References Cited

U.S. PATENT DOCUMENTS

2011/0181828 A1 *  7/2011  Yi ..................... G02C 7/088
                                                    359/464
2012/0194780 A1    8/2012  Back
                (Continued)

FOREIGN PATENT DOCUMENTS

JP    2014160276 A    9/2014
JP    2018500609 A    1/2018
                (Continued)

OTHER PUBLICATIONS

International Search Report in PCT International Application No. PCT/AU2020/051005, mailed Nov. 27, 2020.

*Primary Examiner* — Darryl J Collins
(74) *Attorney, Agent, or Firm* — Cognition IP, P.C.; Edward Steakley

(57) ABSTRACT

The present disclosure relates to means of managing eye-length disorders, like myopia. The invention includes an apparatus and methods for the prescription, selection, supply and fitting of sets, stocks, or kits of pairs of myopia management spectacles, or spectacle fronts, attachable impermanent auxiliary optical films or mini optical elements used in conjunction with standard single vision spectacles, wherein the apparatus and methods are configured to provide substantially toric, or astigmatic, or asymmetric, directional optical cues to decelerate, ameliorate, control, inhibit, or reduce the rate of myopia progression over time, wherein (Continued)

the method is a prescribed care regimen providing temporal and spatial variation to the directional optical cues or stop signals.

19 Claims, 31 Drawing Sheets

(56) References Cited

U.S. PATENT DOCUMENTS

| | | | |
|---|---|---|---|
| 2016/0178934 A1* | 6/2016 | Curley | G02C 7/086 351/57 |
| 2017/0146824 A1 | 5/2017 | Martinez et al. | |
| 2017/0336653 A1 | 11/2017 | Bakaraju | |

FOREIGN PATENT DOCUMENTS

| | | |
|---|---|---|
| WO | 2018076057 A1 | 5/2018 |
| WO | 2019/037400 A1 | 2/2019 |

* cited by examiner

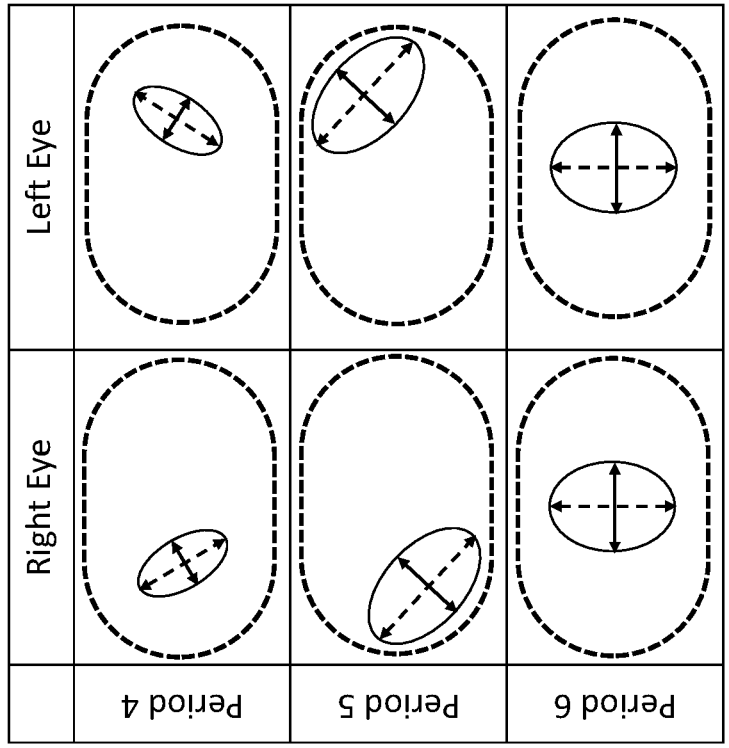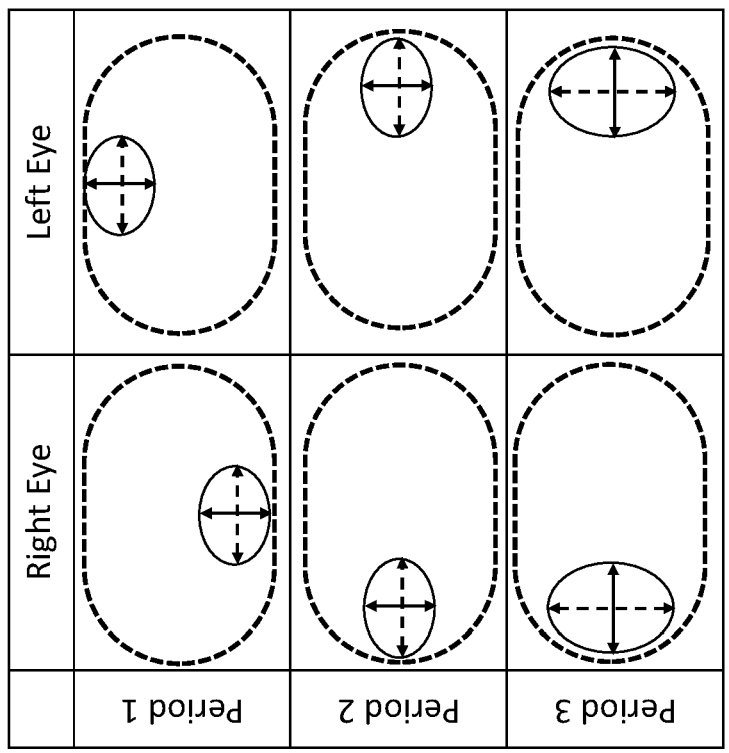
Figure 15

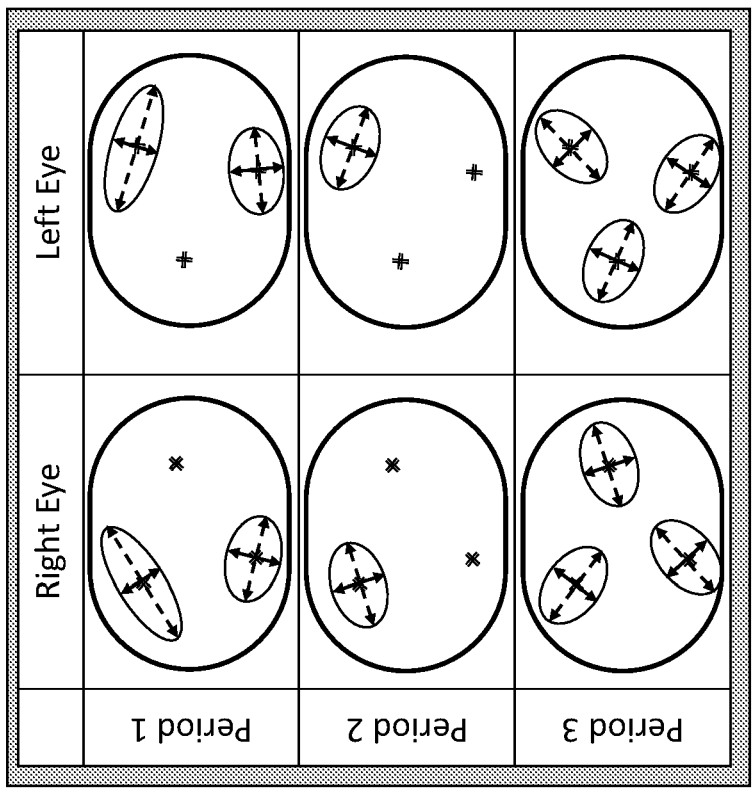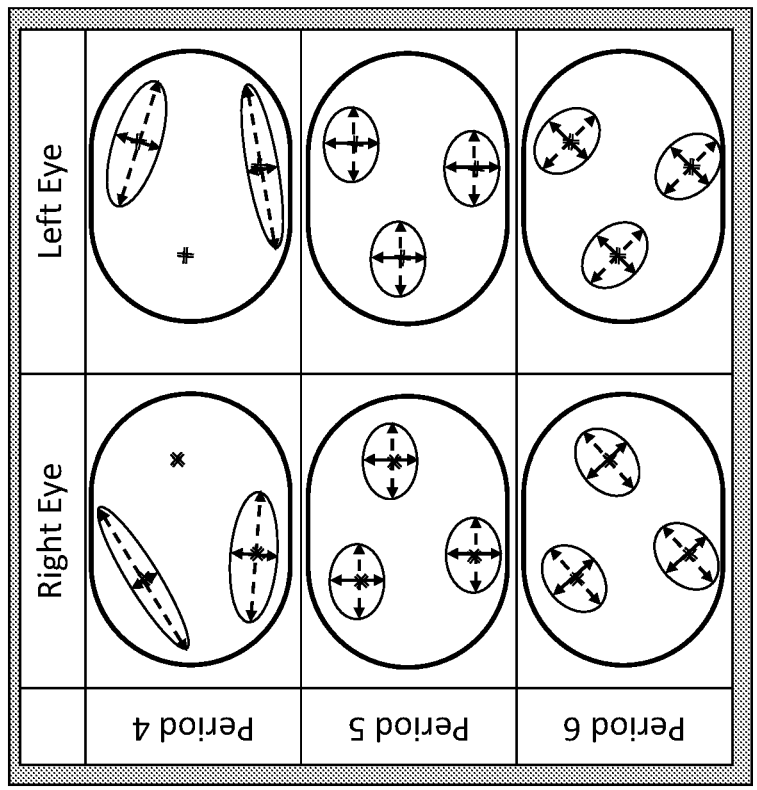
Figure 19

APPARATUS AND METHODS OF SPECTACLE SOLUTIONS FOR MYOPIA

CROSS-REFERENCE

This application is a 35 U.S.C. § 371 national stage application of PCT International Application No. PCT/AU2020/051005, filed on Sep. 23, 2020, which claims priority to Australian Provisional Application Serial No. 2019/903581 filed on Sep. 25, 2019, entitled "A spectacle lens set for myopia" and another Australian Provisional Application Serial No. 2020/900413 filed on Feb. 14, 2020, entitled "Lens kit", all of which are herein incorporated by reference in their entirety.

FIELD OF THE INVENTION

The present disclosure relates to means of managing eye-length disorders, like myopia. The invention includes an apparatus and methods for the prescription, selection, supply and fitting of sets, stocks, or kits of pairs of myopia management spectacles or spectacle fronts, wherein the apparatus and methods are configured to provide substantially toric, or astigmatic, or asymmetric, optical directional cues to decelerate, ameliorate, control, inhibit, or reduce the rate of myopia progression over time, wherein the method is a prescribed care regimen providing temporal and spatial variation to the directional cues or optical stop signals.

The invention further includes an apparatus and methods for the prescription, selection, supply and fitting of sets, stocks, or kits of attachable impermanent auxiliary optical films or elements used in conjunction with standard single vision spectacles used for correcting the refractive error of an individual, wherein the apparatus and methods are configured to provide substantially toric, or astigmatic, or asymmetric, directional cues to decelerate, ameliorate, control, inhibit, or reduce the rate of myopia progression over time, wherein the method is a prescribed care regimen providing temporal and spatial variation to the directional cues or optical stop signals.

BACKGROUND

Human eyes are hyperopic at birth, where the length of the eyeball is too short for the total optical power of the eye. As the person ages from childhood to adulthood, the eyeball continues to grow until the eye's refractive state stabilises.

The growth of the eye is controlled by a feedback mechanism and regulated predominantly by the visual experience of the world, to match the eye's optics with the eye length and maintain homeostasis. This process is referred to as emmetropisation.

The signals that guide the emmetropisation process are initiated by the modulation of light energy received at the retina. The retinal image characteristics are monitored by a biological process that modulates the signal to start or stop, accelerate, or slow eye growth. This process coordinates between the optics and the eyeball length to achieve or maintain emmetropia. Derailing from this emmetropisation process would potentially result in refractive disorders like myopia. It is hypothesised that increased retinal activity inhibits eye growth and vice versa.

The rate of incidence of myopia is increasing at alarming rates in many regions of the world, particularly in the East Asia region. In myopic individuals, the axial length of the eye is mismatched to the overall power of the eye, leading to the distant objects being focused in front of the retina.

A simple pair of negative single vision lenses can correct myopia. While such devices can optically correct the refractive error associated with eye-length, they do not address the underlying cause of the excessive eye growth in myopia progression.

Excessive eye growth in high degrees of myopia is associated with significant vision-threatening conditions like cataract, glaucoma, myopic maculopathy, and retinal detachment. Thus, there remains a need for specific optical devices for such individuals, that not only correct the underlying refractive error but would also substantially prevent excessive eye lengthening over time.

To date, numerous spectacle lens designs have been proposed to control the rate of myopia progression. The prior art includes the use of executive, D-shaped and concentric bifocals, symmetric and asymmetric progressive additional lenses, simultaneous defocus regions on the spectacle lenses, and spectacles with positive spherical aberration also referred to as peripheral plus lenses. In other words, all the designs have some degree of addition power related to the prescription power of the lens, distributed either rotationally symmetrically or asymmetrically across the optical axis of the spectacles.

Each of these options has its strengths and weaknesses with respect to retarding the rate of myopia progression in an individual. Some of the weaknesses are described herein.

For example, some problems with the existing spectacle designs that are based on various types of bifocal lenses or peripheral plus power compromise the quality of the vision at various other viewing angles by introducing significant visual disturbances like swing-effects, image-jumps, residual aberrations, peripheral distortions, etc.

These side effects are primarily attributable to the significant levels of multiple defocus regions, multiple defocus zones or segments, or use of significant amounts of positive spherical aberration in the lens, or drastically changing the power within a given zone of the spectacle lens. Given the influence of compliance of spectacle lens wear on the efficacy of such lenses, a significant reduction of visual performance may promote poor compliance, thus resulting in a poorer efficacy with such lenses.

Accordingly, what is needed are spectacle designs for the correction of myopia and retardation of progression, without causing at least one or more of the shortcomings discussed herein.

Further, some of the prior art may not be cosmetically appealing to the children, teenagers, and young adults, for example, the demarcating lines of D-shaped bifocals, executive bifocals, etc. Other solutions will become apparent as discussed herein.

It appears that the approaches disclosed in the prior art for addressing progression of myopia may fall short in one or more ways of serving the needs of an individual to offer effective myopia control solution lenses while functioning effectively for their daily routines. Therefore, the systems involving kits and sets and methods of prescribing the kits and sets for solving problems disclosed herein become desirable.

One of the disadvantages of prior art myopia management spectacles is its associated high access costs setting the entry barrier too high for a common individual in need of the solution. Thus, there is a need for an apparatus and/or a method that provides a budget-friendly solution for the problem of myopia, which can improve the uptake of the solutions by the population in need.

DEFINITIONS

Terms are used herein as generally used by a person skilled in the art unless otherwise defined in the following:

The term "myopic eye" means an eye that is either already experiencing myopia, is in the stage of pre-myopia, is at risk of becoming myopic, or is diagnosed to have a refractive condition that is progressing towards myopia.

The term "progressing myopic eye" means an eye with established myopia that is diagnosed to be progressing, as gauged by either the change in refractive error of at least −0.25 D/year or the change in axial length of at least 0.1 mm/year.

The term "an eye at risk of becoming myopic" means an eye, which could be emmetropic or is low hyperopic at the time but has been identified to have an increased risk of becoming myopic based on genetic factors (e.g. both parents are myopic) and/or age (e.g. being low hyperopic at a young age) and/or environmental factors (e.g. time spent outdoors) and/or behavioural factors (e.g. time spent performing near tasks).

The term "stop signal" means an optical signal that may facilitate slowing, reversing, arresting, retarding, inhibiting, or controlling the growth of an eye and/or refractive condition of the eye.

The term "through-focus" means a region that is substantially anterior-posterior to the retina. In other words, a region approximately just in front of the retina and/or approximately just behind the retina.

The term "spectacle lens" may mean a finished or semi-finished blank lens. The term "standard single vision spectacle lens" or "commercially available single vision spectacles" or "standard spectacles" means spectacle lenses used to correct the underlying refractive error of the eye; wherein the refractive error may be myopia, with or without astigmatism.

The term "myopia management spectacle lens" or "myopia management spectacles" means spectacle lenses used to not only correct the underlying refractive error of the eye but also manage the progression of refractive error; wherein the refractive error may be myopia, with or without astigmatism.

The term "optical zone" or "optic zone" means the region on the myopia management spectacle lens or spectacle front which has the prescribed optical effect. The term "optical centre" means the geometric centre of the optical zone of the spectacle lens. The term "optical axis" means line passing through the optical centre and substantially perpendicular to the plane containing the edge of the spectacle lens. The term or phrase "spherical optical zone" may mean that the optical zone has a uniform power distribution with or without spherical aberration.

The term or phrase "non-spherical optical zone" may mean that the optical zone does not have uniform optical power distribution. The non-spherical optical zone may be further classified into the non-spherical optical zone with lower order aberrations like astigmatism or higher-order aberrations like coma, trefoil, and spherical aberration. The terms or phrases "astigmatic optical zone" or "toric optical zone" may mean that the optical zone has sphero-cylindrical power distribution.

The term "model eye" may mean a schematic, raytracing, or a physical model eye. The terms "Diopter", "Dioptre" or "D" as used herein is the unit measure of dioptric power, defined as the reciprocal of the focal distance of a lens or an optical system, in meters, along an optical axis. Usually, the letter "D" signifies spherical dioptric power, and letters "DC" signify cylindrical dioptric power.

The terms "conoid of Sturm" or "interval of Sturm" means the resultant through-focus image profile formed on or about the retina due to the induced astigmatic, or toric, or asymmetric, power profile employing a myopia management spectacle lens, or a spectacle front, or an optical film, or a mini optical element, represented as elliptical blur patterns including the sagittal and tangential planes, and a circle of least confusion.

The term "induced" astigmatism may synonymously be referred to as "introduced" astigmatism.

The term "power profile" means the one-dimensional power distribution of localised optical power across a myopia management spectacle lens or spectacle front, either as a function of radial distance at a given azimuthal angle with the optical centre as a reference; or as a function of an azimuthal angle measured at a given radial distance.

The term "power map" means the two-dimensional power distribution a myopia management spectacle lens or spectacle front in cartesian or polar coordinates.

The term "radial" in context of describing a myopia management spectacle lens or spectacle front means in the direction radiating out from the optical centre of the spectacle lens or spectacle front, defined along an azimuthal angle. The term "azimuthal" in the context of describing a myopia management spectacle lens or spectacle front means in the direction circumferential about the optical centre of the spectacle lens or spectacle front defined at a radial distance.

The term "power map of the optical film" means the two-dimensional power distribution across of substantially the entire optical film used in conjunction with standard single vision spectacle lens.

The term "power map of the mini optical element" means the two-dimensional power distribution across of the mini optical element in cartesian or polar coordinates, which may be circular or elliptical.

The term "radial" in context of describing the mini optical element means in the direction radiating out from the geometric centre of the mini optical element, defined along an azimuthal angle. The term "azimuthal" in the context of describing mini optical element means in the direction circumferential along the geometric centre of optical film or mini optical element defined at a radial distance.

The term "back vertex power" means the reciprocal of back vertex focal length over the entire or a specified region over the optical zone, expressed in Dioptres (D). The terms "SPH" or "Spherical" power means substantially uniform power between all meridians of the optic zone. The terms "CYL", "Cylinder" power means the difference in back vertex powers between the two principal meridians within the optical zone. The term "meridional correction" means correcting the eye in at least one meridian. The term "meridional astigmatism" means inducing astigmatism in at least another meridian.

The terms "base prescription for correcting the refractive error" means the standard spectacle prescription required to correct underlying myopia in an individual, with or without astigmatism.

The term "sub-foveal region" means the region immediately adjacent to the foveal pit of the retina, approximately a region of 0.5 mm diameter. The term "foveal region" means approximately a region of 1.5 mm diameter about the foveal pit. The term "parafoveal region" means the region adjacent to the foveal region, approximately outside the 1.5 mm and within 3 mm diameter about the foveal pit. The term "para macular region" means the region the region immediately adjacent to the foveal region, approximately outside the 1.5 mm and within 3 mm diameter about the foveal pit.

SUMMARY OF THE INVENTION

Certain disclosed embodiments are directed towards apparatus, supply and configuration of sets and kits comprising pairs of myopia management spectacles or pairs of spectacle fronts used in conjunction with pairs of standard single vision spectacle lenses, and methods of use of the said sets and kits of pairs of spectacles or spectacle fronts for correcting and managing myopia.

Certain disclosed embodiments are directed towards apparatus, supply and configuration of sets and kits of impermanent auxiliary optical films, sheets, or mini optical elements used in conjunction with standard single vision spectacle lenses, and methods of use of the said sets and kits of impermanent auxiliary optical films, sheets, or mini optical elements in conjunction with standard single vision spectacle lenses for correcting and managing myopia. Certain disclosed embodiments are aimed to both correct the myopic refractive error and simultaneously provide directional cues serving as optical stop signals to reduce the progression of eye growth; certain methods of the disclosure include care regimen to provide temporal and spatial variation to the optical stop signals; such that the efficacy to reduce the progression of eye growth remains substantially consistent over time.

Certain disclosed embodiments consist of methods involving the sets or kits of pairs of myopia management spectacles lenses, or pairs of spectacle fronts, impermanent auxiliary optical films, sheets or mini optical elements to be used in conjunction with standard single vision spectacle lenses, wherein the method involves selection, prescription, fitting and use of the apparatus from the set or kit under a prescribed care regimen, wherein the prescribed care regimen provides temporally and spatially varying optical stop signal, for example, an astigmatic blur, on the central and/or peripheral retinal region of an eye. In some examples, the method may include a prescribed care regimen that offers the temporally varying or time changing optical stop signal to vary in an hourly, daily, weekly, or monthly pattern. In other examples, the methods may include a prescribed care regimen that offers the temporally varying or time changing optical stop signal to vary in a more regular or a more irregular pattern, once in every day for the following week, once in two days for the following week, once in three days, or once in four days.

In some examples, the methods may include a prescribed care regimen that offers the spatially varying or space-changing optical stop signal to vary within at least 2.5 degrees, 5-degrees, 10-degrees, 15-degrees, or 20-degrees, or 30-degrees visual field of the wearer. In other examples, the methods may include a prescribed care regimen that offers the spatially varying stop signal to vary in more than one desirable retinal regions.

Certain other disclosed embodiments are directed to the ongoing need for enhanced spectacle designs that may inhibit the progression of myopia substantially consistent over time while providing reasonable and adequate visual performance to the wearer for a range of activities that the wearer may undertake as a daily routine. Various aspects of the embodiments of the present invention disclosure address such needs of a wearer.

Certain disclosed embodiments include a set or kit of at least two, three, four or five pairs of myopia management spectacles, or pairs of spectacle fronts to be used in conjunction with standard single vision spectacle lenses, each pair purposefully configured with astigmatic or toric power distribution, in addition to the base prescription required to correct the refractive error, wherein the configured pair of myopia management spectacles, or the pair of spectacle fronts used in conjunction with standard single vision spectacle lenses, provides at least in part a meridional correction for the myopic refractive error, and at least in part also provides meridional astigmatism that inhibits further eye growth or progression of myopia for the wearer. When the said set or kit of myopia management spectacles, or the pairs of spectacle fronts used in conjunction with standard single vision spectacle lenses, is worn under a prescribed care regimen it provides a temporally and spatially varying stop signal on the central and/or peripheral retina. In one example, the set or kit of pairs of myopia management spectacles, or the pairs of spectacle fronts used in conjunction with standard single vision spectacle lenses, is configured such that the magnitude and/or the axis of induced astigmatism is substantially different between each pair of myopia management spectacles, or each pair of spectacle fronts, of the said set or kit.

The present disclosure relates to spectacles for managing eye-length disorders, like myopia. The proposed methods include correcting the myopic refractive error and controlling, inhibiting, or reducing the rate of myopia progression substantially consistent over time using a myopia management spectacle lens kit or set prescribed under a specific care regimen. The present disclosure relates to a set or kit of optical interventions that utilise the effects of astigmatic blur induced in at least one region of the retina to reduce myopia progression. This disclosure also relates to methods of the introduction of astigmatic blur that may serve as a temporally and spatially varying stop signal to the myopic eye. The present disclosure relates to an apparatus and methods relating to a myopia management set or kit that is purposefully configured and prescribed under a care regimen for reducing the rate of myopia progression in a wearer substantially consistent over time.

Certain embodiments of the present disclosure are directed towards devices, methods and/or systems of modifying the incoming light through spectacle lenses that utilise astigmatic cues imposed at least on one region of the retina to decelerate the rate of myopia progression. In some embodiments, the region or regions of the retina imposed with astigmatic cues may be imposed at the fovea, parafoveal, macular and/or the paramacular region of the retina. In some embodiments, the region or regions of the retina imposed with astigmatic cues may be in the temporal, nasal, inferior, and/or superior portion of the retina.

Certain embodiments of the present disclosure are directed towards devices, methods and/or systems, that consist of a set or kit of spectacles, including at least two pairs, three pairs, four pairs, or five pairs of spectacles, or spectacle fronts that are prescribed under a prescribed care regimen, to provide a temporally and spatially varying stop signal to retard the rate of myopia progression; such that the efficacy of myopia management remains substantially consistent over time.

Certain embodiments of the present disclosure are directed towards methods including procedures for the prescription, selection, fitting and supply of sets, stocks or kits of pairs of spectacles, or pairs of spectacle fronts, auxiliary optical films/sheets, or auxiliary mini optical elements used in conjunction with standard single vision spectacle lenses, configured to provide astigmatic cues, i.e. stop signal, to decelerate the rate of myopia progression. Certain embodiments of the disclosure are directed towards an apparatus and methods, including an optical film for converting a standard single vision spectacle lens for correction of myopia to a myopia management spectacle lens for both the correction of myopia and retarding, decelerating, reducing and/or managing the progression of myopia; wherein the optical film may be configured on the standard single vision spectacle lens using a desired power profile variation across the optical film. In some embodiments, the power profile of the optical film may be different in different regions of the optical film, such that when the optical film is configured on or adhered to the single vision spectacle lens, it provides an astigmatic blur for at least one specific region of the retina of the wearer to reduce the rate of myopia progression. The desired power profile variation in an optical film may be configured by varying the thickness profile of the optical film.

In some examples, the specific region or regions of the retina for introducing astigmatic cues may be in the nasal, temporal, superior, and/or inferior portion of the retina. In some other examples, other retina locations may be identified. In some other embodiments, the one specific region or regions of the retina of the wearer for introducing astigmatic cues may be in the sub-foveal, foveal, parafoveal, macular, and/or paramacular region of the retina.

In some other embodiments, the one specific region or regions of the retina of the wearer for introducing astigmatic cues may be at least within 2.5 degrees, 5 degrees, 10 degrees, 15 degrees, 20 degrees, or 25 degrees of the visual field. The specific region or regions of the retina may be different between the left and right eyes of the wearer. In some examples, the differences may be configured as differences in size, orientation and/or location of the optical stimulus. In other examples, the differences may be chosen such that at least one eye would maintain adequate visual performance comparable to that of a standard single vision lens at any given angle.

In some embodiments, the contemplated optical film or sheet may cover the entire standard single vision spectacle lens; while in other embodiments, the optical film embodiment may only be configured in a specific region on the spectacle lens. In certain other embodiments of the present disclosure, a kit or set of optical films is provided such that the desired optical features are configured to offer a temporally and spatially varying stop signal to the wearer when used under a prescribed care regimen. Certain examples may include optical films configured to provide the wearer with the desired astigmatic blur that is configured in elliptical shape or circular shape. In some other examples, the prescribed method may involve the use of an optical film or sheet that starts degrading after a certain wear time or period to aid compliance to the care regimen.

The present invention is directed to the provision of a kit or set including a plurality of attachable impermanent auxiliary mini optical elements, each of the mini optical elements to be used individually, in conjunction with a standard single vision spectacle lens prescribed for the correction of myopia in a wearer, a prescribed method providing a period and/or manner of use; wherein each of the mini optical elements is substantially configured with astigmatism or toric power distribution, and when the at least one mini optical element used in conjunction with the standard single vision spectacle lens provides at least in part a regionally induced astigmatic blur, or optical stop signal, within the desired location of the retina of the wearer's eye; wherein the prescribed period and prescribed method provides a temporally and spatially varying optical stop signal to control the rate of eye growth of the myopic eye of the wearer; such that the efficacy of myopia management remains substantially consistent over time.

In some embodiments of the disclosure, the individual attachable impermanent auxiliary mini optical elements of the aforementioned kit or set, configured with desired astigmatism or toric power distribution, may be either glued onto the standard single vision spectacle lens, or is made to adhere with finger pressure to the standard single spectacle lens, or may be used as a sticker on one of the surfaces of the standard single vision spectacle lens, or may be used as a peel-able adhesive on one of the surfaces of the standard single vision spectacle lens, or a combination thereof.

In some other examples, the prescribed method providing a manner of use may include identification of certain specific locations on the base spectacle lens and marking these locations with tiny embossing or miniature engravings within the matrix of the standard single vision spectacle lens to allow the user to periodically vary the positioning of the impermanent auxiliary mini optical elements to be placed on the base spectacle lens as prescribed in a care regimen.

In some embodiments of the disclosure, the pairs of spectacle fronts provided in the aforementioned kit to be used in conjunction with standard single vision spectacle lenses may be screwed onto, hooked onto, or adhered onto using a magnetic mechanism to the frame of the standard single-vision spectacles.

In some embodiments of the disclosure, the individual attachable impermanent auxiliary mini optical element configured with astigmatic or toric power distribution may be configured using a clear, elastic, thin, conformable material and may be implemented as a sticker on a standard single vision spectacle lens aimed to correct refractive errors, for example, myopia with or without astigmatism.

In some embodiments of the disclosure, the individual attachable impermanent auxiliary mini optical element configured with astigmatic or toric power distribution, configured as a sticker on the standard single vision spectacle lens aimed to correct myopia may cover only a regional portion of the spectacle lens. In some examples, the regional portion of the spectacle lens covered by the said sticker may have a surface area of at least 3 $mm^2$, at least 4 $mm^2$, at least 5 $mm^2$, at least 6 $mm^2$, at least 7 $mm^2$, at least 8 $mm^2$ or at least 10 $mm^2$.

BRIEF DESCRIPTION OF THE FIGURES

FIG. 15 illustrates an array of ready-made impermanent auxiliary optical sheets or films enclosed in the kit or set disclosed herein which are suitable for use over substantially the entire surface area of a standard pair of single vision spectacle lenses described in FIG. 14 over the prescribed periods 1 to 6 described herein.

FIG. 19 illustrates an array of ready-made impermanent auxiliary optical sheets or films enclosed multiple subsets within the kit or set of FIG. 18, which are purposefully configured over the regional surface area of a standard pair of single vision spectacles described in FIG. 17 in a prescribed location over the prescribed periods 1 to 6 as described herein.

DETAILED DESCRIPTION

Figure 1:
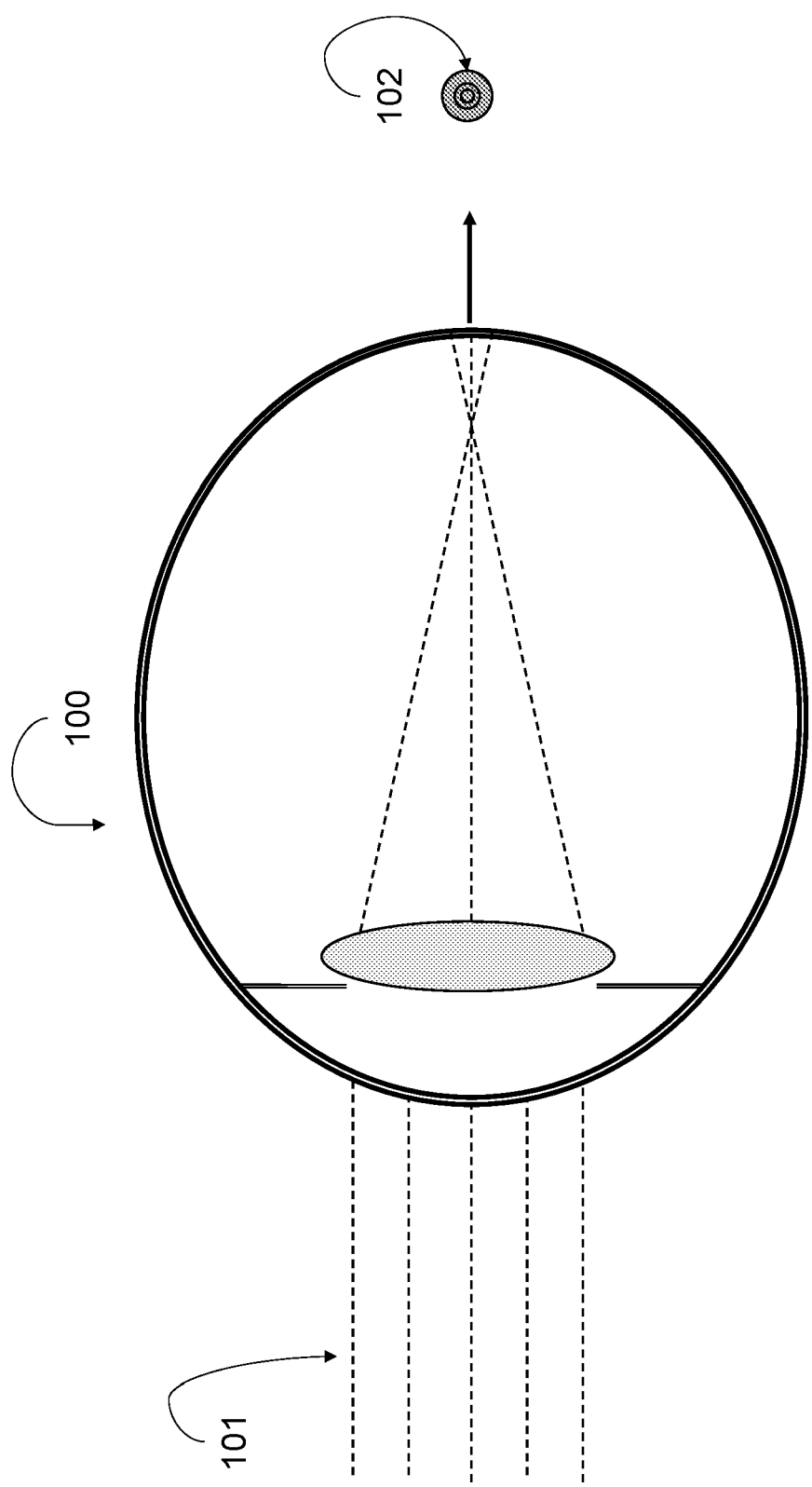
FIG. 1 illustrates a schematic diagram of an on-axis, geometric spot analysis at the retinal plane, when the incoming light, with a visible wavelength (for example, 589 nm) and a vergence of 0 D, is incident on an uncorrected −3 D myopic model eye.

The efficacy rates of the prior art spectacle designs are established through randomised control clinical trials. The duration of these trials including spectacle designs range between 6 months and 3 years and the reported efficacy ranges between 10% and 50% when compared to the single vision control lenses.

A simple linear model of emmetropisation suggests that the magnitude of a stop signal accumulates over time. In other words, the accumulated stop signal depends on the total magnitude of exposure and not its temporal distribution.

A striking observation in all clinical trials is the fact that almost all the slowing effect on the rate of progression occurs as an initial burst of the treatment-effect observed in the first 6 to 12 months and seem to fade away with time. So, a more faithful model of emmetropisation to line up with the clinical results suggests that there may be a delay before the stop signal builds, then saturation occurs with time and perhaps a decay in the effectiveness of the stop signal.

There is a need in the art for spectacle lenses that avoids or minimises this saturation effect by providing a temporarily and spatially varying stop signal to retard the rate of myopia progression, for example, with a prescribed care regimen that requires switching of pairs of myopia management spectacle lenses from a set or kit, or switching pairs of myopia management spectacle fronts or impermanent auxiliary optical films, sheets, or mini optical elements used in conjunction with standard single vision spectacle lenses during a prescribed period. In addition to the pairs of spectacle lenses from a set or a kit prescribed under a care regimen, this disclosure also describes the use of auxiliary spectacle fronts and/or impermanent optical films and mini optical elements of a set or a kit to be used in conjunction with standard pair of spectacle lenses prescribed under a care regimen.

Accordingly, there exists a need for optical interventions with a mechanism to achieve substantially greater, and/or substantially consistent, efficacy over time in reducing and/or slowing myopia progression without significantly compromising visual performance. In one or more examples, the substantially consistent efficacy overtime may be considered to be at least 6, 12, 18, 24, 36, 48 or 60 months.

In this section, the present disclosure will be described in detail with reference to one or more embodiments, some are illustrated and supported by accompanying figures. The examples and embodiments are provided by way of explanation and are not to be construed as limiting to the scope of the disclosure. The following description is provided in relation to several embodiments that may share common characteristics and features of the disclosure. It is to be understood that one or more features of one embodiment may be combined with one or more features of any other embodiments which may constitute additional embodiments. The functional and structural information disclosed herein is not to be interpreted as limiting in any way and should be construed merely as a representative basis for teaching a person skilled in the art to employ the disclosed embodiments and variations of those embodiments in various ways. The sub-titles and relevant subject headings used in the detailed description section have been included only for the ease of reference of the reader and in no way should be used to limit the subject matter found throughout the invention or the claims of the disclosure. The sub-titles and relevant subject headings should not be used in construing the scope of the claims or the claim limitations.

Risk of developing myopia or progressive myopia may be based on one or more of the following factors: genetics, ethnicity, lifestyle, environmental, excessive near work, etc. Certain embodiments of the present disclosure are directed towards a person at risk of developing myopia or progressive myopia.

One or more of the following advantages are found in one or more of the disclosed optical devices, and/or methods of the myopia management kit. A kit or set of pairs of myopia management spectacle lenses or spectacle fronts, impermanent auxiliary optical films, sheets, or mini optical elements used in conjunction with standard single vision spectacle lenses or method providing a stop signal to retard the rate of eye growth or stop the eye growth (or the state of refractive error) of the wearer's eye based on an astigmatic blur signal.

A kit or set of pairs of myopia management spectacle lenses or spectacle fronts, impermanent auxiliary optical films, sheets, or mini optical elements used in conjunction with standard single vision spectacle lenses or method providing a temporally and spatially varying stop signal for increasing the effectivity of managing progressive myopia. The current invention contemplates apparatus and/or methods that are not based on positive spherical aberration, or simultaneous defocus, which suffers from saturation effects of efficacy due to rotational symmetry of the optical stop signal.

FIG. 1 shows an uncorrected −3 D myopic model eye (100). When incoming light (101) of a visible wavelength (for example, 589 nm) of a vergence 0 D, is incident on the uncorrected myopic eye, the resultant image on the retina has a symmetrical blur (102) caused by defocus. This schematic diagram represents an on-axis, geometric spot analysis at the retinal plane.

Figure 2:
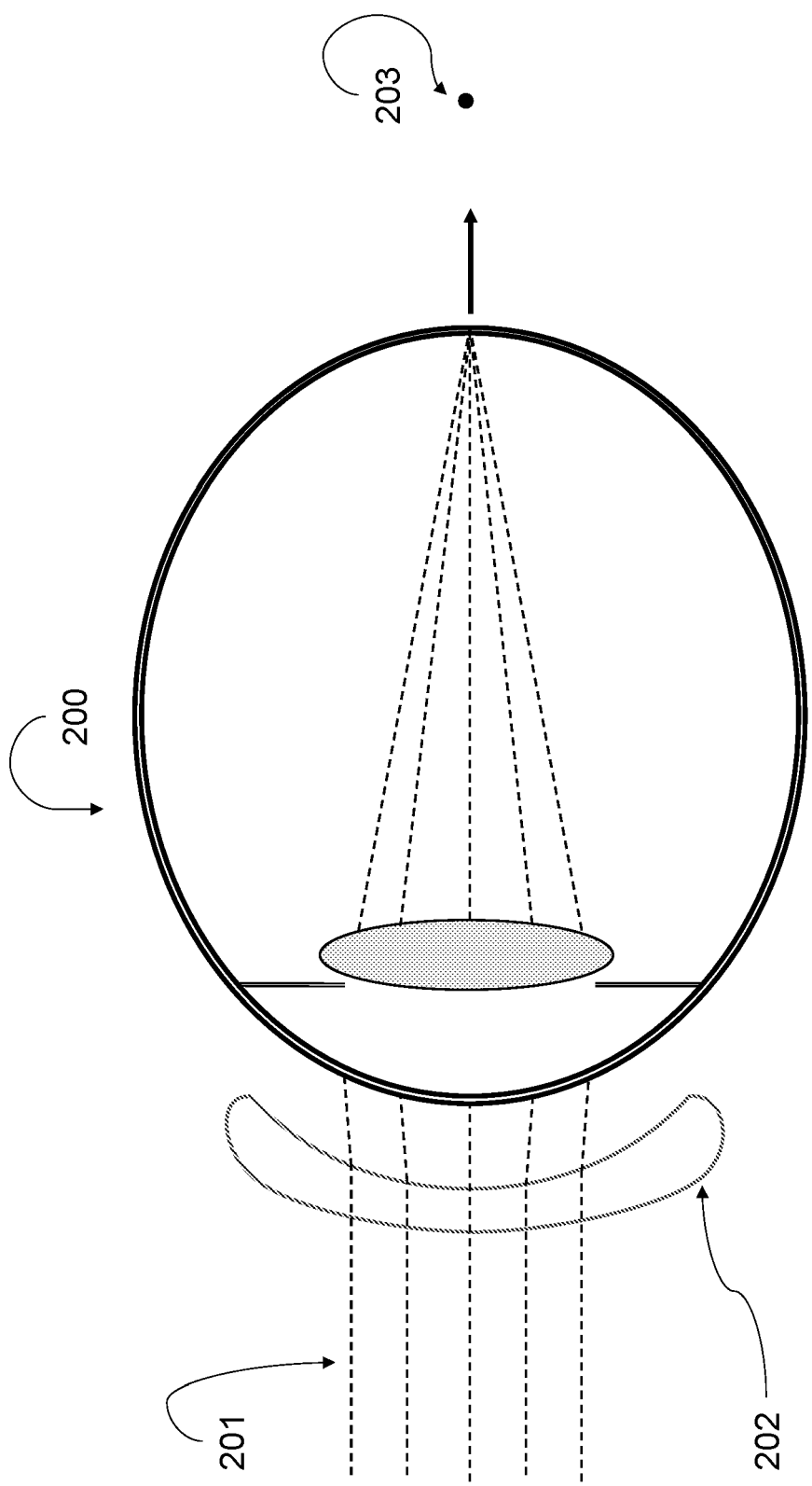
FIG. 2 illustrates a schematic diagram of an on-axis, geometric spot analysis at the retinal plane, when the incoming light, with a visible wavelength (for example, 589 nm) and a vergence of 0 D, is incident on a −3 D myopic model eye corrected with a single vision spectacle lens of the prior art.

FIG. 2 shows the schematic diagram of an on-axis, geometric spot analysis at the retinal plane when the −3 D myopic model eye (200) of FIG. 1 is corrected with a standard single vision spectacle lens or commercially available single vision spectacle lens of the prior art (202). Here in this example, when the incoming light (201) of a visible wavelength (for example, 589 nm) of a vergence 0 D, is incident on the corrected myopic eye, the resultant image on the retina has a symmetrical sharp focal point (203).

Figure 3:
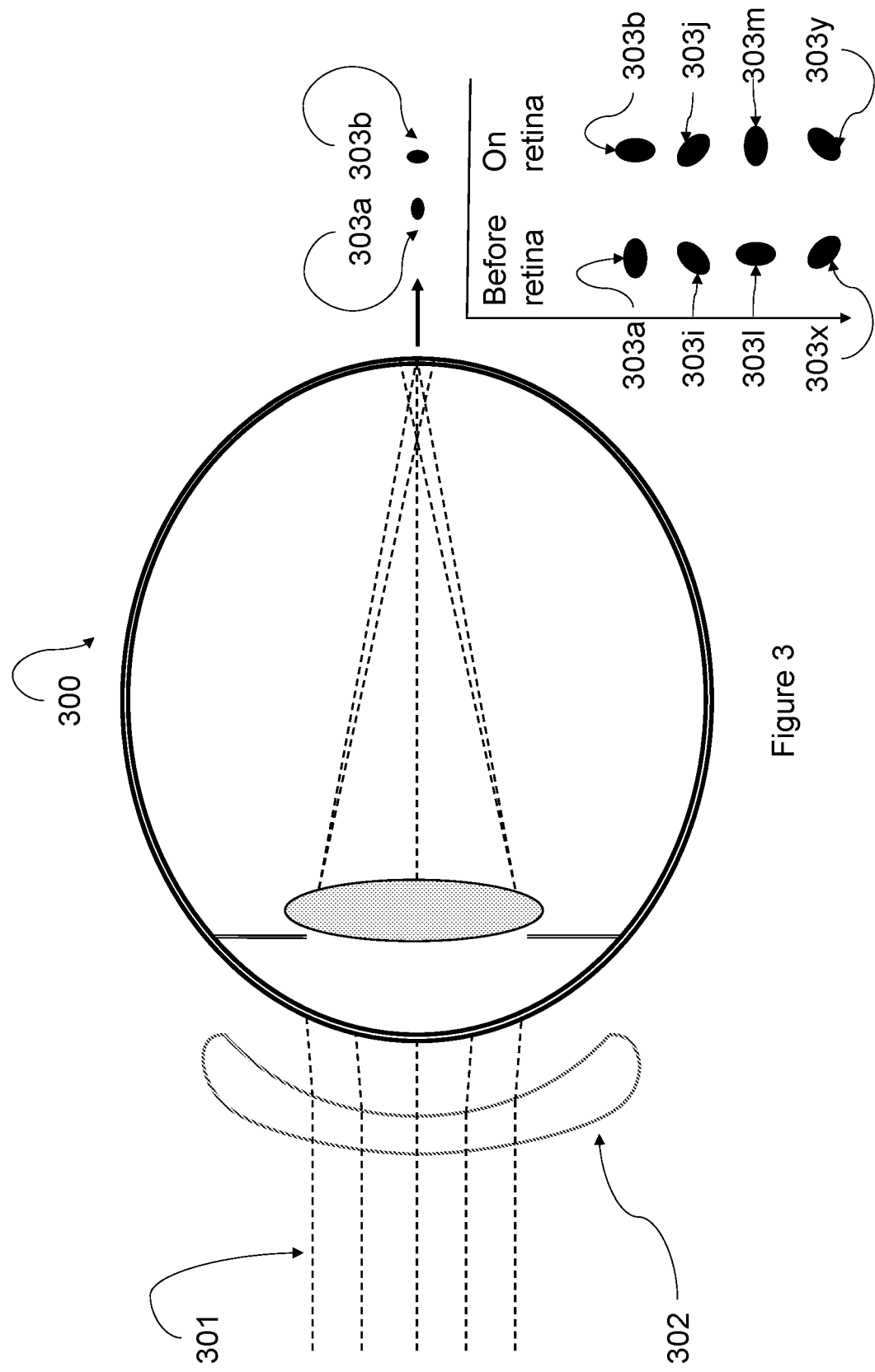
FIG. 3 illustrates a schematic diagram of an on-axis, through-focus geometric spot analysis at the retinal plane, when the incoming light, with a visible wavelength (589 nm) and a vergence of 0 D, is incident on a −3 D myopic model eye corrected with one of the myopia management spectacle lens embodiments of a kit or set disclosed herein.

FIG. 3 shows the schematic diagram of an on-axis, through-focus, geometric spot analysis at the retinal plane when the −3 D myopic model eye (300) of FIG. 1 is corrected with one of the exemplary embodiments (302) disclosed herein. Here in this example, when the incoming light (301) of a visible wavelength (for example, 589 nm) of a vergence 0 D, is incident on the corrected myopic eye (300), the resultant through-focus images on the retina form a conoid or interval of Sturm having the least circle of confusion in between 303a and 303b and elliptical blur patterns with sagittal and tangential planes (303a and 303b). Certain exemplary embodiments are directed to methods of modifying the incoming light through a spectacle lens system that offers astigmatic cues (i.e. stop signal) at the retina of the eye. This may be achieved by using an astigmatic or a toric prescription, in addition to the standard prescription used for correction of myopia. In short, the use of additional astigmatic or toric prescription may be used to reduce the rate of myopia progression by introducing astigmatic cues (i.e. stop signal) at the retinal level. In certain embodiments, the use of astigmatic cues obtained with a myopia management kit may be configured to provide temporally and spatially varying stop signals.

A schematic model eye (Table 1) was chosen for illustrative purposes in FIGS. 1 to 3. However, in other exemplary embodiments, schematic raytracing model eyes like Liou-Brennan, Escudero-Navarro and others may be used instead of the above simple model eye. One may also alter the parameters of the cornea, lens, retina, ocular media, or combinations thereof, to aid further simulation of the embodiments disclosed herein. The examples provided herein have used a −3 D myopic model eye to disclose the present invention, however, the same disclosure can be extended to other degrees of myopia, for example, −1 D, −2 D, −5 D or −6 D. Further, it is understood that the scope of the invention can be extended to eyes with varying degrees of myopic refractive error, with or without astigmatism.

In the example embodiments, reference was made to a specific wavelength of 589 nm, however, it is understood that a person skilled in the art can draw extension to other visible wavelengths between 420 nm and 760 nm. Specific structural and functional details disclosed in these figures and examples are not to be interpreted as limiting, but merely as a representative basis for teaching a person skilled in the art to employ the disclosed embodiments in numerous variations.

Certain embodiments of the present disclosure are directed to a myopia management kit or set that may provide a temporally and spatially varying, in other words varying with retinal location over time, stop signal to the progressing myopic eye, achieved with the help of a prescribed wearing regimen. This temporally and spatially varying stop signal may minimise the implicit saturation effects of efficacy that are observed in the prior art.

In certain embodiments, the toric portion of a myopia management spectacle lens or a spectacle front when used in conjunction with standard single vision spectacle lens provides at least in part, a meridional correction for a myopic eye and at least in part, produces a temporally and spatially varying astigmatic stop signal to reduce the rate of myopia progression when worn under a care regimen. In certain embodiments, the induced astigmatism (i.e. stop signal) configured within the pairs of myopia management spectacle lenses or spectacle lens fronts used in conjunction with standard single vision spectacle lenses of a kit or set may be at least +0.5 DC, +0.75 DC, +1 DC or +1.25 DC. In certain embodiments, the induced astigmatism configured within the pairs of myopia management spectacle lenses or spectacle lens fronts used in conjunction with standard single vision spectacle lenses of a kit or set may be between +0.5 DC and +1.75 DC, +0.5 DC and +2 DC, or +0.5 DC and +2.5 DC.

Figure 4:
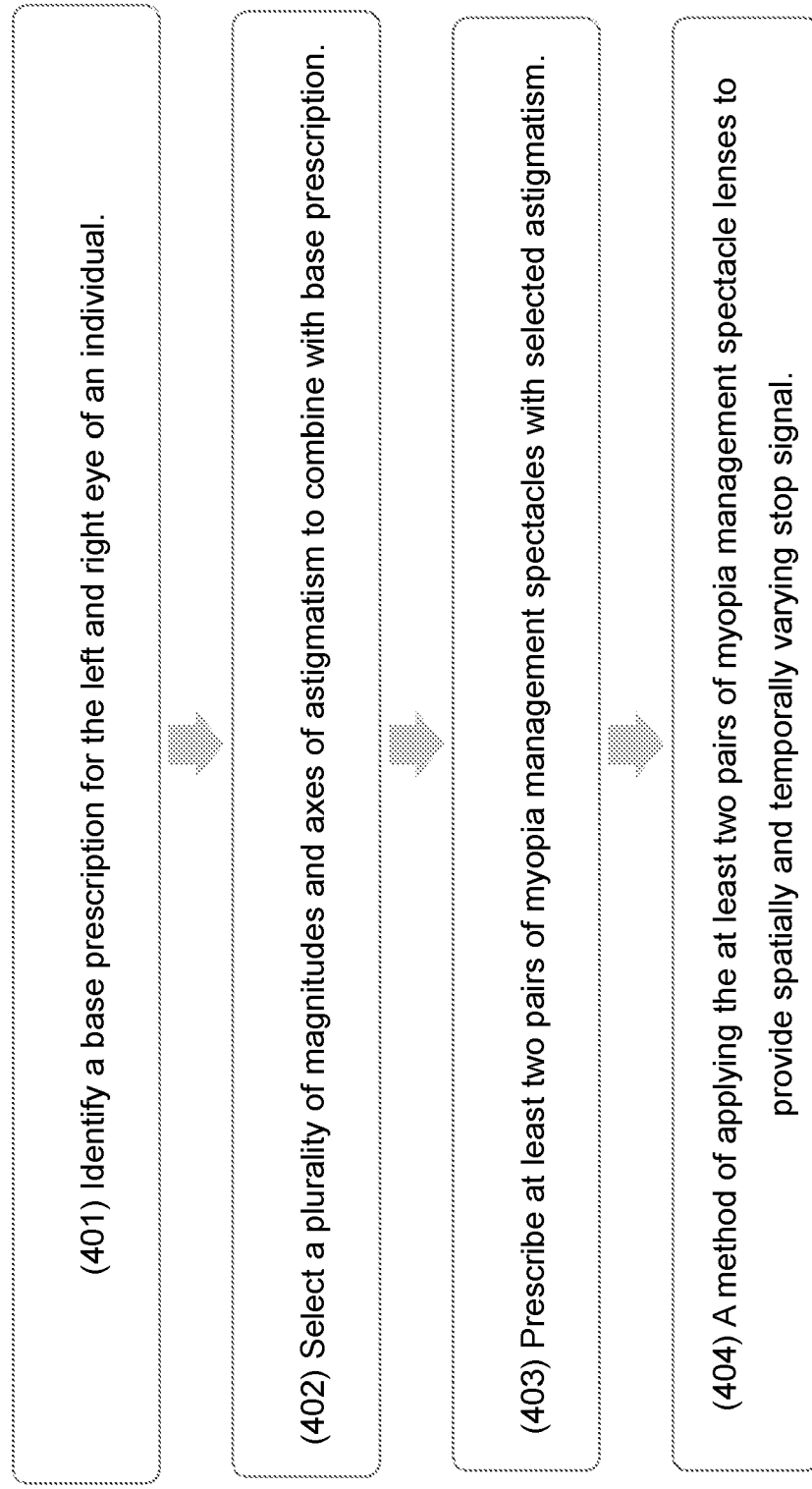
FIG. 4 illustrates a flow diagram for an exemplary method of prescribing myopia management spectacle lens kit or set, for reducing, inhibiting, or controlling the rate of progression of myopia for an individual according to an exemplary aspect of the disclosure.

FIG. 4 illustrates a flow diagram for an exemplary method of prescribing myopia management spectacle lens kit or set, for reducing, inhibiting, or controlling the rate of progression of myopia for an individual according to an exemplary aspect of the disclosure.

In this example, the base prescription for the left and right eyes of an individual is identified by performing an optimal objective or subjective refraction for each eye of the individual (401).

Select appropriate magnitudes and axes of astigmatic or toric power distributions are combined with the base prescription for at least two pairs of myopia management spectacles for the individual (402).

The at least two pairs of myopia management spectacles are configured to provide at least in part a meridional correction for the eye and at least in part a meridional astigmatic blur to serve as an optical signal to the eye (403).

Further, the method of use of the at least two pairs of myopia management spectacle lenses prescribed under a care regimen provides a spatially and temporally varying stop signal to the eye (404).

In some examples, the appropriate levels of astigmatism configured within the pairs of myopia management spectacle lenses used in conjunction with standard single vision spectacle lenses of a kit or set may be at least +0.5 DC, +0.75 DC, +1 DC, +1.25 DC or +1.75 DC.

In some examples, the appropriate levels of astigmatism configured within the pairs of myopia management spectacle lenses used in conjunction with standard single vision spectacle lenses of a kit or set may be between +0.5 DC and +1.75 DC, +0.5 DC and +2 DC, or +0.5 DC and +2.25 DC.

In some examples, the appropriate differences of axes orientations of the individual spectacle lens of the pairs of myopia management spectacle lenses may be at least 15 degrees, 30 degrees, 45 degrees, 60 degrees or 75 degrees.

In some examples, the appropriate differences of axes orientations of the individual spectacle lens of the pairs of myopia management spectacle lenses may be between 15 and 30 degrees, 30 to 60 degrees, 45 to 75 degrees, 60 and 90 degrees, 15 and 90 degrees.

To demonstrate the effects of other embodiments, other schematic model eyes like Atchison, Escudero-Navarro, Liou-Brennan, Polans, Goncharov-Dainty may be used instead of the above schematic model eye.

One may also alter the parameters of the individual parameters of the model eye; for example, the cornea, lens, retina, media, or combinations thereof, to aid a better simulation of the effect is described. Schematic eyes were used for simulation of the optical performance results of the exemplary embodiments of the current disclosure.

The prescription parameters of the schematic model eye used for optical modelling and simulation of the performance are tabulated in Table 1.

The prescription offers a −3 D myopic eye defined for a monochromatic wavelength of 589 nm. The prescription described in Table 1 should not be construed as an imperative method to demonstrate the effect of the contemplated exemplary embodiment. It is just one of many methods that may be used by the person skilled in the art for optical simulation purposes.

TABLE 1

Prescription of a schematic model eye that offers a −3 D myopic model eye

| Description | Radius | Thickness | Refractive Index | Semi Diameter | Conic Constant |
|---|---|---|---|---|---|
|  | Infinity | Infinity |  | 0.00 | 0.000 |
| Start | Infinity | 5.000 |  | 4.00 | 0.000 |
| Anterior Cornea | 7.750 | 0.550 | 1.376 | 5.75 | −0.250 |
| Posterior Cornea | 6.400 | 3.000 | 1.334 | 5.50 | −0.400 |
| Pupil | Infinity | 0.450 | 1.334 | 5.00 | 0.000 |
| Anterior Lens | 10.800 | 3.800 | 1.423 | 4.50 | −4.798 |
| Posterior Lens | −6.250 | 17.675 | 1.334 | 4.50 | −4.101 |
| Retina | −12.000 | 0.000 |  | 10.00 | 0.000 |

Figure 5:
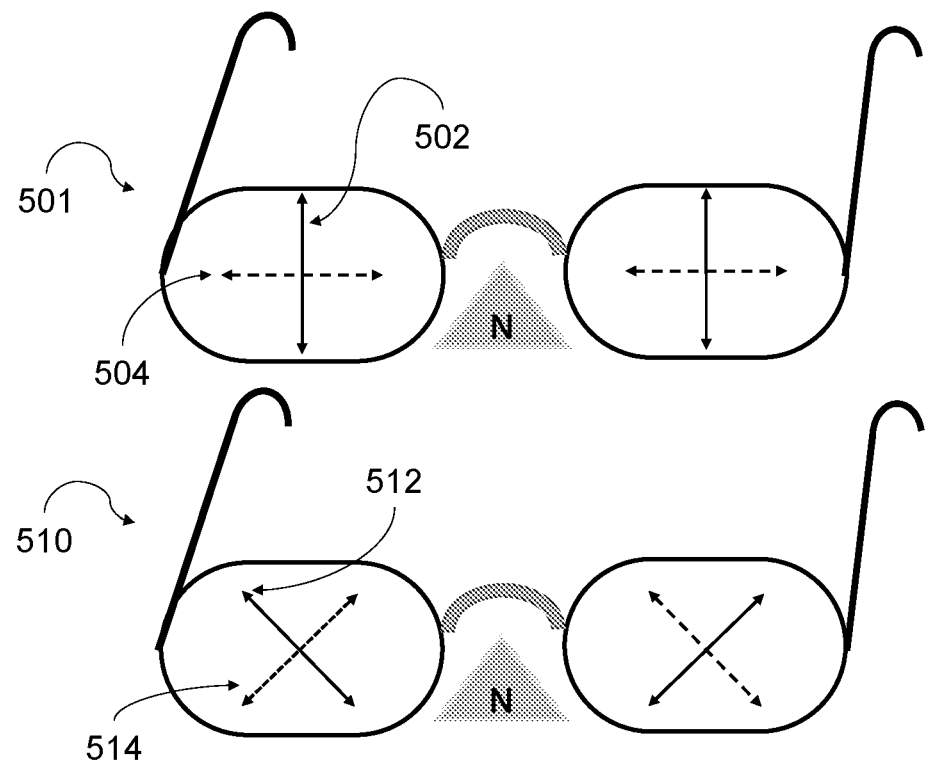
FIG. 5 illustrates a set of two pairs of exemplary myopia management spectacle lenses prescribed for reducing, inhibiting, or controlling the rate of progression of myopia for an individual according to the current disclosure. The astigmatic blur (i.e. stop signal) of 1 DC is combined with the base prescription for each eye.

Table 2 provides a myopia management spectacle lens with a prescription of −3 D/+1 DC. The prescriptions of two pairs of exemplary myopia management spectacle lens embodiments (501 and 510), illustrated in FIG. 5, are: 1st pair: −3 D/+1 DC×90 (right and left eyes); $2^{nd}$ pair: −3 D/+1 DC×135 (right eye) and $2^{nd}$ pair: −3 D/+1 DC×45 (left eye).

TABLE 2

Prescription of the exemplary spectacle lens embodiment of the disclosure

| | Surface | |
|---|---|---|
| | Standard | Biconic |
| Description | Anterior Surface | Posterior Surface |
| RadiusX/Radius Y | 2000 mm/2000 mm | 223.64 mm/154.17 mm |
| Thickness | 1.5 mm | 13 mm vertex distance |
| Refractive Index | 1.498 | |
| Semi Diameter | 25 mm | 25 mm |

FIG. 5 illustrates two pairs of exemplary myopia management spectacle lenses (501 and 510) prescribed for reducing, inhibiting, or controlling the rate of progression of myopia for an individual according to the current disclosure.

The astigmatic blur (i.e. stop signal) of 1 DC is combined with the base prescription for each eye. The axis orientation of the prescribed astigmatic blur in the first pair is 90 degrees; axis orientation of the prescribed astigmatic blur in the second pair is 135 degrees and 45 degrees for right and left eyes of a wearer, respectively. The first pair of myopia management spectacles (501) is prescribed to be used in the 1st period and the second pair of myopia management spectacles (510) is prescribed to be used in the $2^{nd}$ period. The astigmatic or toric prescription of pairs of myopia management spectacles of FIG. 5 is represented in the form of a cross-cylinder notation using two principal meridians, the solid lines (502, 512) represents the principal meridian with weaker positive power and the dotted lines (504, 514) represents the principal meridian with stronger positive power.

In some examples, the two (2) wearing periods described in the methods of use of two pairs of myopia management spectacles shown in FIG. 5 may be every alternate day of the week, for example, Monday, Wednesday, Friday. In some other example, the two wearing periods may be a specific day of the week; while in some other examples, the two (2) wearing periods may include a specific day of the month.

Figure 6:
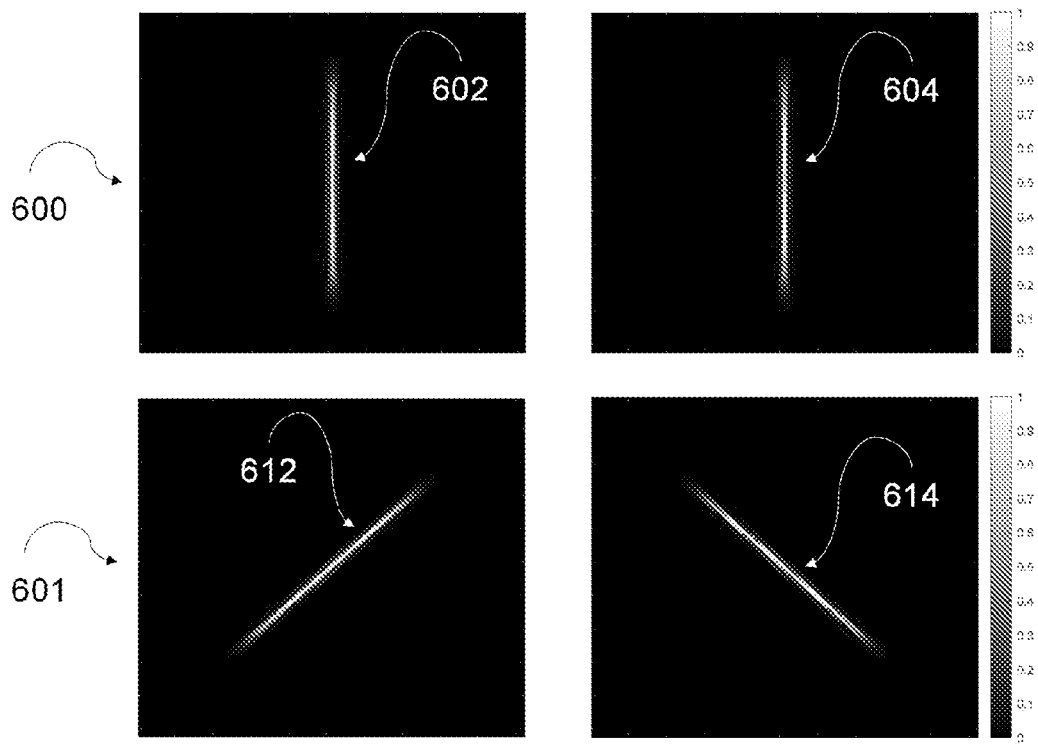
FIG. 6 illustrates the temporally and spatially varying signals over the prescribed periods, depicted as on-axis point spread function at the retinal plane, when the incoming light with a visible wavelength (589 nm) and a vergence of 0 D, is incident on a −3 D myopic model eye corrected with the two pairs of myopia management spectacle lens embodiments described in FIG. 5.

When the incoming light of a visible wavelength (for example, 589 nm) of vergence 0 D, incident on the myopic eye (Table 1) is corrected with two pairs of the exemplary myopia management spectacles 501 and 502 of FIG. 5, the resultant on-axis temporally and spatially varying point spread functions at the retinal plane for Pair 1 and 2 are illustrated in FIG. 6.

The two rows of point spread functions 600 and 601 represent on-axis temporally and spatially varying optical signals to the retina of the wearer, when the pairs of myopia management spectacle lenses described in FIG. 5 are used as per the prescribed care regimen disclosed herein. As can be seen, the first pair of myopia management spectacles 501 provides an astigmatic blur in the vertical meridians (602 and 604) of the retina of the wearer; while the second pair 502 provides an astigmatic blur in the oblique meridians (612 and 614).

Figure 7:
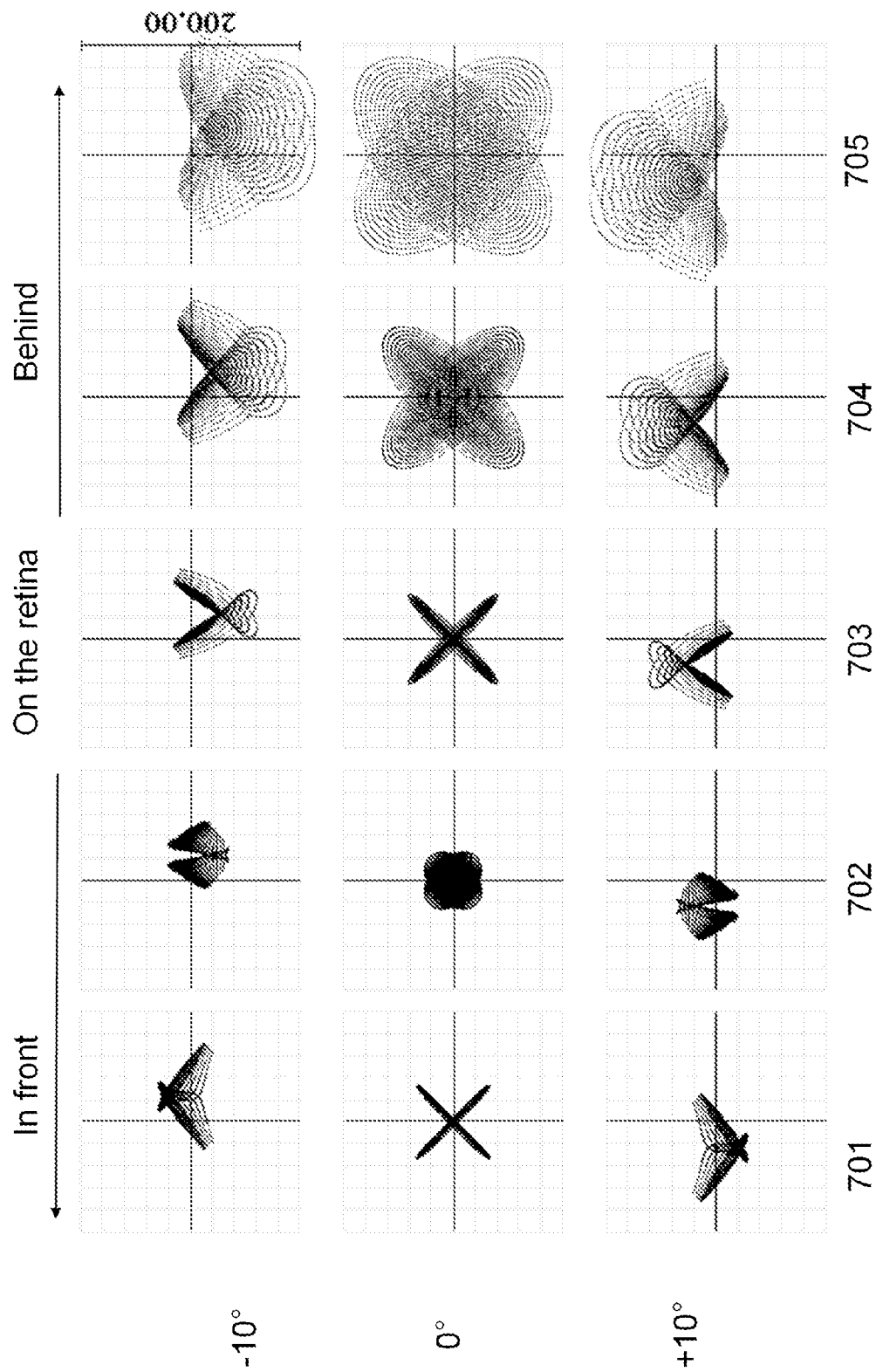
FIG. 7 illustrates a temporally and spatially varying signal, depicted as a wide-angle through-focus spot diagram when the incoming light is incident on a −3 D myopic model eye corrected with the 1st and the $2^{nd}$ pair of the myopia management spectacle lens embodiments described in FIG. 5 over a prescribed period as disclosed herein. The 1st and $3^{rd}$ rows represent off-axis field angles: −10 degrees and +10 degrees, respectively.

FIG. 7 illustrates a temporally and spatially varying signal, depicted as a wide-angle through-focus spot diagram when the incoming light is incident on a right −3 D myopic model eye corrected with two (2) pairs of the myopia management spectacle lenses described in FIG. 5 over the prescribed two (2) periods under the prescribed care regimen. The rows represent optical performance over various field angles: −10 degrees, 0 degree and 10 degrees.

The through-focus spot diagrams of FIG. 7 are representations of a time integral of the optical signals obtained by integrating the resultant responses when the right lenses of the four pairs of spectacle fronts are fitted on a −3 D myopic model eye. The time integral means combining the effects of pairs of myopia management spectacles worn over the prescribed two (2) periods in one through-focus spot diagram representation.

Figure 8:
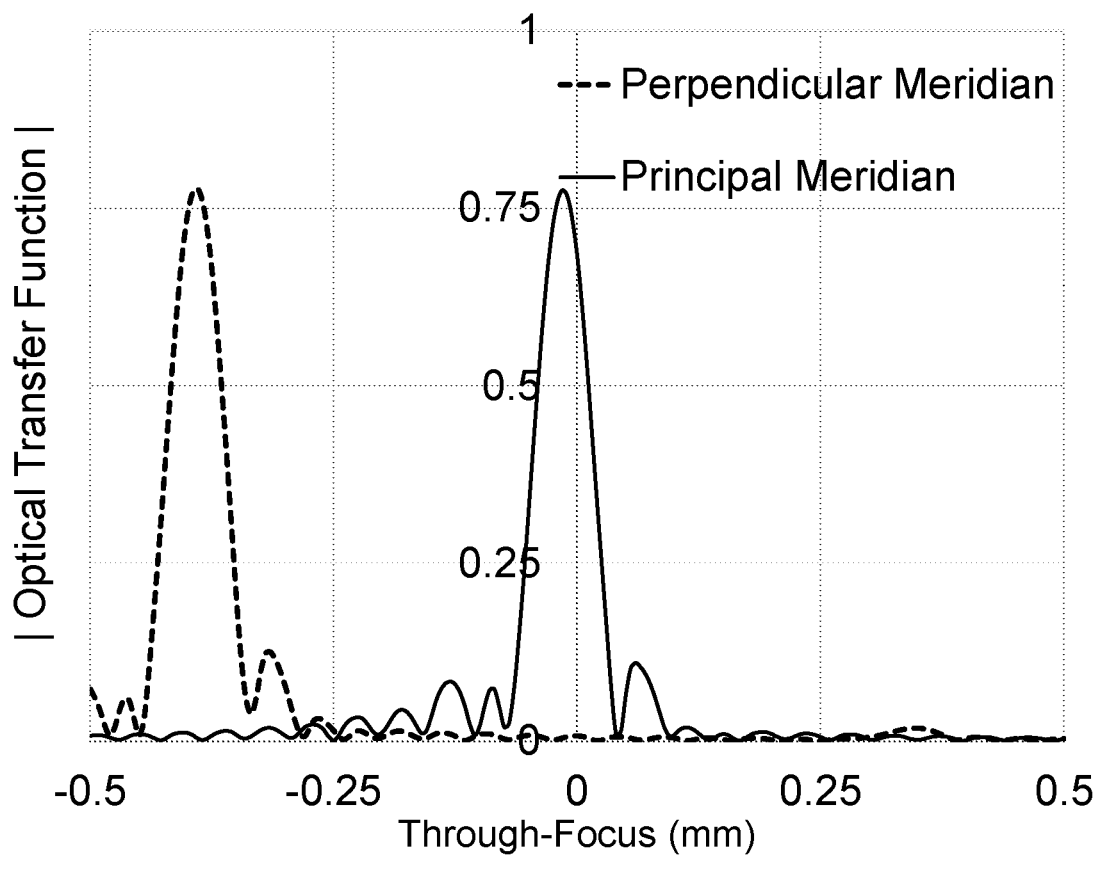
FIG. 8 illustrates the retinal signal depicted as on-axis, through-focus, modulus of the optical transfer function for the principal and perpendicular meridians of the point spread functions of FIG. 6, which was computed when the incoming light with a visible wavelength (589 nm) and a vergence of 0 D, is incident on a −3 D myopic model eye corrected with the pairs of myopia management spectacle lens embodiments described in FIG. 5.

FIG. 8 illustrates the retinal signal depicted as on-axis, through-focus, modulus of the optical transfer function for the principal and perpendicular meridians of the time-varying point spread functions; when the incoming light with a visible wavelength (589 nm) and a vergence of 0 D, is incident on a right −3 D myopic model eye of Table 1 is corrected with the two pairs of spectacle lens embodiment described herein. The through-focus optical transfer function of FIG. 8 represents a time integral of the optical signals obtained by integrating the resultant responses when the right lenses of the two (2) pairs of myopia management spectacle lenses are fitted on a right −3 D myopic model eye. The time integral means combining the effects of pairs of myopia management spectacles worn over the prescribed two (2) periods in one through-focus spot diagram representation.

Figure 9:
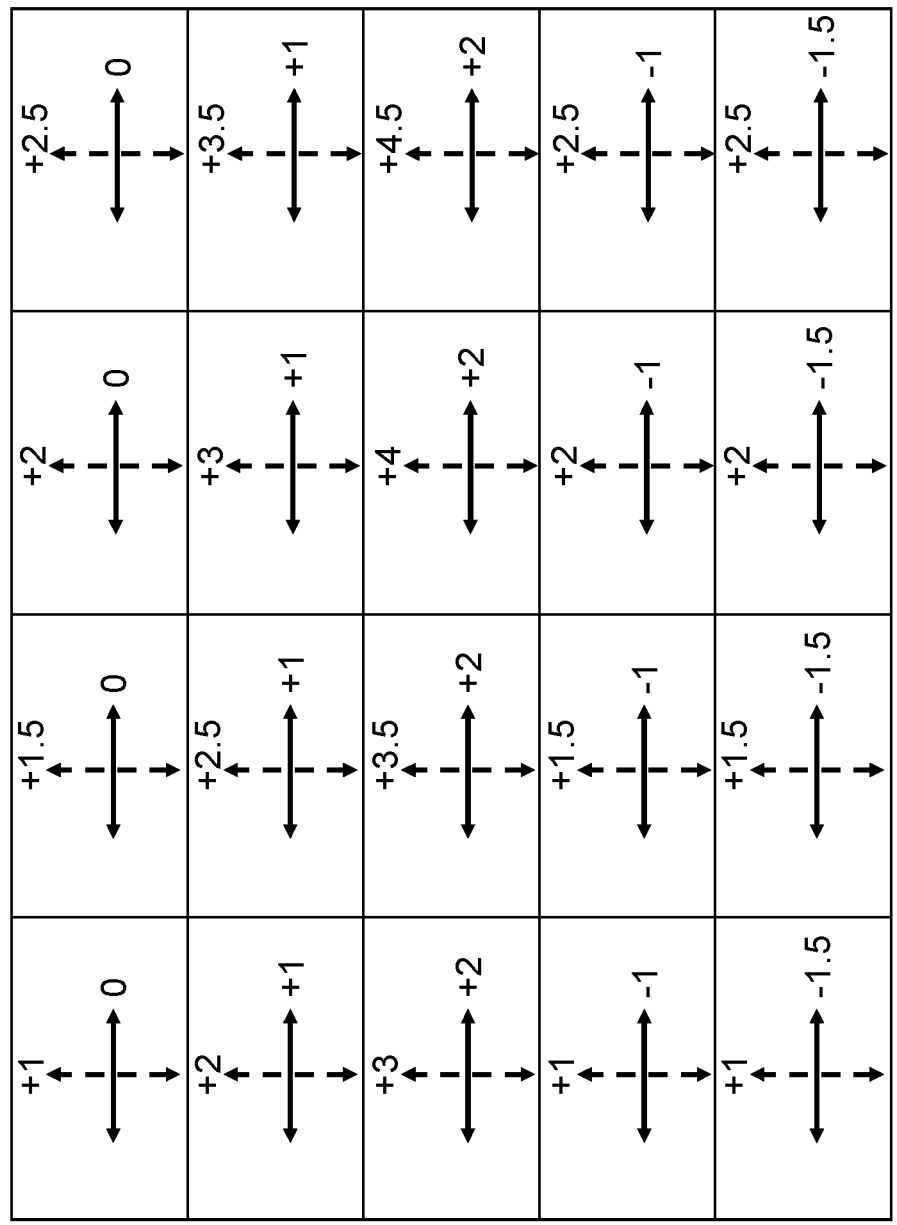
FIG. 9 illustrates a list of 16 non-exhaustive examples of astigmatic or toric prescriptions used in the present invention, represented in the form of a cross-cylinder notation with two principal meridians, wherein the solid line represents the 1st principal meridian with weaker positive power and the dotted line perpendicular to the principal meridian represents the $2^{nd}$ principal meridian with stronger positive power.

FIG. 9 illustrates a sample of sixteen non-exhaustive (16) astigmatic or toric prescriptions contemplated in the present invention disclosure. The toric prescriptions in FIG. 9 are represented in the form of a cross-cylinder notation with two principal meridians, the solid line represents the principal meridian with weaker positive power and the dotted line represents principal meridian with stronger positive power. The sample of sixteen is not to be construed as limiting the scope of the invention disclosure.

Figure 10:
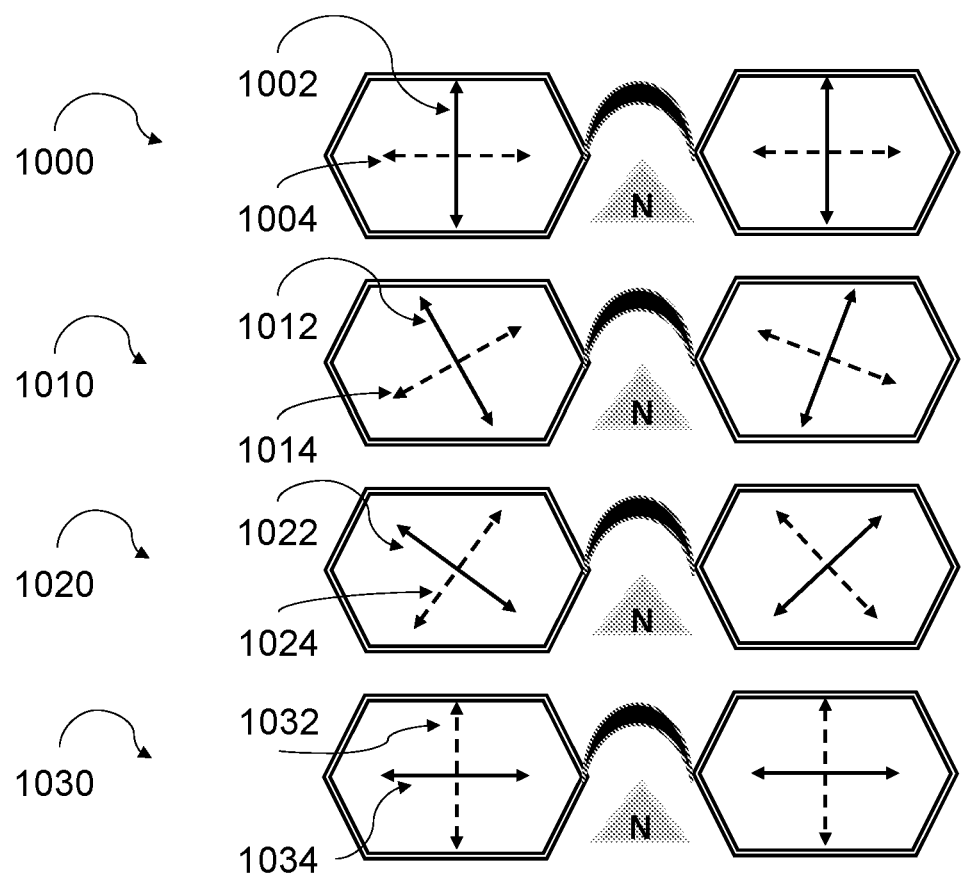
FIG. 10 illustrates a set of four pairs of exemplary auxiliary myopia management spectacle fronts to be used in juxtaposition to a standard pair of single vision spectacle lenses for reducing, inhibiting, or controlling the rate of progression of myopia for an individual as disclosed herein.

FIG. 10 illustrates a set of four pairs of exemplary auxiliary spectacle fronts (1000, 1010, 1020, 1030) to be used in juxtaposition to a standard pair of single vision spectacle lenses for reducing, inhibiting, or controlling the rate of progression of myopia for an individual as disclosed herein.

The auxiliary spectacle fronts of FIG. 10 are configured with astigmatism of varying magnitudes of astigmatism +1 DC to +2.5 DC and varying orientations of cylinder axes in each eye. The astigmatic or toric prescription of pairs of spectacle fronts of FIG. 10 is represented in the form of a cross-cylinder notation using two principal meridians, the solid lines (1002, 1012, 1022, 1032) represent the principal meridians with weaker positive power and the dotted lines (1004, 1014, 1024, 1034) represent the principal meridians with the stronger positive power of the right lenses of the four pairs of exemplary auxiliary spectacle fronts.

For example, in the right lens of the spectacle front the orientations of the cylinder axis in the $1^{st}$, $2^{nd}$, $3^{rd}$, and 4th pairs of spectacle fronts are 0, 30, 60 and 90 degrees, respectively. In the left lens of the spectacle front, the axis of cylinder power in the $1^{st}$, $2^{nd}$, $3^{rd}$, and 4th pairs of spectacle fronts are 180, 150, 120 and 90 degrees, respectively. The 4 four pairs of auxiliary spectacle fronts (1000, 1010, 1020, 1030) are prescribed to be used over different periods. For example, changing each pair of auxiliary spectacle fronts every day, two days, three days, 4 days, 5 days, 7 days, 10 days, 14 days, or 21 days.

Figure 11:
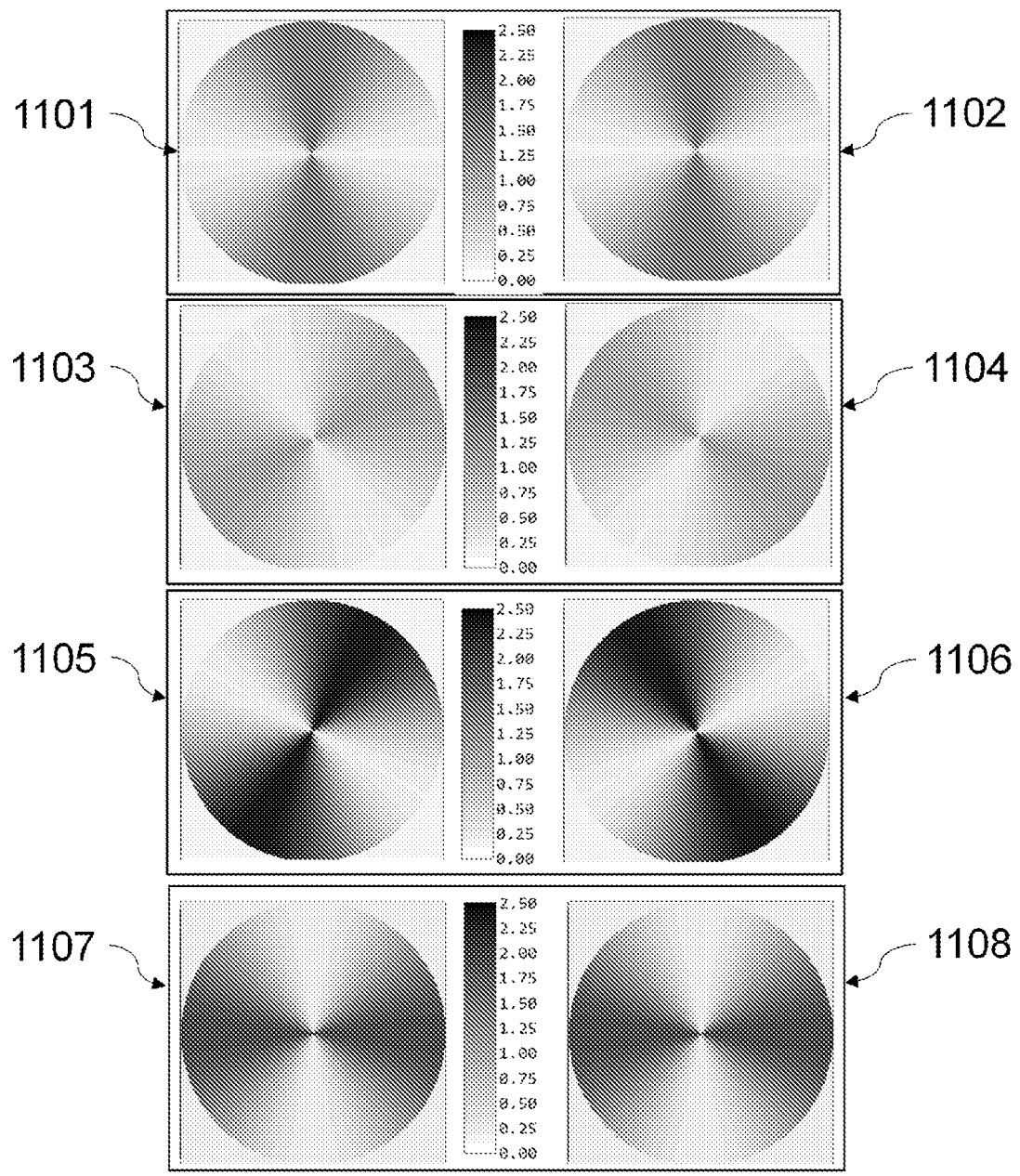
FIG. 11 illustrates power maps of the set of four pairs of exemplary auxiliary myopia management spectacle fronts to be used in juxtaposition to a standard pair of single vision spectacle lenses for reducing, inhibiting, or controlling the rate of progression of myopia for an individual as disclosed herein.

FIG. 11 illustrates in detail the power maps of the set of four pairs of exemplary auxiliary spectacle fronts (1000, 1010, 1020, 1030) to be used in juxtaposition to a standard pair of spectacle lenses for reducing, inhibiting, or controlling the rate of progression of myopia for an individual as disclosed herein. The prescriptions of the right eyes of four pairs of exemplary spectacle fronts (1000, 1010, 1020, 1030) illustrated in FIG. 10, are: $1^{st}$ pair: plano/+1.5 DC×180 (right, 1101); $2^{nd}$ pair: plano/+1 DC×120 (right eye, 1103), $3^{rd}$ pair: plano/+2.5 DC×150 (right eye, 1105) and 4th pair: plano/+2 DC×90 (right eye, 1107). The prescriptions of the left eyes of four pairs of exemplary spectacle fronts (1000, 1010, 1020, 1030) illustrated in FIG. 10, are: 1st pair: plano/+1.5 DC×180 (left, 1102); $2^{nd}$ pair: plano/+1 DC×60 (right eye, 1104), $3^{rd}$ pair: plano/+2.5 DC×30 (right eye, 1106) and 4th pair: plano/+2 DC×90 (right eye, 1108).

Figure 12:
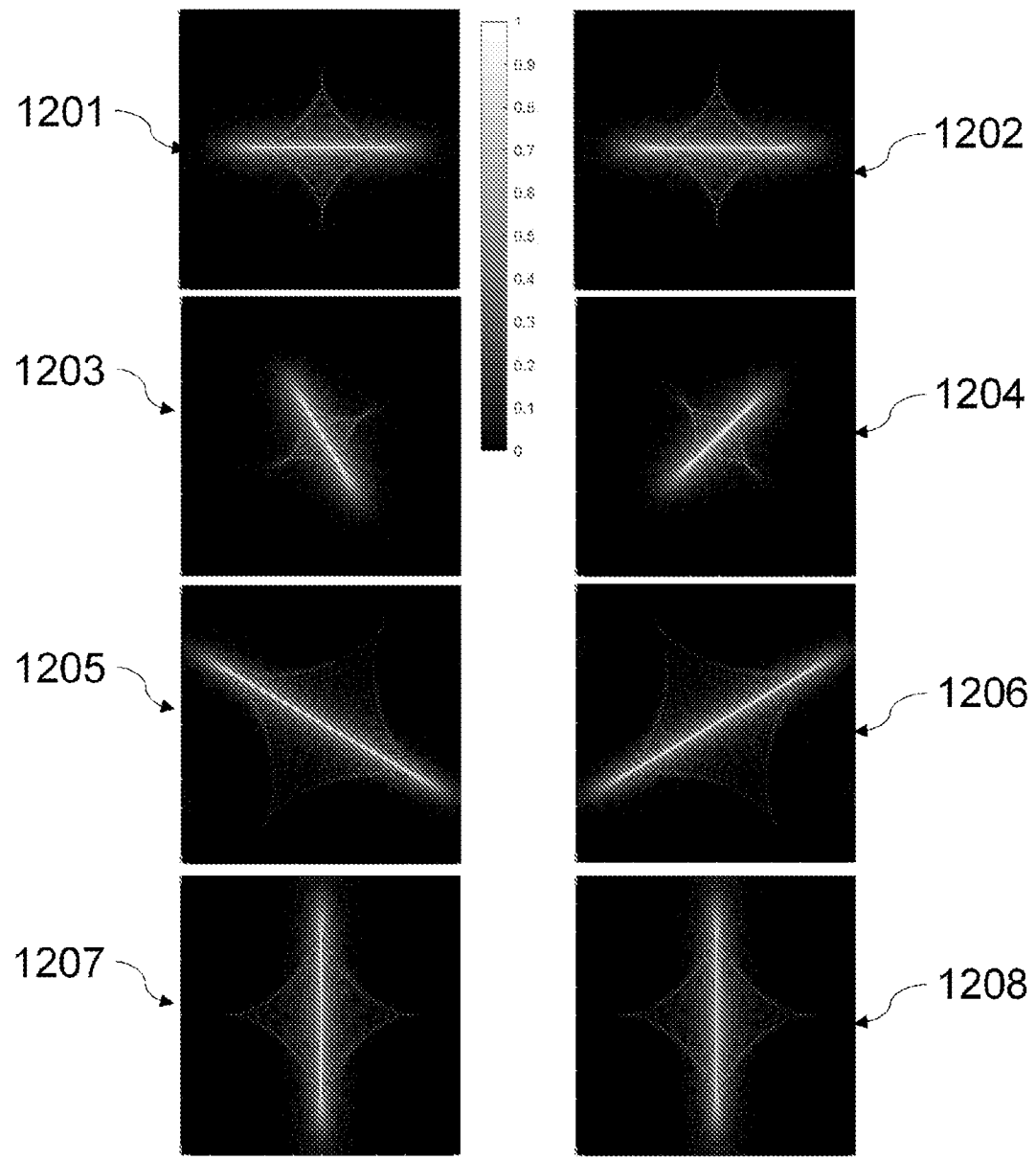
FIG. 12 illustrates the temporally and spatially varying signal over the prescribed periods, depicted as on-axis point spread function at the retinal plane, when the incoming light with a visible wavelength (589 nm) and a vergence of 0 D, is incident on a −3 D myopic model eye corrected with the four pairs of auxiliary myopia management spectacle fronts used in juxtaposition to a standard pair of single vision spectacle lenses described in FIG. 10.

When the set of four (4) pairs of the spectacle fronts (1000, 1010, 1020, 1030) described in FIG. 10 are used in juxtaposition with standard single vision spectacle lenses used to correct myopia with or without astigmatism, the resultant temporally and spatially varying optical signal obtained by integrating the response over the four prescribed periods is illustrated in FIG. 12. The depicted on-axis retinal point spread functions for the right eye (1201, 1203, 1205, 1207) and the left eye (1202, 1204, 1206, 1208) were computed when the incoming light with a visible wavelength (589 nm) and vergence of 0 D, is incident on a −3 D myopic model eye corrected with the four pairs of auxiliary spectacle fronts (1000, 1010, 1020, 1030) described in FIG. 10 under the prescribed care regimen.

Figure 13:
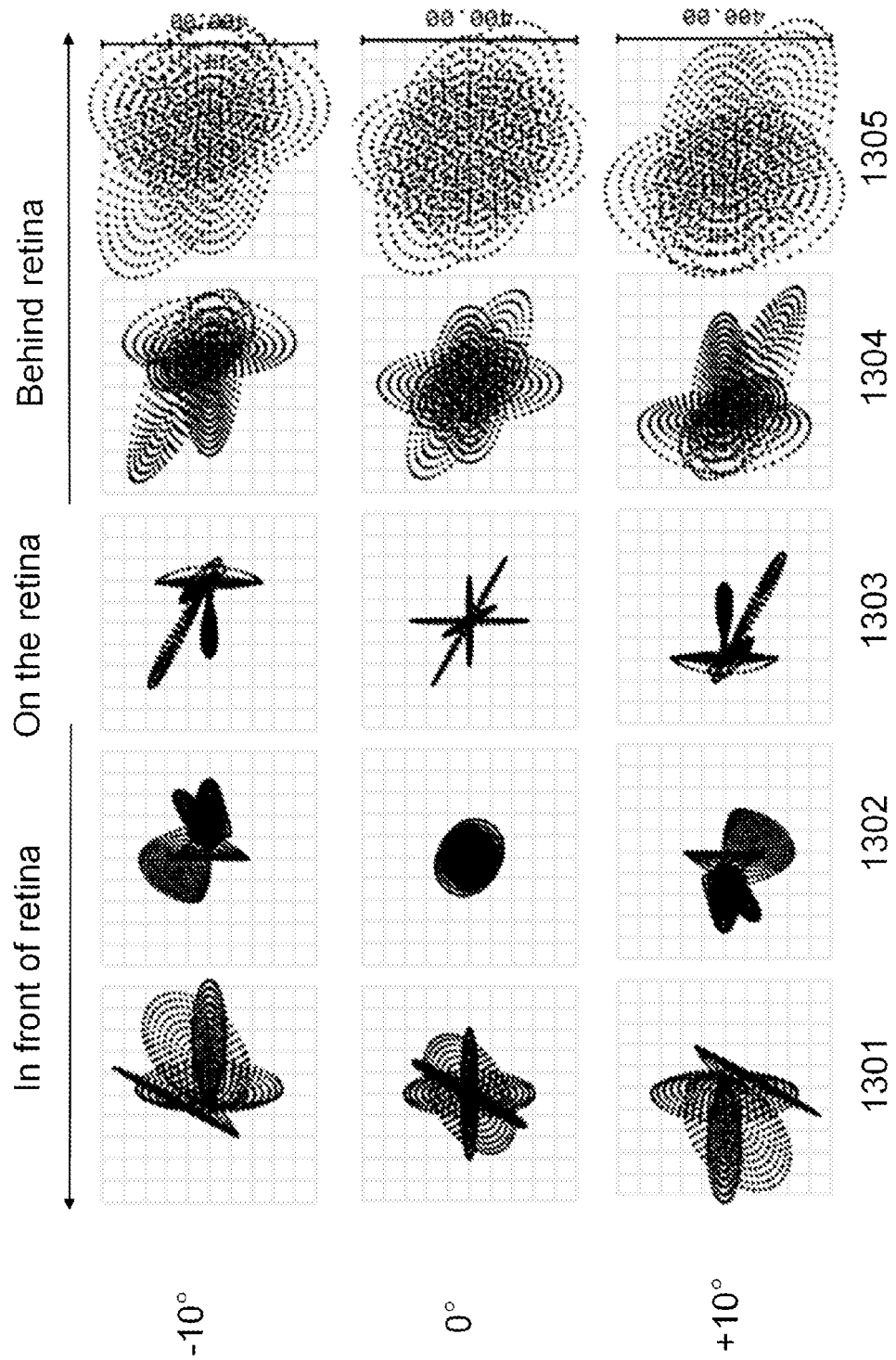
FIG. 13 illustrates a temporally and spatially varying signal, depicted as a wide-angle through-focus spot diagram when the incoming light is incident on a −3 D myopic model eye corrected with four pairs of the auxiliary myopia management spectacle fronts used in juxtaposition to a standard pair of single vision spectacle lenses described in FIG. 10 over the prescribed period as disclosed herein. The $2^{nd}$ row represents on-axis field angle 0 degrees and the 1st and $3^{rd}$ rows represent off-axis field angles: −10 degrees and +10 degrees.

FIG. 13 illustrates a temporally and spatially varying signal, depicted as a wide-angle through-focus spot diagram when the incoming light is incident on a right −3 D myopic model eye corrected with four (4) pairs of the spectacle fronts described in FIG. 10 over the prescribed four (4) periods under the prescribed care regimen. The rows represent optical performance over various field angles: −10 degrees, 0 degree and 10 degrees.

The through-focus spot diagrams of FIG. 13 are representations of a time integral of the optical signals obtained by integrating the resultant responses when the right lenses of the four pairs of spectacle fronts are fitted on a −3 D myopic model eye. The time integral means combining the effects of pairs of myopia management spectacles worn over the prescribed four (4) periods in one through-focus spot diagram representation.

Figure 14:
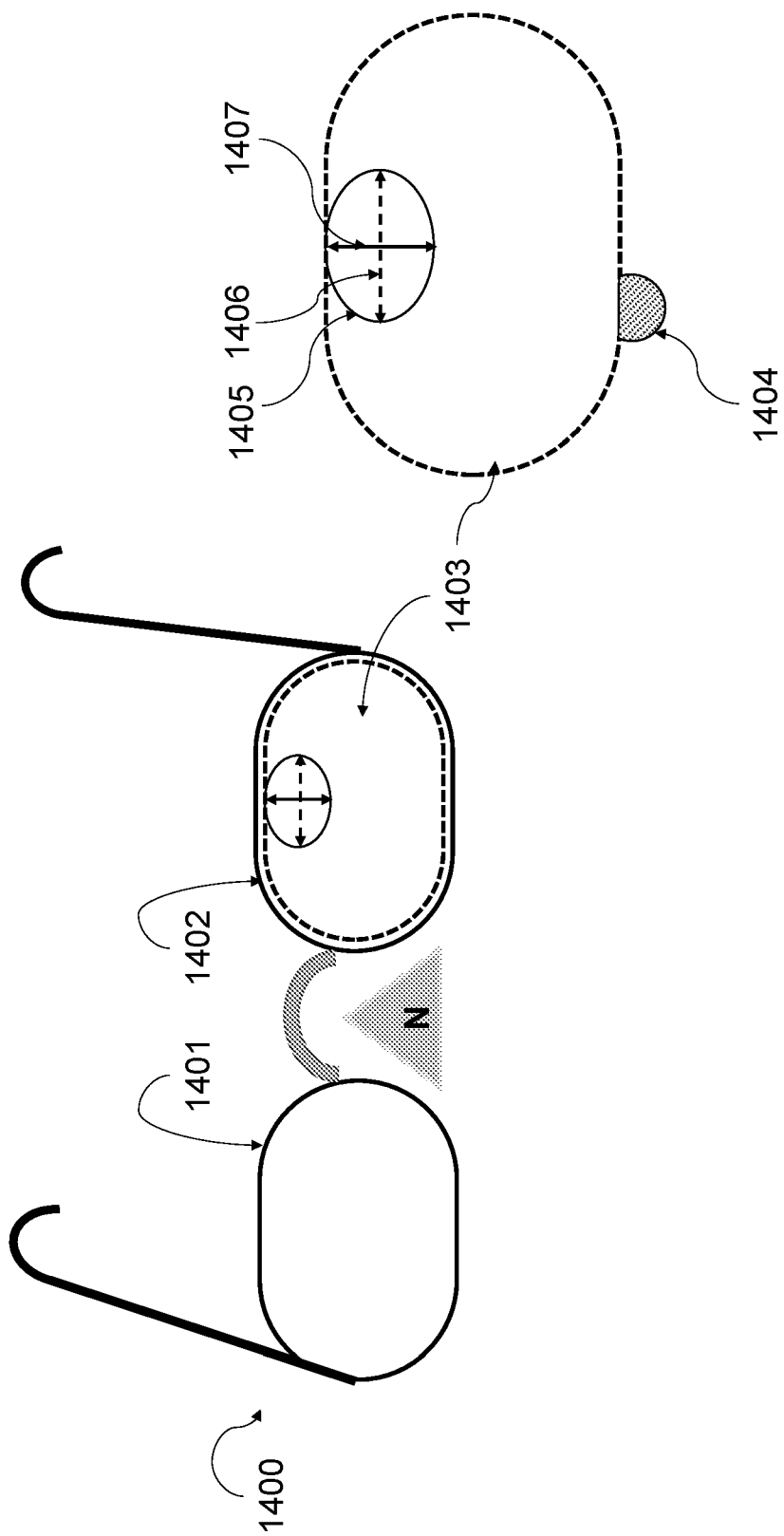
FIG. 14 illustrates a standard pair of single vision spectacles used for correction of myopia to which an auxiliary optical sheet or film (from the kit or set disclosed herein) is applied over substantially the entire surface area of the left spectacle lens to convert the left lens of the said standard pair of single vision spectacles to a myopia management spectacle lens, wherein methods of the dispensing the auxiliary optical sheets or films are described herein.

FIG. 14 illustrates a standard pair of spectacles used for correction of myopia to which an auxiliary optical sheet or film drawn from the kit or set disclosed herein, is applied over substantially the entire surface area of the left spectacle lens to convert the said standard pair of single vision spectacles to a pair of myopia management spectacles, wherein methods of dispensing the auxiliary optical sheet or film are described herein.

The left portion of FIG. 14 shows a pair of standard single vision spectacle lenses 1400 with a right (1401) and left lens (1402) that may be used to correct the myopic refractive error with or without astigmatism.

The right portion of FIG. 14 shows an exemplary embodiment including an optical film or sheet designed to substantially cover the left lens 1402 shown by dotted borders; wherein the optical film or sheet is configured with substantially plano power across the optical film or sheet and one elliptical optical element 1405 configured such that the optical element falls in the superior region of the left lens of the spectacle lens.

The optical film or sheet may be peeled using the 1404 portion of the film allowing it to be placed on the spectacle.

In this example, the major and minor axes of the elliptical optical element are approximately 4 mm and 3 mm, respectively. The elliptical optical element is configured with astigmatic or toric power distribution denoted by two principal meridians, the dotted line 1406 and the solid line 1407.

In some examples, the impermanent auxiliary optical film or sheet configured at least one elliptical optical elements of the present invention includes an adhesive backing to adhere the optical sheet or film to the standard single vision spectacle lens. The impermanent adhesive backing may be a peel-able, a self-sticking, or any other suitable adhesive means to adhere to the impermanent auxiliary optical film or sheet to the standard single vision spectacle lens. In some other examples, the impermanent auxiliary optical film or sheet may be configured with at least two or three optical elements; each having the astigmatic or toric power distribution of the present invention.

FIG. 15 illustrates an array of ready-made impermanent auxiliary optical sheets or films enclosed in the kit or set disclosed herein which are suitable for use over the entire surface area of a standard pair of single vision spectacles described in FIG. 14 over the prescribed periods (1 to 6) described herein.

In the example of FIG. 15, the right and left portions of the set or kit involving optical films or sheets are configured with one elliptical optical element characterised by astigmatism or toric power distribution disclosed herein. In this example, the varying positions or locations of the optical element within the optical film or sheet and its application on the standard single vision spectacle lens used for the correction of myopia provides a temporally and spatially varying optical stop signal or stimulus to the eye.

In the example of FIG. 15, the dimensions of the individual elliptical optical elements within the set or kit of optical sheets vary between 3 mm and 6 mm in the major axis and between 2 mm and 4 mm in the minor axis dimension.

In these examples, the astigmatic power distribution within each of the optical elements is noted with two principal meridians, the bold line representing weaker positive meridional power and dotted lines representing stronger positive meridional power.

In other examples, the notation of the positive and negative meridional power may be different. In the example of FIG. 15, the elliptical optical element configured within the optical film that is to adhere to the standard single vision spectacle lenses overlaying substantially the entire lens is configured in various locations.

For example, in the $1^{st}$ period of FIG. 15, the right and left optical films have the individual optical elements configured inferiorly and superiorly, respectively. In the $2^{nd}$, $3^{rd}$, and $4^{th}$ periods, the right and left optical films have the optical elements configured temporally and nasally, respectively.

In the 5th period, the right and left optical films have the optical elements configured inferio-temporally and superior-nasally, respectively. In the 6th period, the right and lens optical films have the optical elements configured centrally overlying on the optical centre of the single vision spectacle lens.

Further, in the first two periods of FIG. 15, the axis or orientation of astigmatism denoted by the stronger principal meridian (dotted line) is configured to be in the horizontal direction. In the $3^{rd}$ and $6^{th}$ periods of FIG. 15, the axis or orientation of astigmatism denoted by the stronger principal meridian (dotted line) is configured to be in the vertical direction.

In the $4^{th}$ and $5^{th}$ periods of FIG. 15, the axis or orientation of astigmatism denoted by the stronger principal meridian (dotted line) is configured to be in the oblique direction. In some other examples, the dimensions of individual elliptical optical elements within the set or kit of optical sheets may vary between 3 mm and 8 mm in the major axis, and between 1 mm and 3 mm in the minor axis dimension.

Figure 16:
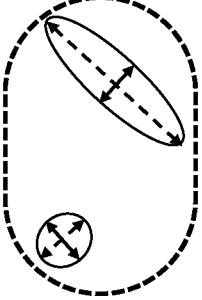
FIG. 16 illustrates another array of ready-made impermanent auxiliary optical sheets or films enclosed in the kit or set disclosed herein which are suitable for use over substantially the entire surface area of a standard pair of spectacle lenses described in FIG. 14 over the prescribed periods 1 to 6 described herein.

FIG. 16 illustrates another array of ready-made impermanent auxiliary optical sheets or films enclosed in the kit or set which are suitable for use over substantially the entire surface area of a standard pair of single vision spectacles described in FIG. 14.

The optical films or sheets of FIG. 16 are configured to be used over six (6) different wearing periods described herein.

In the example of FIG. 16, the exemplary embodiments including a set or kit of impermanent auxiliary optical films or sheets designed to substantially cover the right and left lenses of standard pair of single vision spectacles used for correction of myopia in FIG. 14; wherein the optical film or sheet is configured with substantially plano power across the optical film or sheet and further configured with at least two elliptical optical elements within the optical film or sheet. The optical film or sheet may be peeled allowing it to be placed on the appropriate single vision spectacle lens, right or left. In some examples, the six (6) wearing periods described in FIGS. 15 and 16 may be every day of the week, for example, Monday to Saturday, or Sunday to Friday. In some other example, the six (6) wearing periods may be every alternate day of the week; while in some other example, the six (6) wearing periods may include a specific day of the month, for example, $1^{st}$, $5^{th}$, $10^{th}$, $15^{th}$, $20^{th}$ and $25^{th}$ of every month.

Figure 17:
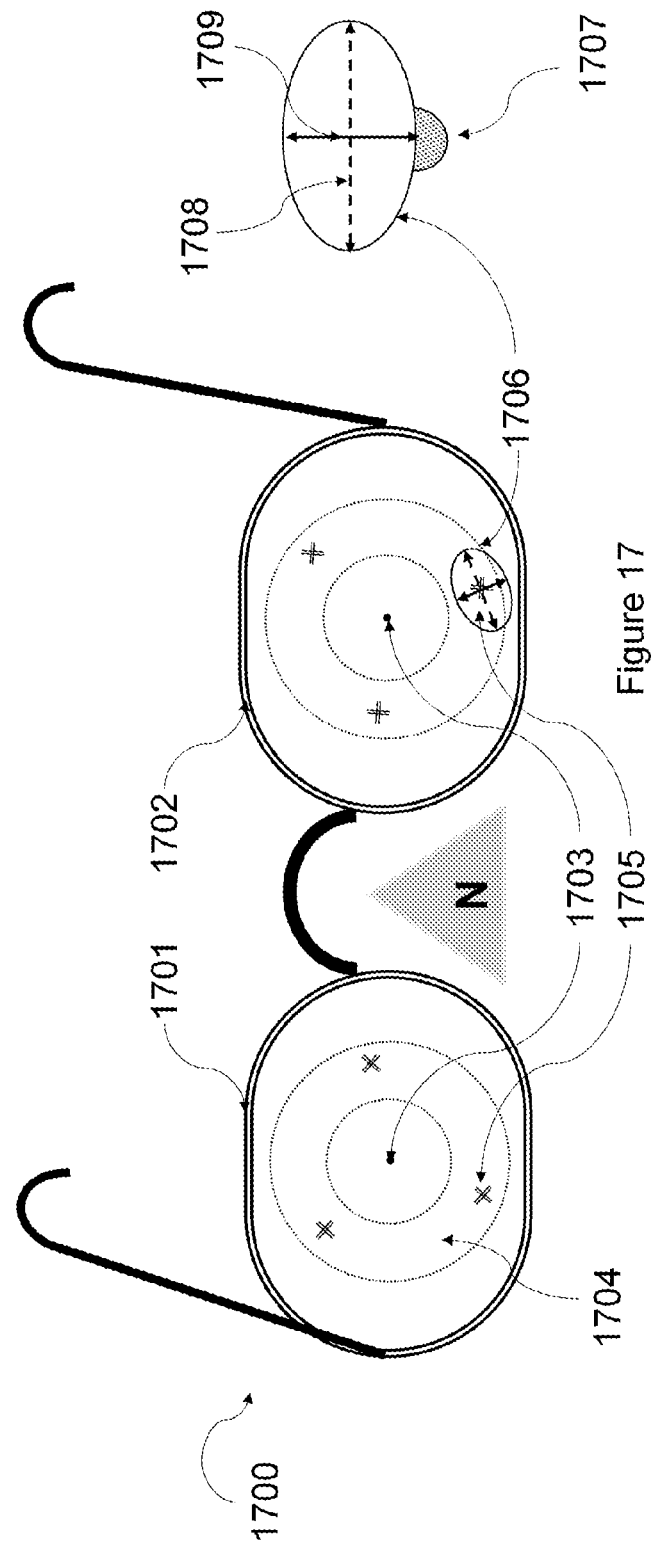
FIG. 17 illustrates another standard pair of single vision spectacles used for correction of myopia to which an auxiliary optical sheet or film from the kit or set disclosed herein is applied over a regional surface area of the standard single vision spectacle lens to convert the said standard pair of single vision spectacles to a pair of myopia management spectacles, wherein methods of the dispensing the auxiliary optical sheet or film are described herein.

FIG. 17 illustrates another standard pair of single vision spectacles used for correction of myopia to which an impermanent auxiliary mini optical elements is applied over only a regional area of the spectacle lens to convert the said standard pair of single vision spectacles to a pair of myopia management spectacles, wherein methods of the dispensing the impermanent auxiliary mini optical elements are described herein. In this example, the left portion of FIG. 17 shows a pair of standard spectacle lenses 1700 with a right 1701 and left lens 1702 that may be used to correct the myopic refractive error with or without astigmatism. The optical centres of the right and left lenses are denoted by 1703.

A region of interest on the spectacle lens 1704 may be identified by marking an inner and outer border depicted in dotted lines. Further, some locations may be identified as areas where the optical elements are to be placed, denoted as crosses that may be engraved within the matrix of the single vision spectacle lens for ease of locating the markings, for example, 1705. The right portion of FIG. 17 shows an exemplary embodiment including a mini optical element to be placed on a selected region of the right lens marked by a cross 1705 and exemplified using solid borders; wherein the mini optical element is configured such that the optical element falls in the inferior region of the right single vision spectacle lens. The mini optical element may be peeled using the 1707 portion allowing it to be placed on the single vision spectacle.

Figure 18:
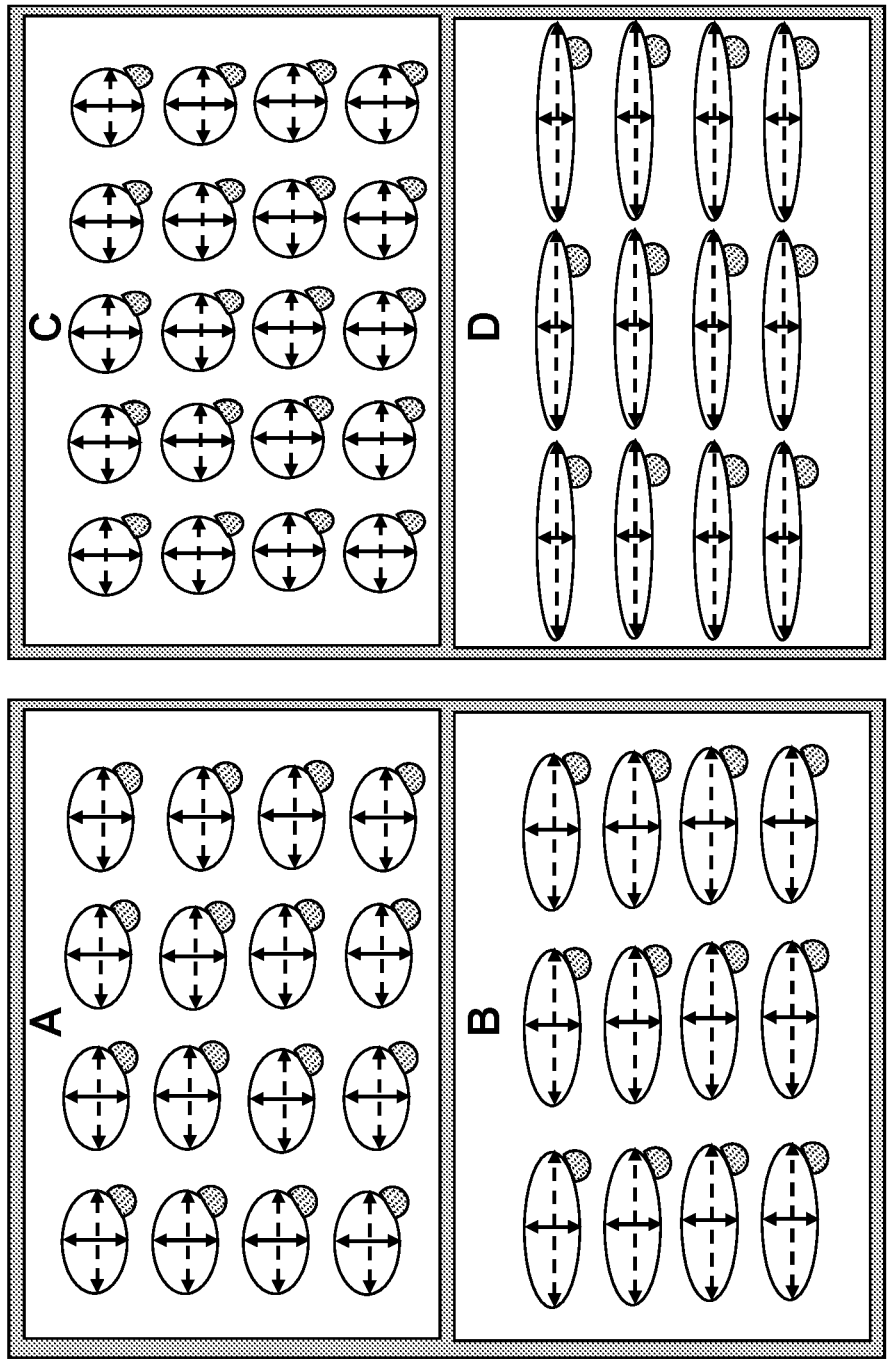
FIG. 18 illustrates an array of ready-made impermanent auxiliary optical sheets or films enclosed in multiple subsets within the kit or set disclosed herein which are suitable for use over the regional surface area of a standard pair of single vision spectacles described in FIG. 17 in a prescribed location over the prescribed periods as described herein.

FIG. 18 illustrates an array of optical sheets or films comprising ready-made impermanent auxiliary mini optical elements enclosed in multiple subsets within the kit or set configured for four (4) different periods. The mini optical elements are suitable for use only over a regional area on a standard pair of spectacles described in FIG. 17. For example, the set A of FIG. 18 has an elliptical optical element with a major and minor axis dimension of 4 and 3 mm, respectively.

In this example of FIG. 18, the set C has a circular optical element with 3 mm diameter. In this example, the set B of FIG. 18 has an elliptical optical element with a major and minor axis dimension of 5 and 3 mm, respectively and the set D of FIG. 18 has elliptical optical elements with a major and minor axis dimension of 7 and 3 mm, respectively.

In this example of FIG. 18, a specific or prescribed location on the spectacle lens may be defined using laser engravings made onto the spectacle lens in form of a dot, line, or a cross-shaped pattern. Further, the method of prescribing the set or kit includes the wearer to stick or adhere to the mini optical element in the specified region of the spectacle lens over the specified period.

FIG. 19 illustrates the use of mini optical elements described in set A to D of FIG. 18, each comprising an array of ready-made impermanent auxiliary mini optical elements of similar designs. In this example, in the first period, the mini optical elements of set A and B are configured on the selected regions of the left and right spectacle lenses used for the correction of myopia with or without astigmatism, In this example, the symmetry along the ordinate was maintained.

In the second period, the mini optical elements were drawn from only set B and are configured on the selected regions of the left and right spectacle lenses, with the symmetry along the ordinate was maintained. In the third period, the mini optical elements were all drawn from only set B of FIG. 18 and are configured on the selected regions of the left and right spectacle lenses, with the symmetry along the ordinate was maintained. In the fourth prescribed period, the mini optical elements were all drawn from sets B and D of FIG. 18 and are configured on the selected regions of the left and right spectacle lenses, symmetry along the ordinate was not maintained.

In the fifth period, three mini optical elements were all drawn from only set A of FIG. 18 and are configured on the selected regions of the left and right spectacle lenses, maintain the symmetry along the ordinate; the elements were configured so that the principal meridians were arranged in the horizontal/vertical dimension.

In the sixth period, three mini optical elements were all drawn from only set A of FIG. 18 and are configured on the selected regions of the left and right spectacle lenses, maintain the symmetry along the ordinate; the elements were configured so that the principal meridians were arranged in the oblique dimension.

Figure 20:
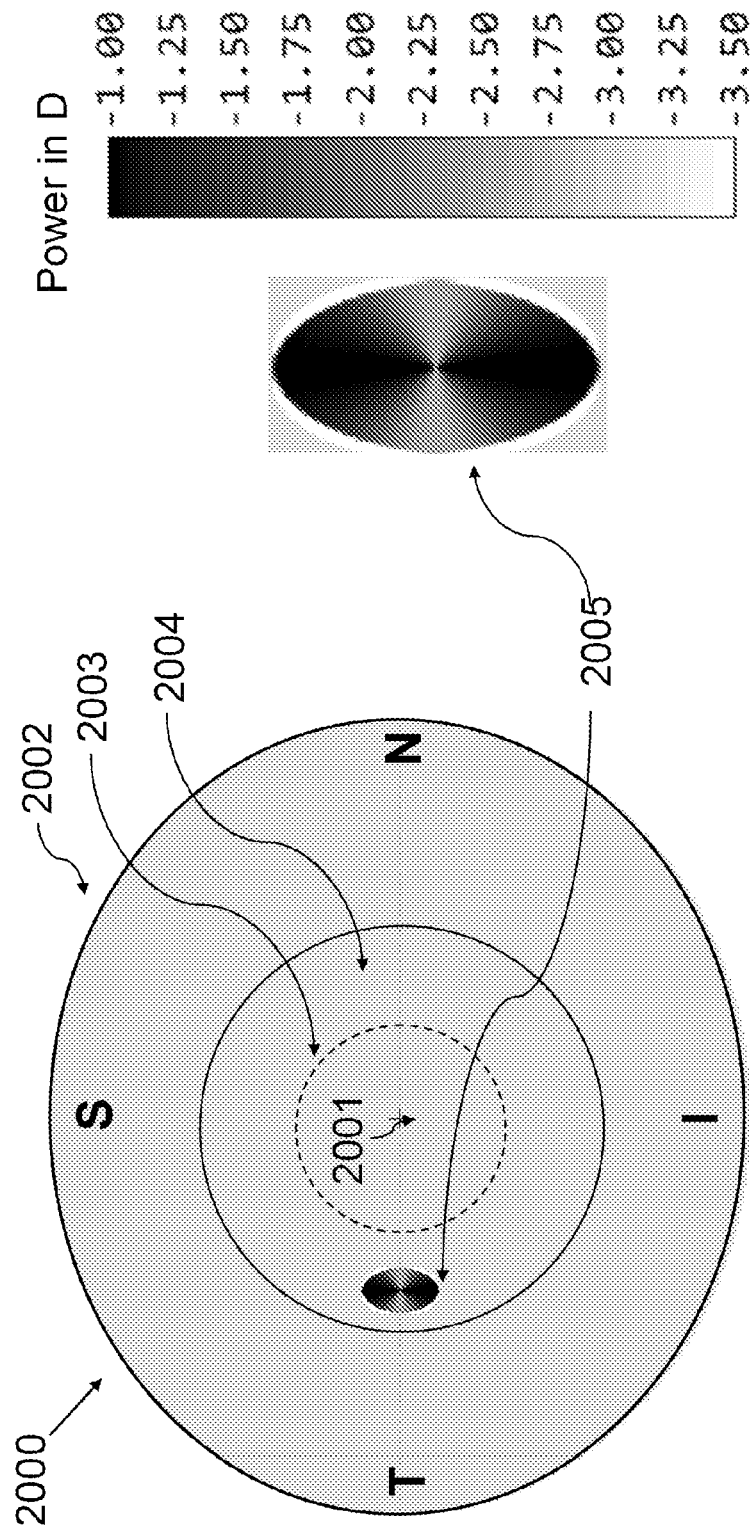
FIG. 20 illustrates a standard single vision spectacle blank cut into an elliptical-shaped lens with minor axis diameter of 20 mm and major axis diameter of 25 mm configured with an auxiliary optical element or film drawn from the kit or set disclosed herein.

FIG. 20 illustrates a standard single vision ready-made spectacle blank, ordinarily used for correction of myopia with or without astigmatism, cut into an elliptical-shaped lens 2000 to fit a spectacle frame with dimensions of a minor diameter of 20 mm and major diameter of 25 mm. The said spectacle lens 2000 configured with an impermanent auxiliary mini optical element 2005, comprising of astigmatic or toric power distribution, the element is drawn from the kit or set C disclosed in FIG. 18.

In this example, the standard spectacle lens is configured with a region of interest defined about the optical centre 2001 with an inner diameter of approximately 8 mm represented by dotted lines 2003 and an outer diameter of approximately 15 mm represented by solid line 2002 forming a region of interest 2004 identified for positioning said the impermanent auxiliary mini optical element. The standard single vision ready-made spectacle blank of FIG. 20 has a base prescription of −3 D used to correct −3 D of myopia in an eye.

The said impermanent auxiliary mini optical element 2005 is located approximately 5 mm away from the geometric centre (2001) of the spectacle lens 2000. The said impermanent auxiliary mini optical element 2005 is configured with +1.5 DC of astigmatic power, denoted by two principal power meridians, −2.5 D along the naso-temporal direction of the standard spectacle lens and about −1 D along the superio-inferior direction of the standard spectacle lens. The superior, temporal, inferior and nasal portions on the standard spectacle lens are denoted by characters S, T, I and N, respectively.

Figure 21:
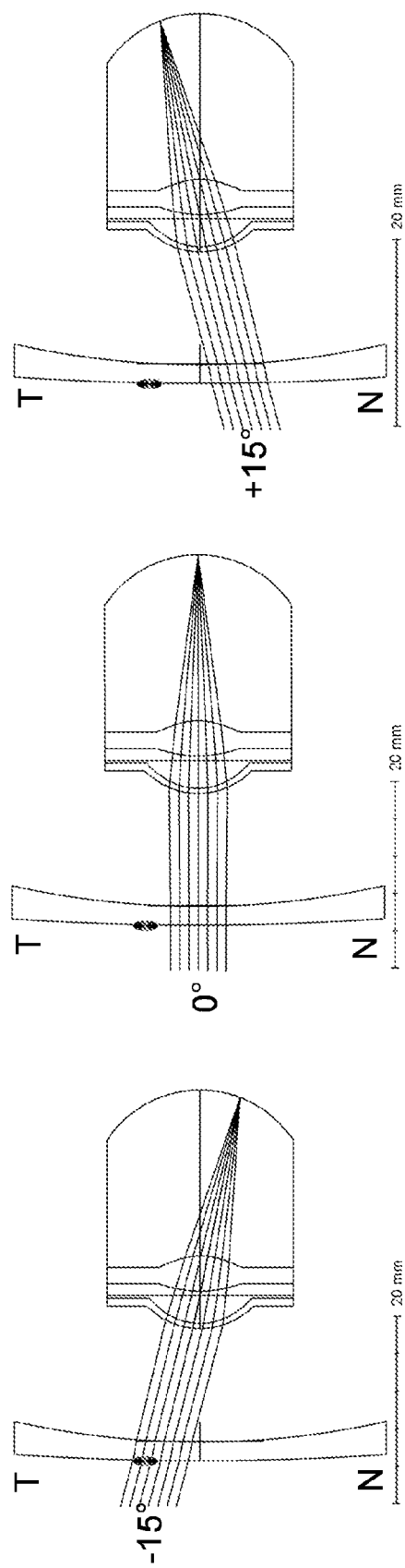
FIG. 21 illustrates a wide-field ray tracing schematic diagram of a right −3 D myopic eye corrected with the exemplary embodiment described in FIG. 20; the ray tracing schema encompassing three visual field angles for the spectacle wearer: temporal field angle (−15.0 degrees), central field angle (0.0 degrees) and nasal field angles (15.0 degrees).

FIG. 21 illustrates a wide-field ray tracing schematic diagram of a −3 D myopic eye corrected with the exemplary embodiment described in FIG. 20; the ray tracing schema encompassing three visual field angles when the spectacle lens is used in conjunction with the model eye of Table 1. The representing ray bundles of light going through (a) the temporal portion of the lens (−15, 0); (b) central portion of the lens (0,0); and (c) the nasal portion of the lens (15,0).

As seen from FIG. 21, the only ray bundle through a temporal portion of the lens encounters the said impermanent auxiliary mini optical element 2005 providing the desired optical stop signal at the corresponding retinal location. The ray bundles going through the central and nasal portion of the spectacle lens do not impose any optical stop signal at the desired retinal location.

Figure 22:
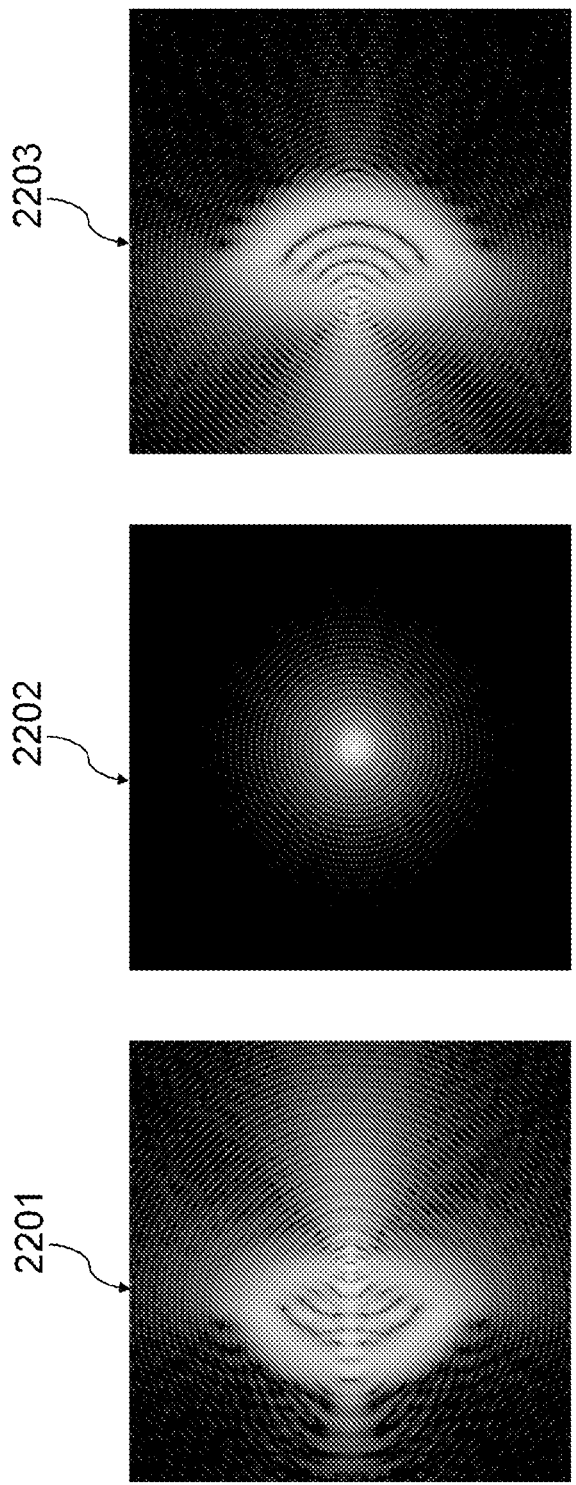
FIG. 22 illustrates point spread functions over a wide-field view when the incoming light is incident on a right −3 D myopic model eye corrected with the exemplary embodiment described in FIG. 20. The three-point spread functions represent three visual field angles when the light goes through, (a) the second region located temporally on the spectacle lens (−15.0 degrees), (b) central field (0.0 degrees), and (c) when incident light goes through the nasal field angle (15.0 degrees).

FIG. 22 illustrates point spread functions over a wide-field view when the incoming light is incident on a −3 D myopic model eye corrected with the exemplary embodiment described in FIG. 20.

As seen from FIG. 22, the ray bundle going through the impermanent auxiliary mini optical element 2005 produces a point spread function 2201 that is affected by additional astigmatic or toric power distribution within the mini element producing the desirable directional cue or optical stop signal compared to 2203 which is formed when the ray bundle is going through the spectacle lens portion devoid of the mini optical element. The central ray bundle going through the base spectacle lens produces an ideal point spread function 2202.

Figure 23:
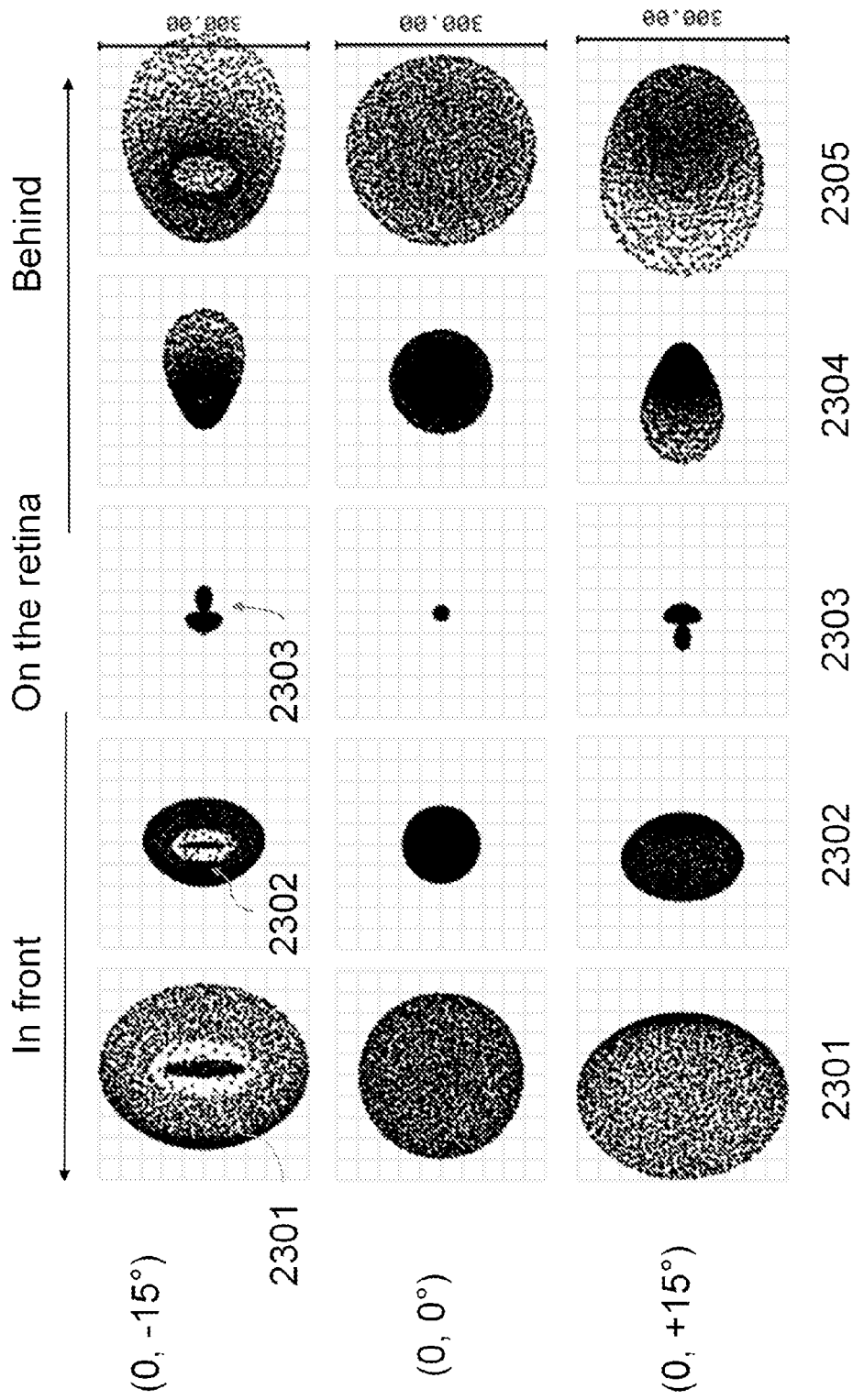
FIG. 23 illustrates a temporally and spatially varying signal, depicted as a wide-angle through-focus spot diagram when the incoming light is incident on a right −3 D myopic model eye corrected with an exemplary embodiment described in FIG. 20. The performance is represented at various field angles: 1st row represents −15 degrees temporal field angle; $2^{nd}$ row represents central field angle 0 degrees; and $3^{rd}$ row represents 15 degrees nasal field angle.

FIG. 23 illustrates a spatially varying signal, depicted as a wide-angle through-focus spot diagram. When the incoming light of a visible wavelength is incident on a −3 D myopic model eye corrected with one exemplary embodiment described in FIG. 20, the optical performance of the spectacle lens in conjunction with the model eye of Table 1 is represented over various field angles.

The rows represent the through focus spot diagram formed when a ray bundle goes through three distinct regions of the spectacles: (a) the first row represents through-focus spot diagram when the incoming ray bundle passes through the impermanent auxiliary mini optical element located temporally on the spectacle lens; (b) the second row represents data obtained when incoming ray bundle passes through the central portion of the spectacle lens free of auxiliary mini optical elements and (c) the $3^{rd}$ row showcases data obtained when the incoming ray bundle passes through the nasal portion of the spectacle lens free of auxiliary optical elements.

As seen from FIG. 23, the ray bundle going through the impermanent auxiliary mini optical element produces a conoid of Sturm comprising elliptical tangential 2301 and sagittal 2302 blur patterns substantially in front of the regional retina. However, when the incoming light passes through either the central or the nasal portion of the spectacle lens, i.e. regions substantially free of the mini optical elements, no distinct conoid of Sturm is observed either in front or about the retina.

In this example, the length, position, and orientation of the conoid of Sturm contributes to the directional cues or optical stop signals to reduce the rate of myopia progression in a wearer. In some embodiments, the astigmatic power of the mini optical element and the location on the single vision spectacle lens is optimised to retain the entire conoid of Sturm in front of the peripheral retina, while in other embodiments, the optimisation of said properties of the mini optical element may position the conoid of Sturm about the retina with tangential and sagittal planes straddling the retina.

The prescribed method of changing the position of the mini optical elements on the single vision spectacle lenses provides temporal and spatial variation to the directional cues or stop signals; such that the efficacy of myopia management may be maintained constant over time.

Figure 24:
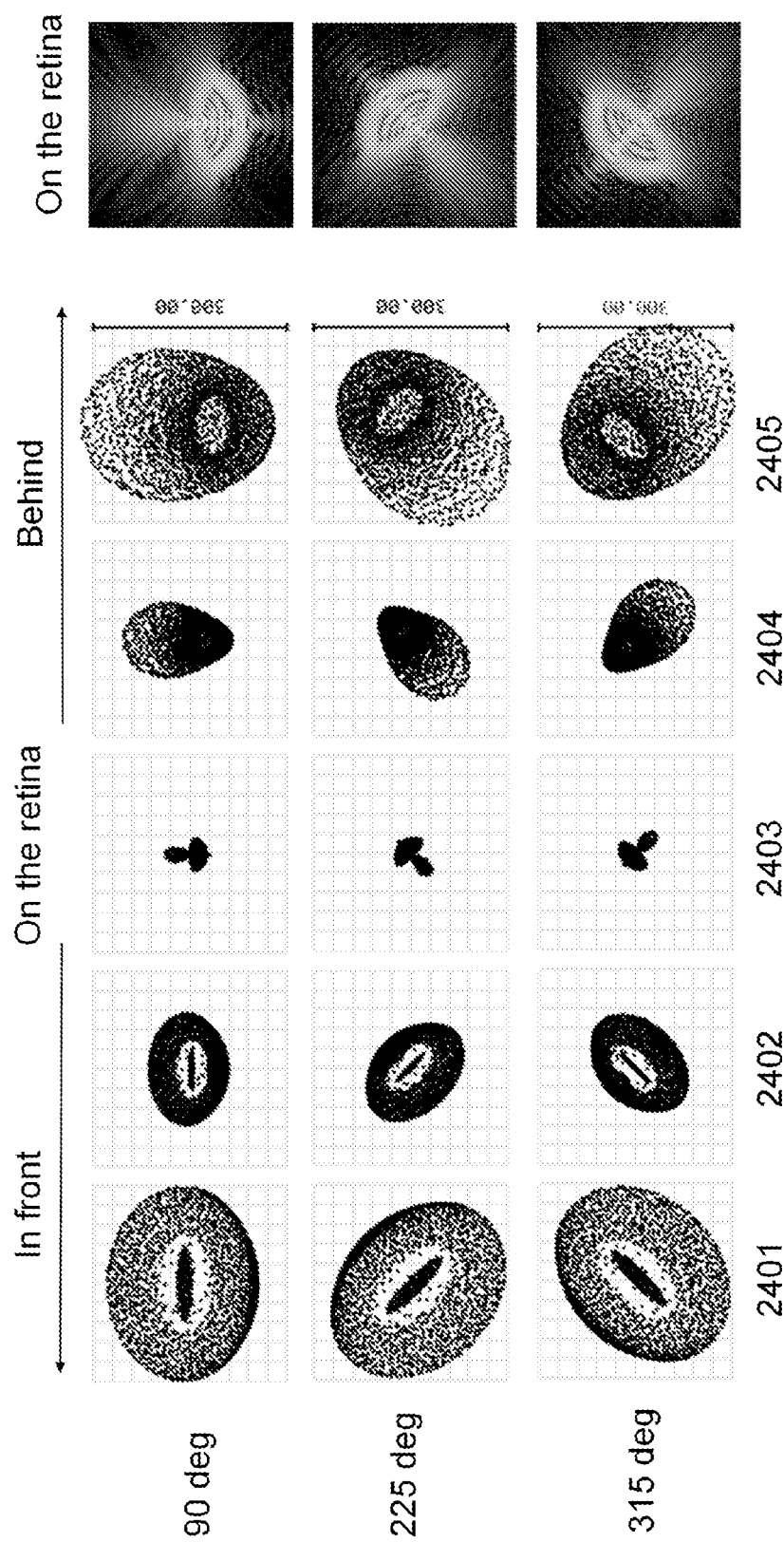
FIG. 24 illustrates a spatially and temporally varying signal, depicted as a wide-angle through-focus spot diagram when the incoming light is incident on a right −3 D myopic model eye corrected with an exemplary embodiment described in FIG. 20. The through-focus spot diagram of the exemplary embodiment in conjunction with the standard single vision spectacle lens is presented for 3 different configurations; wherein the location of the impermanent auxiliary mini optical element remained constant but the orientation of the optical element was configured in the following positions: the principal meridian with lower power at 90 degrees, 225 degrees, 315 degrees visual field angles.

In the example of FIG. 24, the modelled effects of following a prescribed method of using an impermanent auxiliary mini optical element drawn from one of the sets or kits A to D described in FIG. 18, in conjunction with standard single vision base spectacle lenses described in FIG. 17 are discussed. For example, the through-focus spot diagram and point spread function on the retina is analysed for 3 different configurations. The three configurations depict the situation wherein the method of prescribing the impermanent auxiliary mini optical element with an astigmatic or toric power distribution described in FIG. 18 were used on the spectacle lenses at a prescribed spatial location, approximately 5 mm from the optical centre, but in the following prescribed manner; wherein the prescribed method includes the use of the mini optical element in 3 different axis/orientations of the mini optical elements lower principal power meridian: (a) 90 degrees; (b) 225 degrees; and (c) 315 degrees. FIG. 24 illustrates a spatially and temporally varying signal, depicted when the mini optical elements are used in the prescribed manner.

Figure 25:
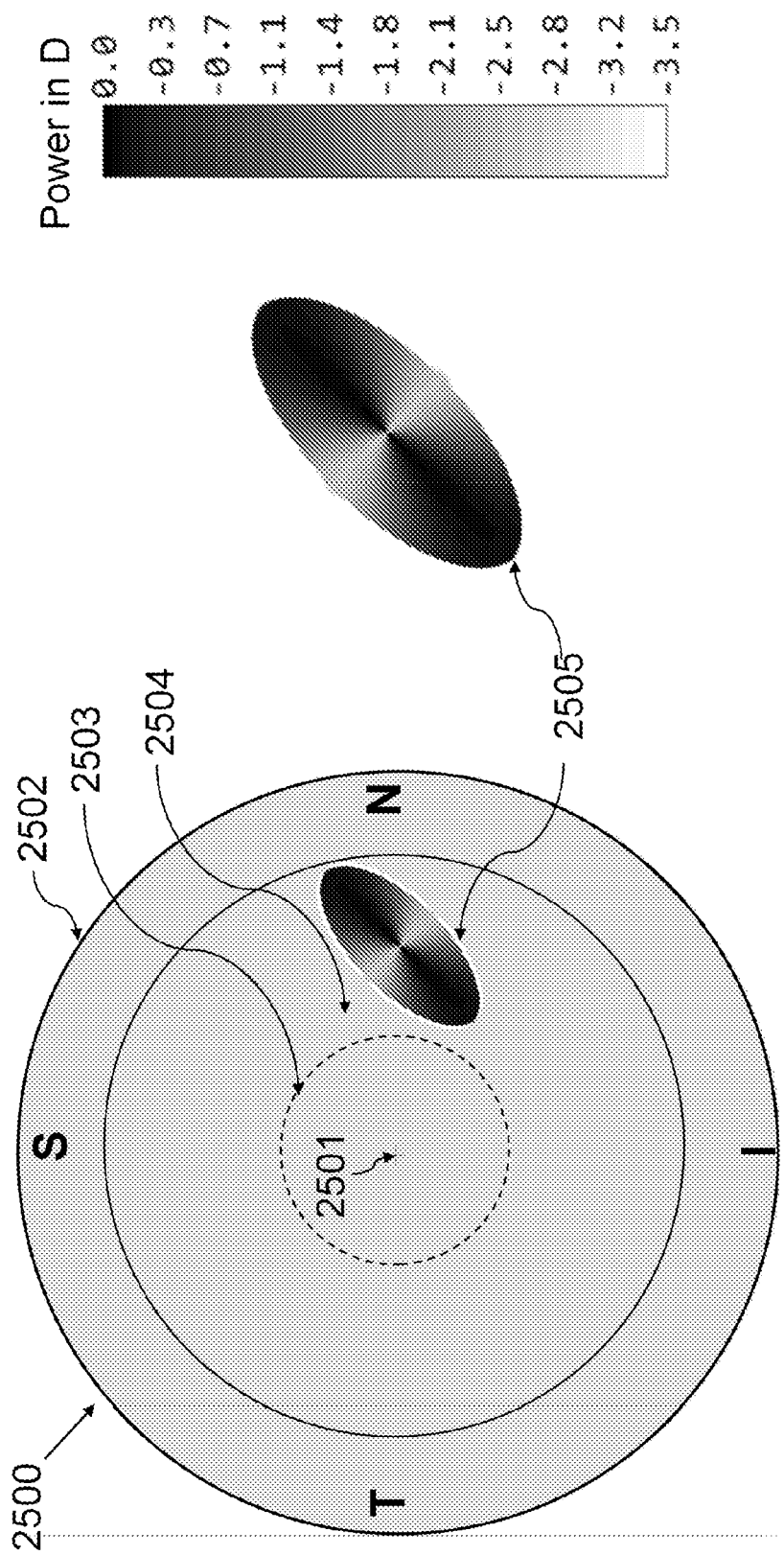
FIG. 25 illustrates a standard single vision spectacle blank cut into a circular shaped lens with a diameter of 30 mm configured with an auxiliary optical element or film drawn from the myopia management kit or set disclosed herein.

FIG. 25 illustrates a standard single vision ready-made spectacle blank, routinely used for the correction of myopia with or without astigmatism, cut into a circular-shaped lens with a diameter of 30 mm configured with an auxiliary optical element or film drawn from the kit or set disclosed herein. The said spectacle lens 2500 configured with an impermanent auxiliary mini optical element 2505, comprising of astigmatic or toric power distribution, the element is drawn from the kit or set of B disclosed in FIG. 18.

In this example, the standard spectacle lens is configured with a region of interest defined about the optical centre 2501 with an inner diameter of approximately 7 mm represented by dotted lines 2503 and an outer diameter of approximately 25 mm represented by solid line 2002 forming a region of interest 2504 identified for positioning said the impermanent auxiliary mini optical element.

The standard single vision ready-made spectacle blank of FIG. 25 has a base prescription of −3 D used to correct −3 D of myopia in an eye. The said impermanent auxiliary mini optical element 2505 is located approximately 12 mm away from the optical centre of the spectacle lens 2500.

The said impermanent auxiliary mini optical element 2505 is configured with +2.5 DC of astigmatic power, denoted by two principal power meridians, about −2.5 D along an oblique angle and about 0 D power perpendicular to the oblique principal meridian of the standard spectacle lens. The superior, temporal, inferior and nasal portions on the standard spectacle lens are denoted by characters S, T, I and N, respectively.

Figure 26:
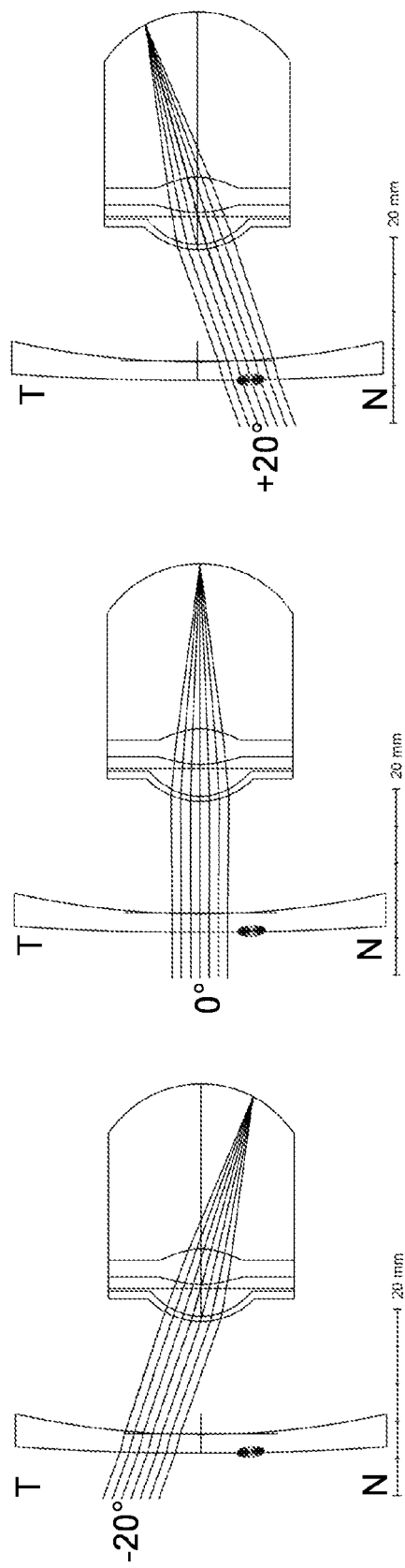
FIG. 26 illustrates a wide-field ray tracing schematic diagram of a right −3 D myopic eye corrected with the exemplary embodiment described in FIG. 25; the ray tracing schema encompassing three visual field angles for the spectacle wearer: temporal field angle (−20.0 degrees), central field angle (0.0 degrees) and nasal field angle (20.0 degrees).

FIG. 26 illustrates a wide-field ray tracing schematic diagram of a −3 D myopic eye corrected with the exemplary embodiment described in FIG. 25; the ray tracing schema encompassing three visual field angles when the spectacle lens is used in conjunction with the model eye of Table 1. The representing ray bundles of light going through (a) the temporal portion of the spectacle lens (−20, 0); (b) central portion of the lens (0,0); and (c) the nasal portion of the spectacle lens (20,0).

Figure 27:
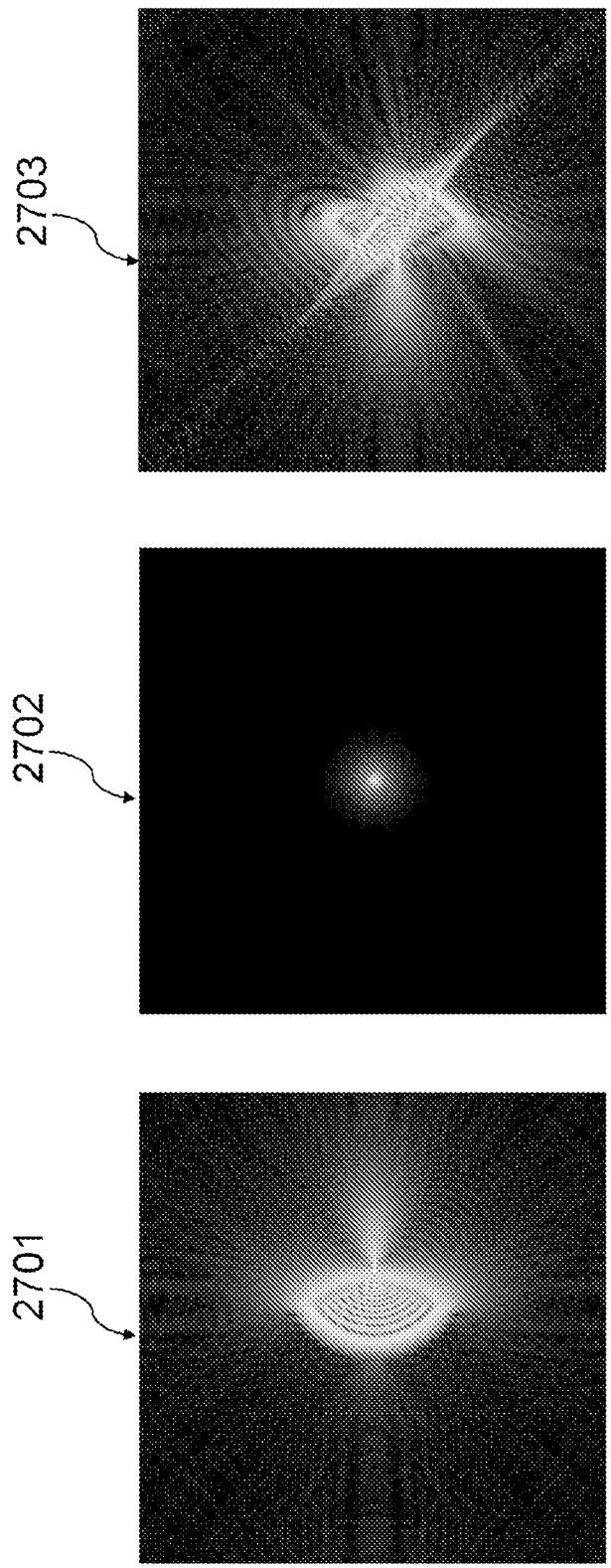
FIG. 27 illustrates point spread functions over a wide-field view when the incoming light is incident on a right −3 D myopic model eye corrected with the exemplary embodiment described in FIG. 24. The three-point spread functions represent three visual field angles, when the light goes through, (a) the second region located temporally on the spectacle lens (−20.0 degrees); (b) central field (0.0 degrees); and (c) when incident light goes through the nasal field angle (20.0 degrees).

As seen from FIG. 26, the only ray bundle through a nasal portion of the spectacle lens encounters the said impermanent auxiliary mini optical element 2505 providing the desired optical stop signal at the corresponding retinal location. The ray bundles going through the central and nasal portion of the spectacle lens do not impose any optical stop signal at the desired retinal location. FIG. 27 illustrates point spread functions over a wide-field view when the incoming light is incident on a −3 D myopic model eye corrected with the exemplary embodiment described in FIG. 25.

As seen from FIG. 27, the ray bundle going through the impermanent auxiliary mini optical element 2505 produces a point spread function 2703 that is affected by additional astigmatic or toric power distribution within the mini element producing the desirable optical stop signal compared to 2701 which is formed when the ray bundle is going through the spectacle lens portion devoid of the mini optical element. The central ray bundle going through the base spectacle lens produces an ideal point spread function 2702.

Figure 28:
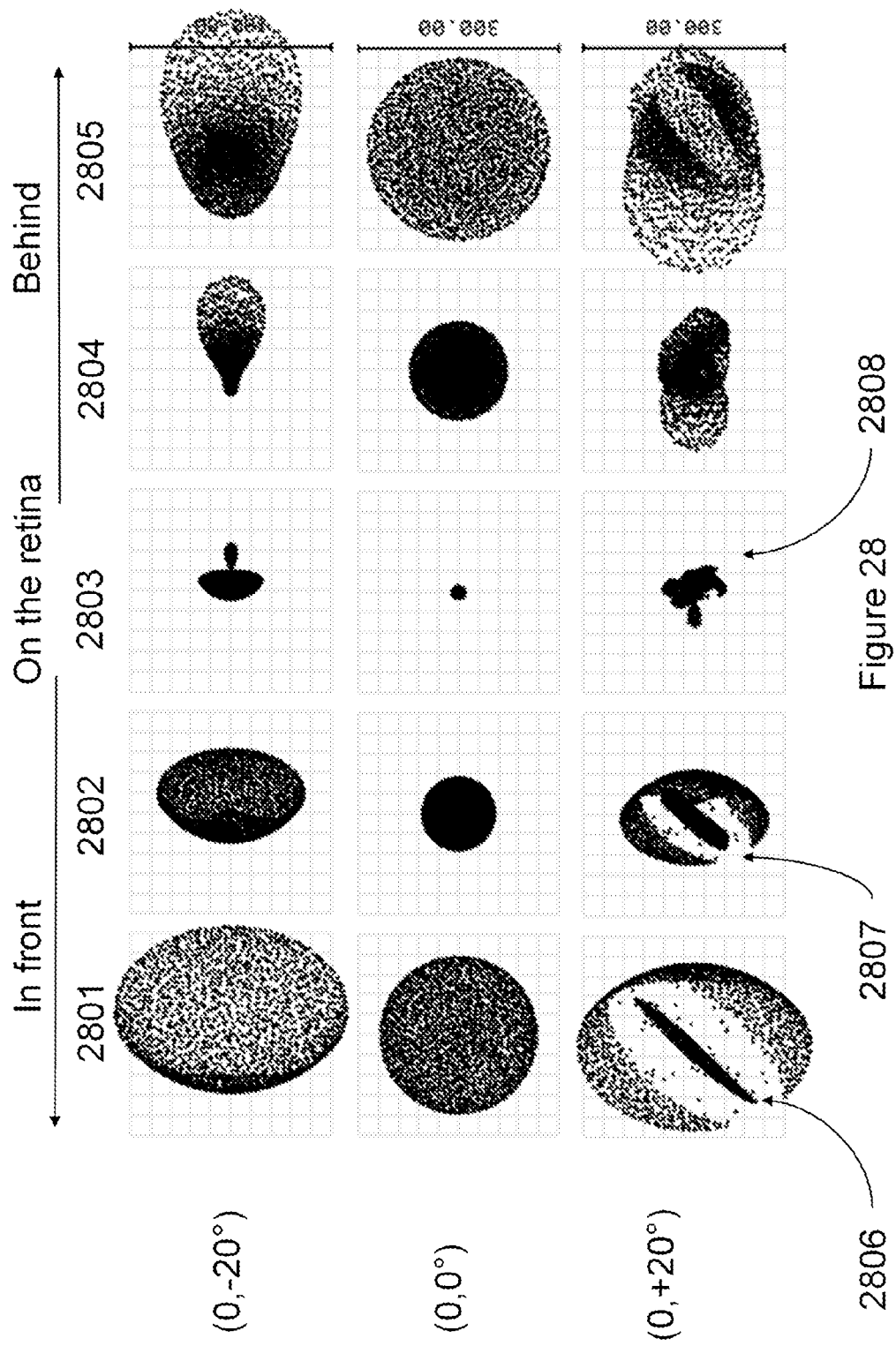
FIG. 28 illustrates a temporally and spatially varying signal, depicted as a wide-angle through-focus spot diagram when the incoming light is incident on a right −3 D myopic model eye corrected with an exemplary embodiment described in FIG. 24. The performance is represented at various field angles: 1st row represents −20 degrees temporal field angle; $2^{nd}$ row represents central field angle 0 degrees, and $3^{rd}$ row represents 20-degrees nasal field angle.

FIG. 28 illustrates a spatially varying signal, depicted as a wide-angle through-focus spot diagram. When the incoming light of a visible wavelength is incident on a −3 D myopic model eye corrected with one exemplary embodiment described in FIG. 25, the optical performance of the spectacle lens in conjunction with the model eye of Table 1 is represented over various field angles.

In this example, the rows represent the through focus spot diagram formed when a ray bundle goes through three distinct regions of the spectacles: (a) the $1^{st}$ row showcases data obtained when the incoming ray bundle passes through the temporal portion of the spectacle lens free of auxiliary optical elements; (b) the second row represents data obtained when incoming ray bundle passes through the central portion of the spectacle lens free of auxiliary mini optical elements and (c) the third row represents through-focus spot diagram when the incoming ray bundle passes through the impermanent auxiliary mini optical element located nasally on the spectacle lens.

As seen from FIG. 28, the ray bundle going through the impermanent auxiliary mini optical element produces a conoid of Sturm comprising elliptical sagittal 2801 and tangential 2802 blur patterns substantially in front of the regional peripheral retina. However, when the incoming light passes through either the central or the temporal portion of the spectacle lens, i.e. regions substantially free of the mini optical elements, no distinct conoid of Sturm is observed either in front or about the retina.

In this example, the length, position, and orientation of the conoid of Sturm formed on the peripheral retina is hypothesises to contribute to the directional cues or optical stop signals to reduce the rate of myopia progression. In some embodiments, the astigmatic or toric power of the said mini optical element and the location on the single vision spectacle lens is optimised to retain the entire conoid of Sturm in front of the peripheral retina, while in other embodiments, the optimisation of said properties of the mini optical element may position the conoid of Sturm about the retina with sagittal planes on the retina. The prescribed method of changing the position of the mini optical elements on the single vision spectacle lenses provides temporal and spatial variation to the directional cues or stop signals; such that the efficacy of myopia management may be maintained constant over time.

Figure 29:
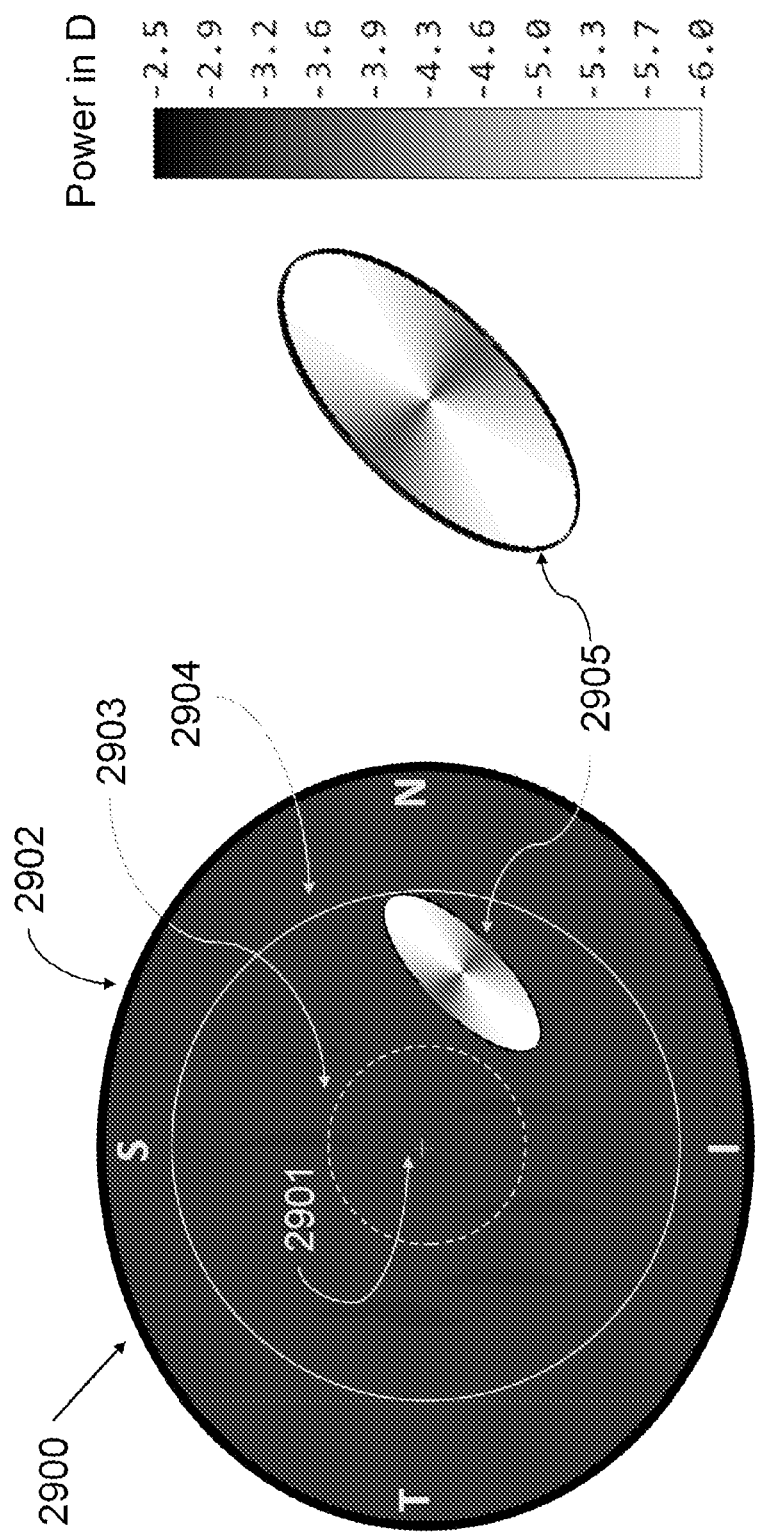
FIG. 29 illustrates a standard single vision spectacle blank cut into an elliptical-shaped lens with minor axis diameter of 25 mm and major axis diameter of 30 mm configured with an auxiliary optical element or film drawn from the kit or set disclosed herein.

FIG. 29 illustrates a standard single vision spectacle blank cut into an elliptical-shaped lens with minor axis diameter of 25 mm and major axis diameter of 30 mm configured with an auxiliary optical element or film drawn from the kit or set disclosed herein. The said spectacle lens 2900 configured with an impermanent auxiliary mini optical element 2905, comprising of astigmatic or toric power distribution, the element is drawn from the kit or set of B disclosed in FIG. 18.

In this example, the standard spectacle lens is configured with a region of interest defined about the optical centre 2901 with an inner diameter of approximately 7 mm represented by dotted lines 2503 and an outer diameter of approximately 20 mm represented by solid line 2902 forming a region of interest 2904 identified for positioning said the impermanent auxiliary mini optical element. The standard single vision ready-made spectacle blank of FIG. 29 has a base prescription of −3 D used to correct −3 D of myopia in an eye. The said impermanent auxiliary mini optical element 2905 is located approximately 10 mm away from the optical centre 2901 of the spectacle lenses (2900). The said impermanent auxiliary mini optical element 2905 is configured with −2.5 DC of astigmatic power, denoted by two principal power meridians, about −2.5 D along an oblique angle and about −5 D power perpendicular to the oblique principal meridian of the standard spectacle lens. The superior, temporal, inferior and nasal portions on the standard spectacle lens are denoted by characters S, T, I and N, respectively.

Figure 30:
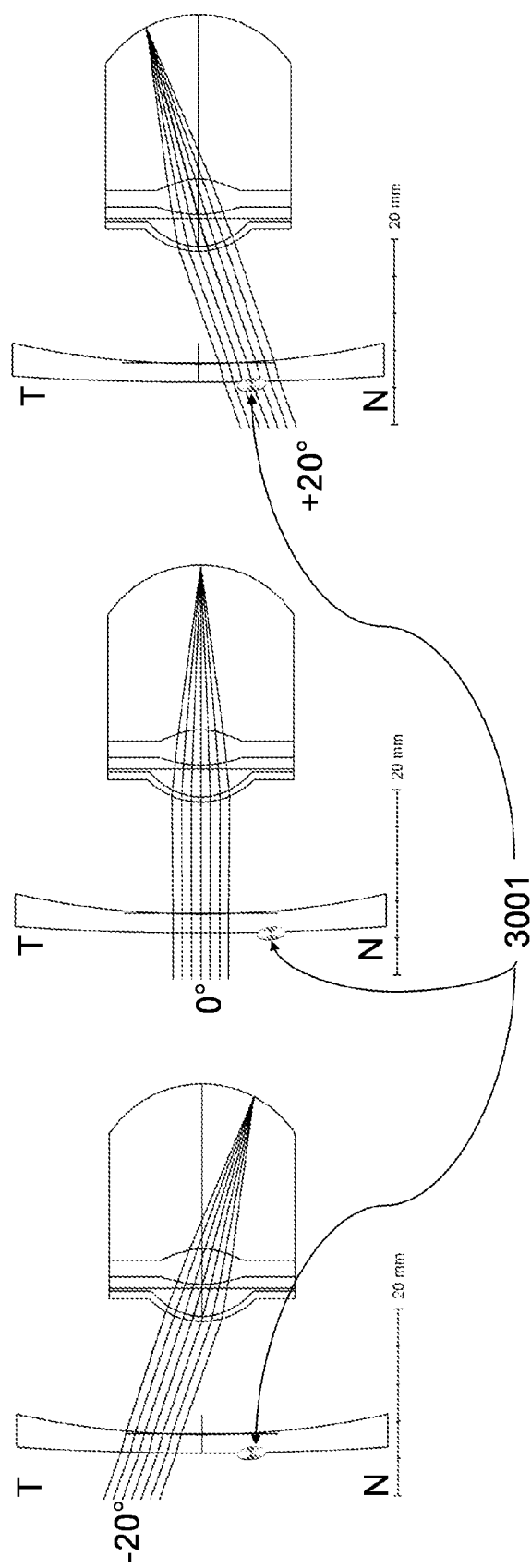
FIG. 30 illustrates a wide-field ray tracing schematic diagram of a right −3 D myopic eye corrected with the exemplary embodiment described in FIG. 29; the ray tracing schema encompassing three visual field angles for the spectacle wearer: temporal field angle (−20.0 degrees), central field angle (0.0 degree) and nasal field angle (20.0 degrees).

FIG. 30 illustrates a wide-field ray tracing schematic diagram of a −3 D myopic eye corrected with the exemplary embodiment described in FIG. 29; the ray tracing schema encompassing three visual field angles for the spectacle wearer: temporal field angle (−20, 0), central field angle (0,0) and nasal field angles (20,0).

FIG. 30 illustrates a wide-field ray tracing schematic diagram of a −3 D myopic eye corrected with the exemplary embodiment described in FIG. 29; the ray tracing schema encompassing three visual field angles when the spectacle lens is used in conjunction with the model eye of Table 1. The representing ray bundles of light going through (a) the temporal portion of the spectacle lens (−20, 0); (b) central portion of the lens (0,0); and (c) the nasal portion of the spectacle lens (20,0). As seen from FIG. 30, the only ray bundle through a nasal portion of the spectacle lens encounters the said impermanent auxiliary mini optical element 2905 providing the desired optical stop signal at the corresponding retinal location. The ray bundles going through the central and nasal portion of the spectacle lens do not impose any optical stop signal at the desired retinal location.

Figure 31:
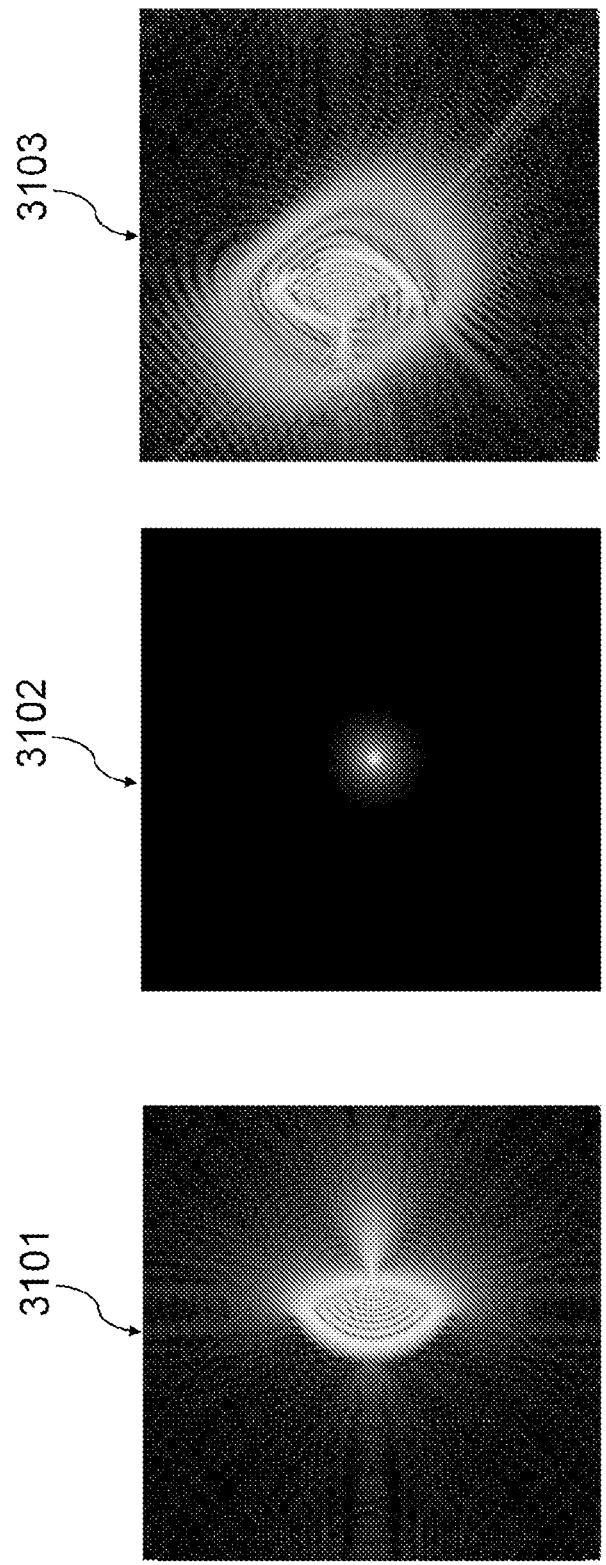
FIG. 31 illustrates point spread functions over a wide-field view when the incoming light is incident on a right −3 D myopic model eye corrected with the exemplary embodiment described in FIG. 29. The three-point spread functions represent three visual field angles when the light goes through, (a) the second region located temporally on the spectacle lens (−20.0 degrees), (b) central field (0.0 degrees), and (c) when incident light goes through the nasal field angles (20.0 degrees).

FIG. 31 illustrates point spread functions over a wide-field view when the incoming light is incident on a −3 D myopic model eye corrected with the exemplary embodiment described in FIG. 29. As seen from FIG. 29, the ray bundle going through the impermanent auxiliary mini optical element 2905 produces a point spread function 3103 that is affected by additional astigmatic or toric power distribution within the mini element producing the desirable optical stop signal compared to 3101 which is formed when the ray bundle is going through the spectacle lens portion devoid of the mini optical element. The central ray bundle going through the base spectacle lens produces an ideal point spread function 3102.

Figure 32:
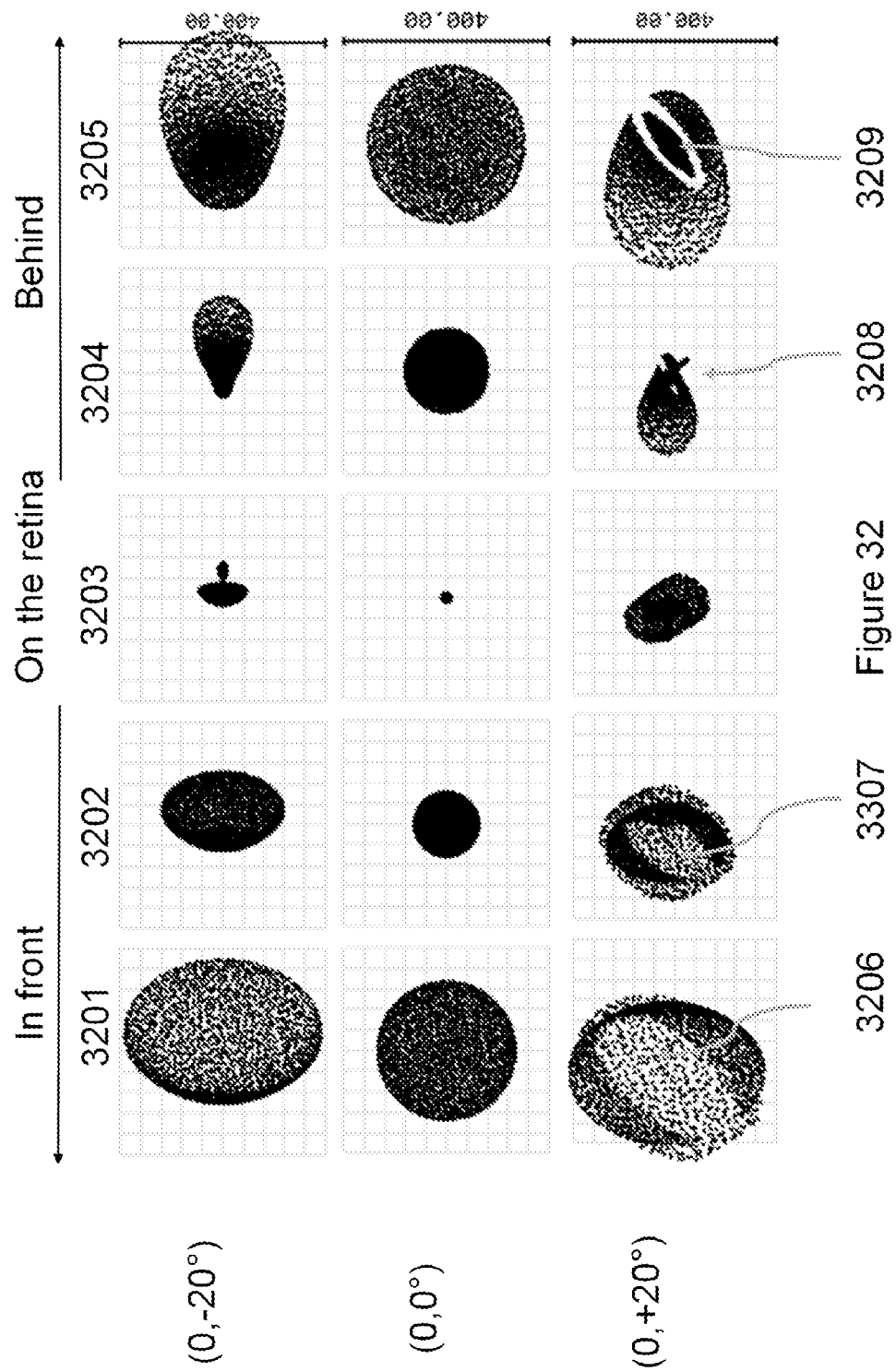
FIG. 32 illustrates a temporally and spatially varying signal, depicted as a wide-angle through-focus spot diagram when the incoming light is incident on a right −3 D myopic model eye corrected with the exemplary embodiment described in FIG. 29. The performance is represented at various field angles: 1st row represents −20 degrees temporal field angle; $2^{nd}$ row represents central field angle 0 degrees; and $3^{rd}$ row represents 20 degrees nasal field angle.

FIG. 32 illustrates a spatially varying signal, depicted as a wide-angle through-focus spot diagram. When the incoming light of a visible wavelength is incident on a −3 D myopic model eye corrected with one exemplary embodiment described in FIG. 29, the optical performance of the spectacle lens in conjunction with the model eye of Table 1 is represented over various field angles.

In this example, the rows represent the through focus spot diagram formed when a ray bundle goes through three distinct regions of the spectacles: (a) the 1$^{st}$ row showcases data obtained when the incoming ray bundle passes through the temporal portion of the spectacle lens free of auxiliary optical elements; (b) the second row represents data obtained when incoming ray bundle passes through the central portion of the spectacle lens free of auxiliary mini optical elements and (c) the third row represents through-focus spot diagram when the incoming ray bundle passes through the impermanent auxiliary mini optical element located nasally on the spectacle lens.

As seen from FIG. 32, the ray bundle going through the impermanent auxiliary mini optical element produces a conoid of Sturm comprising elliptical sagittal 3203 and tangential 3205 blur patterns substantially behind the regional retina. However, when the incoming light passes through either the central or the temporal portion of the spectacle lens, i.e. regions substantially free of the mini optical elements, no distinct conoid of Sturm is observed either in front or about the retina.

In this example, the length, position, and orientation of the conoid of Sturm formed on the peripheral retina is hypothesises to contribute to the directional cues or optical stop signals to reduce the rate of myopia progression. The astigmatic or toric power of the said mini optical element and the location on the single vision spectacle lens is optimised to retain the entire conoid of Sturm in behind the peripheral retina, while in other embodiments, the optimisation of the mini optical element may position the conoid of Sturm about the retina with tangential planes on the retina.

The prescribed method of changing the position of the mini optical elements on the single vision spectacle lenses provides temporal and spatial variation to the directional cues or stop signals; such that the efficacy of myopia management may be maintained constant over time.

In certain other embodiments, the toric part of the spectacle lens of a kit or set may be configured to consider the inherent astigmatism of the eye wearing the lens to achieve a satisfactory balance between the desired visual performance and the desired astigmatic blur to offer a stimulus to reduce or slow the rate of progression.

In some embodiments, the toric portion of the pair of spectacle lenses of a spectacle lens kit or set may be located, formed, or placed on the anterior surface, posterior surface, or combinations thereof. In some other embodiments, the toric part of the pair of spectacle lenses of a spectacle lens of a kit or set is devoted to producing specific features of the stop signal, for example, residual astigmatism with either the sagittal or tangential focal line substantially in front of the retina.

In certain other embodiments, a change or substantial change to the optical signal received by the on- and/or off-axis region on the retina, configured by an astigmatic conoid or interval of Sturm at the retinal plane, where the optical stop signal means a portion of the conoid or interval of Sturm falls in front of the retina (i.e. producing a meridional myopic defocus), while the remainder of the conoid or interval of Sturm produces an in-focus or hyperopic signal. The proportion of the conoid or interval of Sturm that provides a positive meridional astigmatic focus, may be approximately 10%, 20%, 30% 40%, 50%, 60%, 70%, 80%, 90% or 100%.

In certain other embodiments, the toric part of the spectacle lens of a kit or set is located, formed, or placed on one of the two surfaces of the spectacle lens and the other surface may have other features for further reducing eye growth.

For example, the use of additional features like defocus, coma, or spherical aberration. In certain embodiments, the shape of the front and back surface of the spectacle lens of a kit or set may be described by one or more of the following: a sphere, an asphere, an extended odd polynomial, an extended even polynomial, a conic section, a biconic section, a toric surface or a Zernike polynomial.

In some other embodiments, the radial and/or azimuthal power distribution across the optic centre of the lens may be described by appropriate Zernike polynomials, Bessel functions, Jacobi polynomials, Taylor polynomials, Fourier expansion, or combinations thereof.

In one embodiment of the present disclosure, the stop signal may be configured using solely using astigmatism, astigmatic or toric power profile. However, in other embodiments, higher-order aberrations like spherical aberration, coma, trefoil, may be combined with the configured astigmatic or toric blur.

In certain embodiments of the present disclosure, the astigmatic or toric power distribution may be configured using the below expression: Power profile of toric embodiment=Spherical+Cylinder/2*(Radial)*(Azimuthal) power distribution function. In some embodiments, the radial distribution function may take a form of Radial power distribution=$C\rho^2$, where C is the coefficient of the expansion and Rho ($\rho$) is the normalised radial co-ordinate $\rho_0/\rho_{max}$. Rho ($\rho_0$) is the radial coordinate at a given point on the lens, whereas $\rho_{max}$ is the maximum radial co-ordinate or semi-diameter of the optic zone. In some embodiments, the azimuthal power distribution function may take a form of Azimuthal power distribution=cos m$\theta$, where m can be any integer between 1 and 6 in some embodiments, and Theta ($\theta$) is the azimuthal angle.

In other exemplary embodiments, the induced astigmatism or toric profile configured in the auxiliary spectacle fronts to be used in juxtaposition to a standard pair of spectacle lenses for reducing, inhibiting, or controlling the rate of progression of myopia in an individual, may be at least +0.5 DC, at least +0.75 DC, at least +1 DC, at least +1.25 DC, at least +1.5 DC, at least +1.75 DC or at least +2 DC.

In some other exemplary embodiments, the induced astigmatism or toric profile configured in the auxiliary spectacle fronts to be used in juxtaposition to a standard pair of spectacle lenses for reducing, inhibiting, or controlling the rate of progression of myopia in an individual, may be between +0.5 DC and +2.5 DC, +0.75 DC and +1.75 DC, +1 DC and +3 DC, or +1.25 DC and +2.5 DC.

In certain other embodiments, the induced astigmatism or toric profile configured in the auxiliary spectacle fronts, to be used in juxtaposition to a standard pair of spectacle lenses, for reducing, inhibiting, or controlling the rate of progression of myopia in an individual, may be further supplemented with positive sphere power of at least +0.5 D, at least +0.75 D, at least +1 D, at least +1.25 D, or at least +1.5 D. In certain other embodiments, the supplementary sphere power may be at least −0.5 D, at least −0.75 D, at least −1 D, at least −1.25 D, or at least −1.5 D. The supplementary sphere power in this context may be independent of refractive correction configured in the standard spectacle lens.

In certain examples, the wearing schedule of the care regiment may include instructions to change the auxiliary pair of spectacle fronts at least every 4 hours, 8 hours, 12 hours, 24 hours, 48 hours, 60 hours, or 72 hours.

As a person skilled in the art may appreciate, the present invention may be used in combination with any of the devices/methods that have the potential to influence the progression of myopia. These may include but are not limited to, contact lenses of various designs, colour filters, pharmaceutical agents, behavioural changes, and environmental conditions.

Few other exemplary embodiments of spectacle lenses are described in the following example set A.

Set of "A" Examples of a Spectacle Kit

A spectacle apparatus kit for a myopic individual, and its methods of use, the kit including at least two or more pairs of spectacles, wherein each pair of the spectacles comprises a lens for the left and a lens for the right eye of the myopic individual, wherein each lens is configured with a substantial region with an astigmatic or a toric power profile in addition to a base prescription, to provide each eye, at least in part meridional correction, and at least in part induces meridional astigmatism, on at least one region of the retina of the myopic eye; wherein the methods of use of the kit include instructions for the myopic individual comprising a wearing care regimen detailing the use of the pairs of spectacles.

A spectacle apparatus kit of one or more of the claim A examples, wherein the surface area of the substantial region with an astigmatic or a toric power profile is at least 100 mm$^2$, 250 mm$^2$, 450 mm$^2$, 600 mm$^2$, or 750 mm$^2$.

A spectacle apparatus kit of one or more of the claim A examples, wherein the magnitude of astigmatic or toric power profile is at least +0.5 DC, +0.75 DC, +1 DC, +1.25 DC, +1.5 DC or +1.75 DC.

A spectacle apparatus kit of one or more of the claim A examples, wherein the astigmatic or toric power profile is expressed using a power distribution function described by the expression Sphere+(Cylinder/2)*(Azimuthal component), wherein the Sphere refers to the distance spherical prescription power to correct the myopic eye, the Cylinder refers to the magnitude of induced astigmatism or toricity, wherein the Azimuthal component of the power distribution function is described as $C_a$*cos(m$\theta$), wherein $C_a$ is an azimuthal coefficient, m is an integer between 1 and 6, and Theta ($\theta$) is the azimuthal angle of a given point of the optic zone.

A spectacle apparatus kit of one or more of the claim A examples, wherein the astigmatic or toric power profile is configured on the anterior surface, posterior surface, or both surfaces of the spectacle lens.

A spectacle apparatus kit of one or more of the claim A examples, wherein the at least two or more pairs of spectacles include at least three, four, five, six or seven spectacles.

A spectacle apparatus kit of one or more of the claim A examples, wherein the magnitude of the astigmatic or toric power profile is configured substantially different between the pairs of spectacles within the kit.

A spectacle apparatus kit of one or more of the claim A examples, wherein the magnitude of the astigmatic or toric power profile is configured substantially different between the pairs of spectacles within the kit and is at least different by +0.5 DC.

A spectacle apparatus kit of one or more of the claim A examples, wherein the axis of the astigmatic or toric power profile is configured substantially different between the pairs of spectacles within the kit.

A spectacle apparatus kit of one or more of the claim A examples, wherein the axis of the astigmatic or toric power profile in the at least two pairs of spectacles are substantially different from each other and is at least separated by 20 degrees.

A spectacle apparatus kit of one or more of the claim A examples, wherein the magnitude and/or axis of the astigmatic or toric power profile is configured substantially different between the right and left lenses of the pairs of spectacles within the kit.

A spectacle apparatus kit of one or more of the claim A examples, wherein the at least two pairs of spectacle lenses are configured to provide an appropriate stop signal to the myopic individual.

A spectacle apparatus kit of one or more of the claim A examples, wherein the myopic individual may have myopia with or without astigmatism.

A spectacle apparatus kit of one or more of the claim A examples, wherein the at least one region of the retina of the myopic eye includes a sub-foveal, para-foveal, foveal, sub-macular, macular or paramacular region on the retina.

A spectacle apparatus kit of one or more of the claim A examples, wherein the at least one region of the retina of the myopic eye includes at least 5 degrees of the visual field, 15 degrees of the visual field, or 30 degrees of the visual field.

A method of use of the spectacle apparatus kit of one or more of the claim A examples, wherein the at least two pairs of spectacles are configured to provide a temporally and spatially varying induced meridional astigmatism.

A method of use of the spectacle apparatus kit of one or more of the claim A examples, wherein the temporally and spatially varying induced meridional astigmatism provides a stop signal to the myopic eyes of the individual.

A method of use of the spectacle apparatus kit of one or more of the claim A examples, wherein the axis of the astigmatic or toric power profile in the at least two pairs of spectacles is substantially different from each other and is at least separated by 20 degrees.

A method of use of the spectacle apparatus kit of one or more of the claim A examples, wherein the at least two or more pairs of spectacles are prescribed using an appropriate wearing schedule.

A method of use of the spectacle apparatus kit of one or more of the claim A examples, wherein the appropriate wearing schedule to wear the at least two pairs of spectacles are separated at least by 2 hours, 4 hours, 6 hours, 8 hours, or 12 hours.

A method of use of the spectacle apparatus kit of one or more of the claim A examples, wherein the appropriate wearing schedule to wear the at least two pairs of spectacles are separated at least by 1 day, 2 days, 3 days, 4 days, 5 days, 6 days, or one week.

A method of use of the spectacle apparatus kit of one or more of the claim A examples, wherein the appropriate wearing schedule to wear the at least two pairs of spectacles are separated at least by 1 week, 2 weeks, 3 weeks, or one month.

A method of use of the spectacle apparatus kit of one or more of the claim A examples, wherein the appropriate wearing schedule to wear the at least two pairs of spectacles is identified by evaluating the rate of progression and/or risk factors associated with the myopic individual.

A method of use of the spectacle apparatus kit of one or more of the claim A examples, wherein the magnitude of the astigmatic or toric power profile is configured by evaluating the rate of progression and/or risk factors associated with the myopic individual.

Set of "B" Examples of a Spectacle Front

A spectacle apparatus kit for a myopic individual, and its methods of use, the kit including at least two or more pairs of spectacle fronts, wherein each pair of the spectacle front comprises a lens for the left and a lens for the right eye of the myopic individual, wherein each lens is configured with a substantial region with an astigmatic or a toric power profile, wherein the spectacle front is used in juxtaposition to a pair of standard single vision spectacles, provides each eye, at least in part meridional correction, and at least in part induces meridional astigmatism, on at least one region of the retina of the myopic eye; wherein the methods of use of the kit include instructions for the myopic individual comprising a wearing care regimen detailing the use of the pairs of spectacles.

A spectacle apparatus kit of one or more of the claim B examples, wherein the surface area of the substantial region with an astigmatic or a toric power profile is at least 100 mm$^2$, 250 mm$^2$, 450 mm$^2$, 600 mm$^2$, or 750 mm$^2$.

A spectacle apparatus kit of one or more of the claim B examples, wherein the magnitude of astigmatic or toric power profile is at least +0.5 DC, +0.75 DC, +1 DC, +1.25 DC, +1.5 DC or +1.75 DC.

A spectacle apparatus kit of one or more of the claim B examples, wherein the astigmatic or toric power profile is expressed using a power distribution function described by the expression Sphere+(Cylinder/2)*(Azimuthal component), wherein the Sphere refers to the distance spherical prescription power to correct the myopic eye, the Cylinder refers to the magnitude of induced astigmatism or toricity, wherein the Azimuthal component of the power distribution function is described as $C_a*\cos(m\theta)$, wherein $C_a$ is an azimuthal coefficient, m is an integer between 1 and 6, and Theta ($\theta$) is the azimuthal angle of a given point of the optic zone.

A spectacle apparatus kit of one or more of the claim B examples, wherein the astigmatic or toric power profile is configured on the anterior surface, posterior surface, or both surfaces of the spectacle fronts.

A spectacle apparatus kit of one or more of the claim B examples, wherein the spectacle fronts may be either screwed onto, hooked onto, adhered onto using a magnetic mechanism, to the frame of the standard single-vision spectacles.

A spectacle apparatus kit of one or more of the claim B examples, wherein the at least two or more pairs of spectacle fronts include at least three, four, five, six or seven spectacles.

A spectacle apparatus kit of one or more of the claim B examples, wherein the magnitude of the astigmatic or toric power profile is configured substantially different between the pairs of spectacle fronts within the kit.

A spectacle apparatus kit of one or more of the claim B examples, wherein the magnitude of the astigmatic or toric power profile is configured substantially different between the pairs of spectacle fronts within the kit and is at least different by +0.5 DC.

A spectacle apparatus kit of one or more of the claim B examples, wherein the axis of the astigmatic or toric power profile is configured substantially different between the pairs of spectacle fronts within the kit.

A spectacle apparatus kit of one or more of the claim B examples, wherein the axis of the astigmatic or toric power profile in the at least two pairs of spectacle fronts is substantially different from each other and is at least separated by 20 degrees.

A spectacle apparatus kit of one or more of the claim B examples, wherein the magnitude and/or axis of the astigmatic or toric power profile is configured substantially different between the right and left lenses of the pairs of spectacle fronts within the kit.

A spectacle apparatus kit of one or more of the claim B examples, wherein the at least two pairs of spectacle fronts are configured to provide an appropriate stop signal to the myopic individual.

A spectacle apparatus kit of one or more of the claim B examples, wherein the myopic individual may have myopia with or without astigmatism.

A method of use of the spectacle apparatus kit of one or more of the claim B examples, wherein the at least two pairs of spectacle fronts are configured to provide a temporally and spatially varying induced meridional astigmatism.

A method of use of the spectacle apparatus kit of one or more of the claim B examples, wherein the temporally and spatially varying induced meridional astigmatism provides a stop signal to the myopic eyes of the individual.

A method of use of the spectacle apparatus kit of one or more of the claim B examples, wherein the axis of the astigmatic or toric power profile in the at least two pairs of spectacle fronts are substantially different from each other and is at least separated by 20 degrees.

A method of use of the spectacle apparatus kit of one or more of the claim B examples, wherein the at least two or more pairs of spectacle fronts are prescribed using an appropriate wearing schedule.

A method of use of the spectacle apparatus kit of one or more of the claim B examples, wherein the appropriate wearing schedule to wear the at least two pairs of spectacle fronts are separated at least by 2 hours, 4 hours, 6 hours, 8 hours, or 12 hours.

A method of use of the spectacle apparatus kit of one or more of the claim B examples, wherein the appropriate wearing schedule to wear the at least two pairs of spectacle fronts are separated at least by 1 day, 2 days, 3 days, 4 days, 5 days, 6 days, or one week.

A method of use of the spectacle apparatus kit of one or more of the claim B examples, wherein the appropriate wearing schedule to wear the at least two pairs of spectacle fronts are separated at least by 1 week, 2 weeks, 3 weeks, or one month.

A method of use of the spectacle apparatus kit of one or more of the claim B examples, wherein the appropriate wearing schedule to wear the at least two pairs of spectacle fronts is identified by evaluating the rate of progression and/or risk factors associated with the myopic individual.

A method of use of the spectacle apparatus kit of one or more of the claim B examples, wherein the magnitude of the astigmatic or toric power profile is configured by evaluating the rate of progression and/or risk factors associated with the myopic individual.

Set of "C" Examples of Impermanent Auxiliary Optical Films

A spectacle apparatus kit for a myopic individual, and its methods of use, the kit including at least two or more pairs of impermanent auxiliary optical films, wherein each optical film is configured to cover a substantial region of a lens for the left and a substantial region of a lens for the right eye of the myopic individual, wherein each optical film is configured with substantially plano power across the optical film and at least one elliptical optical element configured with an astigmatic or a toric power profile, wherein the optical element used in juxtaposition to a pair of standard single vision spectacles, provides each eye, at least in part meridional correction, and at least in part induces meridional astigmatism, on at least one region of the retina of the myopic eye; wherein the methods of use of the kit include instructions for the myopic individual comprising a wearing care regimen detailing the use of the optical films within the kit.

A spectacle apparatus kit of one or more of the claim C examples, wherein the surface area of the at least one elliptical optical element is at least 5 mm$^2$, 10 mm$^2$, 15 mm$^2$, 20 mm$^2$, or 25 mm$^2$.

A spectacle apparatus kit of one or more of the claim C examples, wherein the magnitude of astigmatic or toric power profile is at least +0.5 DC, +0.75 DC, +1 DC, +1.25 DC, +1.5 DC or +1.75 DC.

A spectacle apparatus kit of one or more of the claim C examples, wherein the astigmatic or toric power profile is expressed using a power distribution function described by the expression Sphere+(Cylinder/2)*(Azimuthal component), wherein the Sphere refers to the distance spherical prescription power to correct the myopic eye, the Cylinder refers to the magnitude of induced astigmatism or toricity, wherein the Azimuthal component of the power distribution function is described as $C_a$*cos(mθ), wherein $C_a$ is an azimuthal coefficient, m is an integer between 1 and 6, and Theta (θ) is the azimuthal angle of a given point of the optic zone.

A spectacle apparatus kit of one or more of the claim C examples, wherein the astigmatic or toric power profile is configured on the anterior surface, posterior surface, or both surfaces of the optical film.

A spectacle apparatus kit of one or more of the claim C examples, wherein the optical film may be configured on the spectacle lens using a desired thickness profile variation across the optical film.

A spectacle apparatus kit of one or more of the claim C examples, wherein the optical film may be glued onto the spectacle lens, is made to adhere with finger pressure to the spectacle lens, may be used as a sticker on one of the surfaces of the spectacle lens, may be used as a peel-able adhesive on one of the surfaces of the spectacle lens or a combination thereof.

A spectacle apparatus kit of one or more of the claim C examples, wherein the at least one elliptical optical element may be located on the optical film when used in conjunction with the standard single vision spectacle lenses to provide induced meridional astigmatism in at least one specific region of the retina.

A spectacle apparatus kit of one or more of the claim C examples, wherein the specific region on the retina may be a nasal, temporal, superior, or inferior portion of the retina.

A spectacle apparatus kit of one or more of the claim C examples, wherein the specific region on the retina may be within 10 degrees of the visual field, 15 degrees of the visual field, 20 degrees of the visual field, 25 degrees of the visual field.

A spectacle apparatus kit of one or more of the claim C examples, wherein the at least one elliptical optical element within the optical film may include at least two or at least three elliptical optical elements.

A spectacle apparatus kit of one or more of the claim C examples, wherein the at least two or more pairs of optical films include at least three, four, five, six or seven pairs of optical films.

A spectacle apparatus kit of one or more of the claim C examples, wherein the magnitude of the astigmatic or toric power profile is configured substantially different between the pairs of optical films within the kit.

A spectacle apparatus kit of one or more of the claim C examples, wherein the axis of the astigmatic or toric power profile is configured substantially different between the pairs of optical films within the kit.

A spectacle apparatus kit of one or more of the claim C examples, wherein the magnitude and/or axis of the astigmatic or toric power profile is configured substantially different between the right and left lenses of the pairs of optical films within the kit.

A spectacle apparatus kit of one or more of the claim C examples, wherein the at least two pairs of optical films are configured to provide an appropriate stop signal to the myopic individual.

A spectacle apparatus kit of one or more of the claim C examples, wherein the myopic individual may have myopia with or without astigmatism.

A method of use of the spectacle apparatus kit of one or more of the claim C examples, wherein the at least two pairs of optical films are configured to provide a temporally and spatially varying induced meridional astigmatism.

A method of use of the spectacle apparatus kit of one or more of the claim C examples, wherein the temporally and spatially varying induced meridional astigmatism provides a stop signal to the myopic eyes of the individual.

A method of use of the spectacle apparatus kit of one or more of the claim C examples, wherein the axis of the astigmatic or toric power profile in the at least two pairs of optical films is substantially different from each other and is at least separated by 20 degrees.

A method of use of the spectacle apparatus kit of one or more of the claim C examples, wherein the at least two or more pairs of optical films are prescribed using an appropriate wearing schedule.

A method of use of the spectacle apparatus kit of one or more of the claim C examples, wherein the appropriate wearing schedule to wear the at least two pairs of optical films are separated at least by 2 hours, 4 hours, 6 hours, 8 hours, or 12 hours.

A method of use of the spectacle apparatus kit of one or more of the claim C examples, wherein the appropriate wearing schedule to wear the at least two pairs of optical films are separated at least by 1 day, 2 days, 3 days, 4 days, 5 days, 6 days, or one week.

A method of use of the spectacle apparatus kit of one or more of the claim C examples, wherein the appropriate wearing schedule to wear the at least two pairs of optical films are separated at least by 1 week, 2 weeks, 3 weeks, or one month.

A method of use of the spectacle apparatus kit of one or more of the claim C examples, wherein the appropriate wearing schedule to wear the at least two pairs of optical films is identified by evaluating the rate of progression and/or risk factors associated with the myopic individual.

A method of use of the spectacle apparatus kit of one or more of the claim C examples, wherein the magnitude of the astigmatic or toric power profile is configured by evaluating the rate of progression and/or risk factors associated with the myopic individual.

A method of use of the spectacle apparatus kit of one or more of the claim C examples, wherein the optical film is used to convert a standard single vision spectacle for correction of myopia to a myopia management spectacles for both the correction of myopia and retarding, decelerating, reducing and/or managing the progression of myopia.

Set of "D" Examples of Impermanent Auxiliary Mini Optical Elements

A spectacle apparatus kit for a myopic individual, and its methods of use, the kit including at least two or more pairs of impermanent auxiliary mini optical elements, wherein each mini optical element is configured to cover at least a regional area on a lens for the left and at least a regional area on a lens for the right eye of the myopic individual, wherein each mini optical element is configured with an astigmatic or a toric power profile, wherein the mini optical element used in juxtaposition to a pair of standard single vision spectacles, provides each eye, at least in part meridional correction, and at least in part induces meridional astigmatism, on at least one region of the retina of the myopic eye; wherein the methods of use of the kit include instructions for the myopic individual comprising a wearing care regimen detailing the use of the mini optical elements within the kit.

A spectacle apparatus kit of one or more of the claim D examples, wherein the surface area of the at least one elliptical mini optical element is at least 5 mm$^2$, 10 mm$^2$, 15 mm$^2$, 20 mm$^2$, or 25 mm$^2$.

A spectacle apparatus kit of one or more of the claim D examples, wherein the magnitude of astigmatic or toric power profile is at least +0.5 DC, +0.75 DC, +1 DC, +1.25 DC, +1.5 DC or +1.75 DC.

A spectacle apparatus kit of one or more of the claim D examples, wherein the astigmatic or toric power profile is expressed using a power distribution function described by the expression Sphere+(Cylinder/2)*(Azimuthal component), wherein the Sphere refers to the distance spherical prescription power to correct the myopic eye, the Cylinder refers to the magnitude of induced astigmatism or toricity, wherein the Azimuthal component of the power distribution function is described as $C_a*\cos(m\theta)$, wherein $C_a$ is an azimuthal coefficient, m is an integer between 1 and 6, and Theta ($\theta$) is the azimuthal angle of a given point of the optic zone.

A spectacle apparatus kit of one or more of the claim D examples, wherein the astigmatic or toric power profile is configured on the anterior surface, posterior surface, or both surfaces of the mini optical element.

A spectacle apparatus kit of one or more of the claim D examples, wherein the mini optical element may be configured on the spectacle lens using a desired thickness profile variation across the mini optical element.

A spectacle apparatus kit of one or more of the claim D examples, wherein the mini optical element may be glued onto the spectacle lens, is made to adhere with finger pressure to the spectacle lens, may be used as a sticker on one of the surfaces of the spectacle lens, may be used as a peel-able adhesive on one of the surfaces of the spectacle lens or a combination thereof.

A spectacle apparatus kit of one or more of the claim D examples, wherein the at least one elliptical mini optical element when used in conjunction with the standard single vision spectacle lenses to provide induced meridional astigmatism in at least one specific region of the retina.

A spectacle apparatus kit of one or more of the claim D examples, wherein the specific region on the retina may be a nasal, temporal, superior, or inferior portion of the retina.

A spectacle apparatus kit of one or more of the claim D examples, wherein the specific region on the retina may be within 10 degrees of the visual field, 15 degrees of the visual field, 20 degrees of the visual field, 25 degrees of the visual field.

A spectacle apparatus kit of one or more of the claim D examples, wherein the magnitude of the astigmatic or toric power profile is configured substantially different between the pairs of mini optical elements within the kit.

A spectacle apparatus kit of one or more of the claim D examples, wherein the axis of the astigmatic or toric power profile is configured substantially different between the mini optical elements within the kit.

A spectacle apparatus kit of one or more of the claim D examples, wherein the magnitude and/or axis of the astigmatic or toric power profile is configured substantially different between the right and left lenses of the mini optical elements within the kit.

A spectacle apparatus kit of one or more of the claim D examples, wherein the at least two mini optical elements are configured to provide an appropriate stop signal to the myopic individual.

A spectacle apparatus kit of one or more of the claim D examples, wherein the myopic individual may have myopia with or without astigmatism.

A method of use of the spectacle apparatus kit of one or more of the claim A examples, wherein the at least two mini optical elements are configured to provide a temporally and spatially varying induced meridional astigmatism.

A method of use of the spectacle apparatus kit of one or more of the claim A examples, wherein the temporally and spatially varying induced meridional astigmatism provides a stop signal to the myopic eyes of the individual.

A method of use of the spectacle apparatus kit of one or more of the claim D examples, wherein the axis of the astigmatic or toric power profile in the at least two mini optical elements is substantially different from each other and is at least separated by 20 degrees.

A method of use of the spectacle apparatus kit of one or more of the claim D examples, wherein the at least two or more mini optical elements are prescribed using an appropriate wearing schedule.

A method of use of the spectacle apparatus kit of one or more of the claim D examples, wherein the appropriate wearing schedule to wear the at least two mini optical elements are separated at least by 2 hours, 4 hours, 6 hours, 8 hours, or 12 hours.

A method of use of the spectacle apparatus kit of one or more of the claim D examples, wherein the appropriate wearing schedule to wear the at least two mini optical elements are separated at least by 1 day, 2 days, 3 days, 4 days, 5 days, 6 days, or one week.

A method of use of the spectacle apparatus kit of one or more of the claim D examples, wherein the appropriate wearing schedule to wear the at least two mini optical elements are separated at least by 1 week, 2 weeks, 3 weeks, or one month.

A method of use of the spectacle apparatus kit of one or more of the claim D examples, wherein the appropriate wearing schedule to wear the at least two mini optical elements is identified by evaluating the rate of progression and/or risk factors associated with the myopic individual.

A method of use of the spectacle apparatus kit of one or more of the claim D examples, wherein the magnitude of the astigmatic or toric power profile is configured by evaluating the rate of progression and/or risk factors associated with the myopic individual.

The invention claimed is:

1. A spectacle apparatus kit for a myopic individual, the kit including at least two pairs of impermanent auxiliary optical films, wherein each pair includes an optical film configured to cover a substantial region of a standard single vision spectacle lens for the left eye and an optical film configured to cover a substantial region of a standard single vision spectacle lens for the right eye of the myopic individual, wherein each optical film is configured with substantially plano power across the optical film and at least one elliptical optical element configured with an astigmatic or a toric power profile, wherein the at least one elliptical optical element within each optical film used in juxtaposition to the respective standard single vision spectacle lens, provides each eye, at least in part meridional correction, and at least in part induces meridional astigmatism, on at least one region of the retina of the myopic eye.

2. The spectacle apparatus kit of claim 1, wherein the surface area of the at least one elliptical optical element is at least 5 mm$^2$.

3. The spectacle apparatus kit of claim 1, wherein each said elliptical optical element has a magnitude of astigmatic or toric power profile of at least +0.5 DC.

4. The spectacle apparatus kit of claim 1, wherein the astigmatic or toric power profile of each said elliptical optical element is expressed using a power distribution function described by the expression Sphere+(Cylinder/2)*(Azimuthal component), wherein the Sphere refers to the distance spherical prescription power to correct the eye of the myopic individual, the Cylinder refers to the magnitude of astigmatism or toric power, wherein the Azimuthal component of the power distribution function is described as Ca*cos(mθ), wherein Ca is an azimuthal coefficient, m is an integer between 1 and 6, and Theta (θ) is the azimuthal angle of a given point within the at least one elliptical optical element.

5. The spectacle apparatus kit of claim 1, wherein the kit includes glue for adhering the impermanent auxiliary optical films onto the standard single vision spectacle lens, or the impermanent auxiliary optical films are made to adhere with finger pressure to the standard single vision spectacle lens, or are in the form of a sticker for one of the surfaces of the standard single vision spectacle lens, or are in the form of a peel-able adhesive for one of the surfaces of the standard single vision spectacle lens or a combination thereof.

6. The spectacle apparatus kit of claim 1, wherein the at least one region of the retina includes a nasal, temporal, superior, or inferior portion of the retina and wherein the at least one region of the regina is within 25 degrees of the visual field.

7. The spectacle apparatus kit of claim 1, wherein the at least one region of the retina is at least within 45 degrees of the visual field.

8. The spectacle apparatus kit of claim 1, wherein each of the optical films include a plurality of elliptical optical elements with same magnitude of astigmatism.

9. The spectacle apparatus kit of claim 8, wherein the plurality of elliptical optical elements are configured to have different axes of astigmatism.

10. The spectacle apparatus kit of claim 8, wherein the plurality of elliptical optical elements are configured in circular, elliptical or spiral arrangements.

11. The spectacle apparatus kit of claim 1, wherein the at least two pairs of optical films are configured to provide a spatially and temporally varying induced meridonal astigmatism, which provides an optical stop signal to the right and left eyes of the myopic individual.

12. The spectacle apparatus kit of claim 1, wherein the at least two pairs of impermanent auxiliary optical films are configured with a magnitude of the astigmatic or toric power profile substantially different between the pairs of optical films.

13. The spectacle apparatus kit of claim 12, wherein the axis of the astigmatic or toric power profile in the plurality of elliptical optical elements is at least separated by 20 degrees.

14. The spectacle apparatus kit of claim 1, wherein the at least two pairs of impermanent auxiliary optical films are configured with an axis of the astigmatic or toric power profile substantially different between the pairs of optical films.

15. The spectacle apparatus kit of claim 1, wherein the at least two pairs of optical films are configured with a magnitude and/or axis of the astigmatic or toric power profile substantially different between the right and left lenses of the pairs of optical films.

16. The spectacle apparatus kit of claim 1, wherein the kit includes instructions for the myopic individual comprising a wearing care regimen detailing the use of the optical films within the kit.

17. A method of use of the spectacle apparatus kit of claim 1, including applying a first pair of the impermanent auxiliary optical films to respective standard single vision spectacle lenses of a pair of spectacles and after a period of time according to a wearing schedule: removing the pair of impermanent auxiliary optical films; and replacing the first pair of the impermanent auxiliary optical films with a second pair of the impermanent auxiliary films, wherein the second pair of the impermanent auxiliary films is configured with a magnitude and/or axis of the astigmatic or toric power profile that substantially different to the first pair of the impermanent auxiliary films.

18. The method of claim 17, wherein the wearing schedule separates the application to the spectacles of the first pair of the impermanent auxiliary optical films and the second pair of the impermanent auxiliary optical films by at least 1 day.

19. The method of claim 17, wherein the wearing schedule separates the application to the spectacles of the first pair of the impermanent auxiliary optical films and the second pair of the impermanent auxiliary optical films by at least 1 week.

* * * * *